(12) United States Patent
Macomber et al.

(10) Patent No.: US 11,683,003 B2
(45) Date of Patent: Jun. 20, 2023

(54) LOCKING, DAMPENING AND ACTUATION SYSTEMS AND METHODS FOR SOLAR TRACKERS

(71) Applicant: SUNFOLDING, INC., San Francisco, CA (US)

(72) Inventors: Victoria Macomber, San Francisco, CA (US); Jeffrey Charles Lamb, San Francisco, CA (US); Matthew N Schneider, Sierra Madre, CA (US); Christopher Oestreich, Atascadero, CA (US); Eric Preston Lien Suan, Baltimore, MD (US); Louis Hong Basel, Berkeley, CA (US); Saul Thomas Griffith, San Francisco, CA (US); Peter Aumann, San Francisco, CA (US); Kyle Allen Lamson, San Francisco, CA (US); Jonah Sternthal, San Francisco, CA (US); Eleanor Blair, San Francisco, CA (US); Nicholas Andrew Catalan, San Francisco, CA (US); Amando Luke Miller, San Francisco, CA (US)

(73) Assignee: SUNFOLDING, INC., San Francisco, CA (US)

( * ) Notice: Subject to any disclaimer, the term of this patent is extended or adjusted under 35 U.S.C. 154(b) by 0 days.

(21) Appl. No.: 17/354,987

(22) Filed: Jun. 22, 2021

(65) Prior Publication Data

US 2021/0399679 A1 Dec. 23, 2021

Related U.S. Application Data

(60) Provisional application No. 63/127,803, filed on Dec. 18, 2020, provisional application No. 63/042,460, filed on Jun. 22, 2020.

(51) Int. Cl.
| | | |
|---|---|---|
| *H02S 20/32* | (2014.01) | |
| *H02S 30/10* | (2014.01) | |
| *G05D 3/10* | (2006.01) | |

(52) U.S. Cl.
CPC ............ *H02S 20/32* (2014.12); *G05D 3/105* (2013.01); *H02S 30/10* (2014.12)

(58) Field of Classification Search
CPC .......... H02S 20/32; H02S 20/10; G05D 3/105
See application file for complete search history.

(56) References Cited

U.S. PATENT DOCUMENTS

| | | |
|---|---|---|
| 979,460 A | 12/1910 | Fulton |
| 2,920,656 A | 1/1960 | Bertolet |

(Continued)

FOREIGN PATENT DOCUMENTS

| | | |
|---|---|---|
| AU | 2020239824 A1 | 10/2020 |
| CA | 2330612 A1 | 6/2002 |

(Continued)

OTHER PUBLICATIONS

"Final Rejection dated Sep. 9, 2016," U.S. Appl. No. 14/064,072, filed Oct. 25, 2013, 15 pages.

(Continued)

*Primary Examiner* — Jayne L Mershon
(74) *Attorney, Agent, or Firm* — Davis Wright Tremaine LLP

(57) ABSTRACT

A solar tracker system comprising one or more tracker rotation control systems that include: a curved gear plate; and a locking element configured to lock the solar tracker system in a first configuration.

18 Claims, 46 Drawing Sheets

(56) References Cited

U.S. PATENT DOCUMENTS

| | | |
|---|---|---|
| 3,284,964 A | 11/1966 | Norio |
| 3,472,062 A | 10/1969 | Owen |
| 3,602,047 A | 8/1971 | Kistler |
| 3,699,952 A | 10/1972 | Waters et al. |
| 3,800,398 A | 4/1974 | Harrington, Jr. |
| 3,956,543 A | 5/1976 | Stangeland |
| 3,982,526 A | 9/1976 | Barak |
| 4,063,543 A | 12/1977 | Hedger |
| 4,102,326 A | 7/1978 | Sommer |
| 4,120,635 A | 10/1978 | Langecker |
| 4,154,221 A | 5/1979 | Nelson |
| 4,172,443 A | 10/1979 | Sommer |
| 4,175,540 A | 11/1979 | Roantree et al. |
| 4,185,615 A | 1/1980 | Bottum |
| 4,198,954 A | 4/1980 | Meijer |
| 4,345,582 A | 8/1982 | Aharon |
| 4,424,802 A | 1/1984 | Winders |
| 4,459,972 A | 7/1984 | Moore |
| 4,464,980 A | 8/1984 | Yoshida |
| 4,494,417 A | 1/1985 | Larson et al. |
| 4,566,432 A | 1/1986 | Sobczak et al. |
| 4,620,771 A | 11/1986 | Dominguez |
| 4,751,868 A | 6/1988 | Paynter |
| 4,768,871 A | 9/1988 | Mittelhauser et al. |
| 4,777,868 A | 10/1988 | Larsson |
| 4,784,042 A | 11/1988 | Paynter |
| 4,832,001 A | 5/1989 | Baer |
| 4,848,179 A | 7/1989 | Ubhayakar |
| 4,900,218 A | 2/1990 | Sutherland |
| 4,939,982 A | 7/1990 | Immega et al. |
| 4,954,952 A | 9/1990 | Ubhayakar et al. |
| 4,977,790 A | 12/1990 | Nishi et al. |
| 5,021,798 A | 6/1991 | Ubhayakar |
| 5,040,452 A | 8/1991 | Van Kerkvoort |
| 5,080,000 A | 1/1992 | Bubic et al. |
| 5,156,081 A | 10/1992 | Suzumori |
| 5,181,452 A | 1/1993 | Immega |
| 5,251,538 A | 10/1993 | Smith |
| 5,317,952 A | 6/1994 | Immega |
| 5,337,732 A | 8/1994 | Grundfest et al. |
| 5,386,741 A | 2/1995 | Rennex |
| 5,469,756 A | 11/1995 | Feiten |
| 5,697,285 A | 12/1997 | Nappi et al. |
| 5,816,769 A | 10/1998 | Bauer et al. |
| 5,979,006 A | 11/1999 | Stokes et al. |
| 6,046,399 A | 4/2000 | Kapner |
| 6,054,529 A | 4/2000 | O'Donnell et al. |
| 6,080,927 A | 6/2000 | Johnson |
| 6,178,872 B1 | 1/2001 | Schulz |
| 6,363,928 B1 | 4/2002 | Anderson, Jr. |
| 6,557,804 B1 | 5/2003 | Carroll |
| 6,772,673 B2 | 8/2004 | Seto et al. |
| 6,875,170 B2 | 4/2005 | Francois et al. |
| 7,331,273 B2 | 2/2008 | Kerekes et al. |
| 7,531,741 B1 | 5/2009 | Melton et al. |
| 7,614,615 B2 | 11/2009 | Egolf |
| 8,201,473 B2 | 6/2012 | Knoll |
| 8,305,736 B2 | 11/2012 | Yee et al. |
| 8,657,271 B2 | 2/2014 | Szekely et al. |
| 8,700,215 B2 | 4/2014 | Komatsu et al. |
| 8,863,608 B2 | 10/2014 | Fischer et al. |
| 8,899,359 B1 | 12/2014 | Hafenrichter et al. |
| 9,133,864 B2 | 9/2015 | Menon et al. |
| 9,216,028 B2 | 12/2015 | Korb et al. |
| 9,314,369 B2 | 4/2016 | Grenon et al. |
| 9,624,911 B1 | 4/2017 | Griffith et al. |
| 9,641,123 B2 | 5/2017 | Swahn et al. |
| 9,719,977 B2 | 8/2017 | Korb et al. |
| 9,806,669 B2 | 10/2017 | Michotte De Welle |
| 9,919,434 B1 | 3/2018 | Rey et al. |
| 10,135,388 B2 | 11/2018 | Madrone et al. |
| 10,284,354 B2 | 5/2019 | Sebire et al. |
| 10,384,354 B2 | 8/2019 | Griffith et al. |
| 10,562,180 B2 | 2/2020 | Telleria et al. |
| 10,601,366 B2 | 3/2020 | Madrone et al. |
| 10,605,365 B1 | 3/2020 | Griffith et al. |
| 10,917,038 B2 | 2/2021 | Basel et al. |
| 10,944,353 B2 | 3/2021 | Basel et al. |
| 11,059,190 B2 | 7/2021 | Griffith et al. |
| 11,420,342 B2 | 8/2022 | Griffith et al. |
| 11,502,639 B2 | 11/2022 | Betts et al. |
| 2005/0034752 A1 | 2/2005 | Gross et al. |
| 2005/0284467 A1 | 12/2005 | Patterson |
| 2006/0049195 A1 | 3/2006 | Koussios et al. |
| 2009/0097994 A1 | 4/2009 | Beck et al. |
| 2009/0115292 A1 | 5/2009 | Ueda et al. |
| 2009/0151775 A1 | 6/2009 | Pietrzak |
| 2009/0314119 A1 | 12/2009 | Knoll |
| 2010/0043776 A1 | 2/2010 | Gee |
| 2010/0125401 A1 | 5/2010 | Hamama et al. |
| 2010/0180883 A1 | 7/2010 | Oosting |
| 2011/0073161 A1 | 3/2011 | Scanlon |
| 2011/0114080 A1 | 5/2011 | Childers et al. |
| 2011/0277815 A1 | 11/2011 | Sankrithi |
| 2012/0210818 A1 | 8/2012 | Fischer et al. |
| 2012/0285509 A1 | 11/2012 | Surganov |
| 2013/0048011 A1 | 2/2013 | Bickford et al. |
| 2013/0172829 A1 | 7/2013 | Badawi |
| 2013/0197405 A1 | 8/2013 | Williams, III et al. |
| 2013/0247962 A1 | 9/2013 | Sakai et al. |
| 2013/0288859 A1 | 10/2013 | Watterson |
| 2013/0306135 A1 | 11/2013 | Planting |
| 2014/0277303 A1 | 9/2014 | Biser et al. |
| 2015/0157112 A1 | 6/2015 | Daibes |
| 2015/0165231 A1 | 6/2015 | Scheja et al. |
| 2015/0165238 A1 | 6/2015 | Slayton et al. |
| 2015/0182415 A1 | 7/2015 | Olkowski et al. |
| 2015/0244309 A1 | 8/2015 | Sakai et al. |
| 2015/0320590 A1 | 11/2015 | Whitehurst et al. |
| 2016/0052347 A1 | 2/2016 | Nagai et al. |
| 2016/0123592 A1 | 5/2016 | Drake et al. |
| 2016/0184162 A1 | 6/2016 | Grez et al. |
| 2016/0261224 A1 | 9/2016 | Madrone et al. |
| 2017/0163208 A1* | 6/2017 | Almy .................. F24S 30/425 |
| 2017/0184327 A1* | 6/2017 | Griffith .................. F03G 6/02 |
| 2017/0282360 A1 | 10/2017 | Telleria et al. |
| 2018/0302025 A1 | 10/2018 | Basel et al. |
| 2018/0302026 A1 | 10/2018 | Basel et al. |
| 2018/0302027 A1 | 10/2018 | Betts et al. |
| 2019/0372512 A1* | 12/2019 | Betts .................. F15B 15/10 |
| 2020/0304057 A1 | 9/2020 | Suan et al. |

FOREIGN PATENT DOCUMENTS

| | | |
|---|---|---|
| CL | 201501867 | 6/2015 |
| CL | 201701939 | 7/2017 |
| CN | 101783619 A | 7/2010 |
| CN | 103222067 A | 7/2013 |
| CN | 103786165 A | 5/2014 |
| CN | 205986743 U | 2/2017 |
| CN | 208063113 U | 11/2018 |
| CO | 09035821 | 4/2009 |
| CO | 6180473 A2 | 7/2010 |
| CO | 6450667 A2 | 5/2012 |
| DE | 202011050327 U1 | 9/2012 |
| EP | 2648226 A1 | 10/2013 |
| EP | 3736974 A1 | 11/2020 |
| FR | 2603228 A1 | 3/1988 |
| JP | 2014116360 A | 6/2014 |
| KR | 101034478 B1 | 5/2011 |
| KR | 20130019502 A | 2/2013 |
| RU | 2012137650 A | 3/2014 |
| RU | 2516595 C2 | 5/2014 |
| RU | 2560652 C2 | 8/2015 |
| RU | 2611571 C1 | 2/2017 |
| SU | 358814 A3 | 11/1972 |
| SU | 1346918 A1 | 10/1987 |
| TW | 201116726 A | 5/2011 |
| WO | 0117731 A1 | 3/2001 |
| WO | 2009108159 A1 | 9/2009 |
| WO | 2011094084 A2 | 8/2011 |
| WO | 2012015378 A1 | 2/2012 |

(56) References Cited

FOREIGN PATENT DOCUMENTS

| | | |
|---|---|---|
| WO | 2016123592 A1 | 8/2016 |
| WO | 2018195116 A1 | 10/2018 |

OTHER PUBLICATIONS

"Non-Final Rejection dated Aug. 18, 2016," U.S. Appl. No. 14/064,071, filed Oct. 25, 2013, 13 pages.
Australian First Examination Report dated Jul. 12, 2022, Patent Application No. 2018255296, filed Apr. 17, 2017, 5 pages.
Australian IPO Search Report dated Aug. 25, 2021, Patent Application No. 2020239821, 3 pages.
Australian Second Examination Report dated Jun. 30, 2022, Patent Application No. 2020239824, filed Oct. 15, 2019, 3 pages.
Author Unkown, http://www.utilityscalesolar.com/Utility_Scale_Solar,_Inc./USS_Homepage.html, Utility Scale Solar, Inc., 2011.
Brazilian Preliminary Office Action dated Jul. 15, 2022, Patent Application No. 1120170164612, filed Jan. 30, 2016, 4 pages.
Brazilian Preliminary Office Action dated Jun. 30, 2020, Patent Application No. 1120170164612, filed Jan. 30, 2016, 4 pages.
Brazilian Technical Examination Report dated Aug. 2, 2022, Patent Application No. 1120170164612, filed Jan. 30, 2016, 4 pages.
Chile IPO Search Report dated Jun. 17, 2021, Patent Application No. 201902938, 4 pages.
Columbian Office Action dated Aug. 9, 2021, Patent Application No. NC2019/0011622, filed Apr. 17, 2018, 7 pages.
European Patent Office Supplementary Search Report dated Aug. 18, 2021, Reference E35151EP, Application No. 19810208.9, 8 pages.
International Search Report and Written Opinion dated Aug. 14, 2017, International Patent Application No. PCT/US2017/024730, filed Mar. 29, 2017.
International Search Report and Written Opinion dated Aug. 2, 2018, International Patent Application No. PCT/US2018/028020, filed Apr. 17, 2018, 7 pages.
International Search Report and Written Opinion dated Aug. 2, 2018, International Patent Application No. PCT/US2018/028024, filed Apr. 17, 2018, 7 pages.
International Search Report and Written Opinion dated Aug. 29, 2019, Patent Application No. PCT/US2019/034202, filed May 28, 2019, 7 pages.
International Search Report and Written Opinion dated Aug. 9, 2018, International Patent Application No. PCT/US2018/028025, filed Apr. 17, 2018, 7 pages.
International Search Report and Written Opinion dated May 5, 2016, International Patent Application No. PCT/US2016/015857, filed Jan. 30, 2016.
International Search Report and Written Opinion dated Sep. 2, 2021, International Patent Application No. PCT/US2021/038534, filed Jun. 22, 2021.
International Search Report and Written Opinion dated Sep. 2, 2021, Patent Application No. PCT/US2021/038534, 7 pages.
Seba, "Solar Trillions," pp. 246-250, Jan. 28, 2010.
The Wiley Encyclopedia of Packaging Technology 3rd Ed., Wiley Publications, p. 145, Sep. 2009.
Chilean Notice of Allowance dated Aug. 11, 2022, Patent Application No. 2019-002938, filed Oct. 16, 2019, 2 pages.
IndiaIPO Examination Report dated Sep. 7, 2022, Patent Application No. 202017044335, 6 pages.
Australian IPO First Examination Report for Patent No. 2019277145 dated Jul. 28, 2022, 3 pages.
Australian Notice of Allowance dated Aug. 11, 2022, Patent Application No. 2020239824, 3 pages.
Brazilian Preliminary Office Action dated Oct. 11, 2022, Patent Application No. 2019277145, 4 pages.
Brazilian Preliminary Office Action dated Oct. 11, 2022, Patent Application No. 122020010462-7, filed Jan. 30, 2016, 4 pages.
Brazilian Preliminary Office Action dated Sep. 20, 2022, Patent Application No. 1120190217215, 4 pages.
China IPO First Office Action in Applcation No. 2018800252687 dated Aug. 30, 2022, 3 pages.
China IPO Preliminary Office Action dated Aug. 30, 2022, Patent Application No. 2018800252687, filed Apr. 17, 2018, 3 pages.
Inidia Intellectual Property Office Examination Report for Patent Application No. 202017044335 dated Jul. 9, 2022, 6 pages.
Intellectual Property India First Examination Report dated Sep. 7, 2022, Patent Application No. 2020170044335, 6 pages.
Australian First Examination Report dated Jan. 25, 2023, Patent Application No. 2018254424, 3 pages.
Brazilian Notice of Allowance dated Patent Application No. 1120170164612, filed Dec. 6, 2022, 4 pages.
International Search Report and Written Opinion dated Feb. 28, 2023, International Patent Application No. PCT/US2022/079178, 11 pages.
Japan Patent Office Notification of Reasons for Refusal of Application No. 2020-556856 dated Mar. 6, 2023, 6 pages.
Taiwan Notice of Allowance dated Patent Application No. 107113086, dated Feb. 2, 2023, 4 pages.
Argentina IPO Office Action for Patent No. 20190101450 dated Jan. 23, 2023, 3 pages.
Brazilian Written Opinion dated Mar. 7, 2023, Patent Application No. 1220200104627, 5 pages.

* cited by examiner

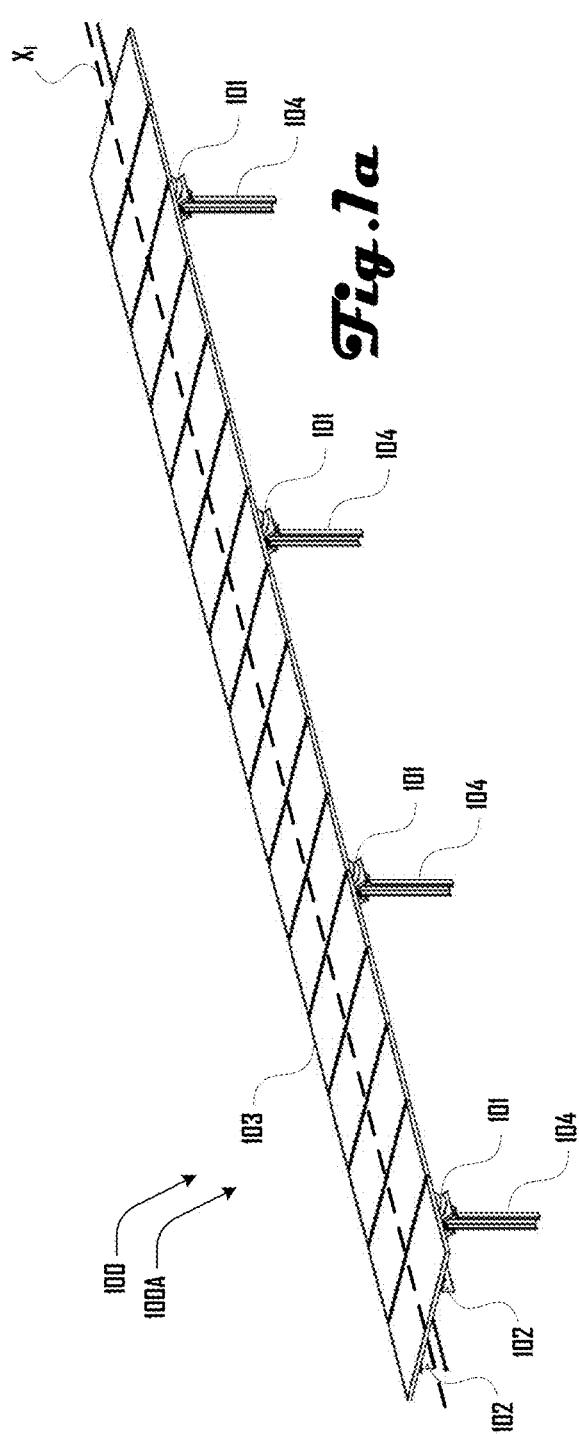
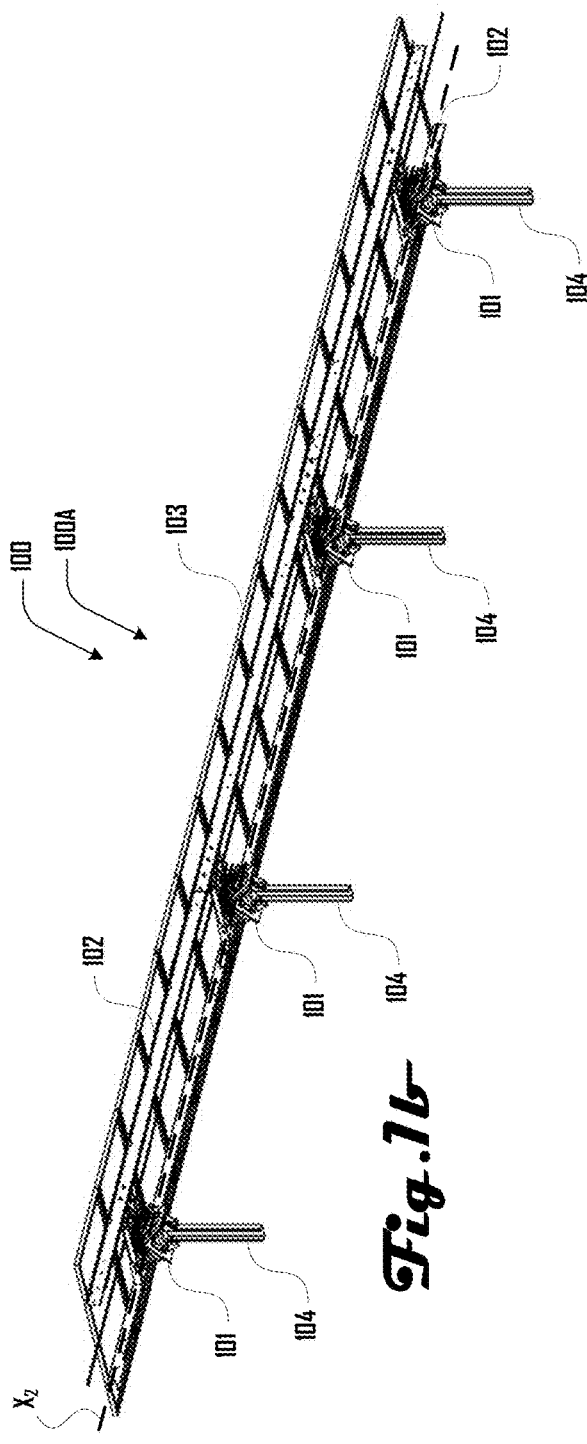

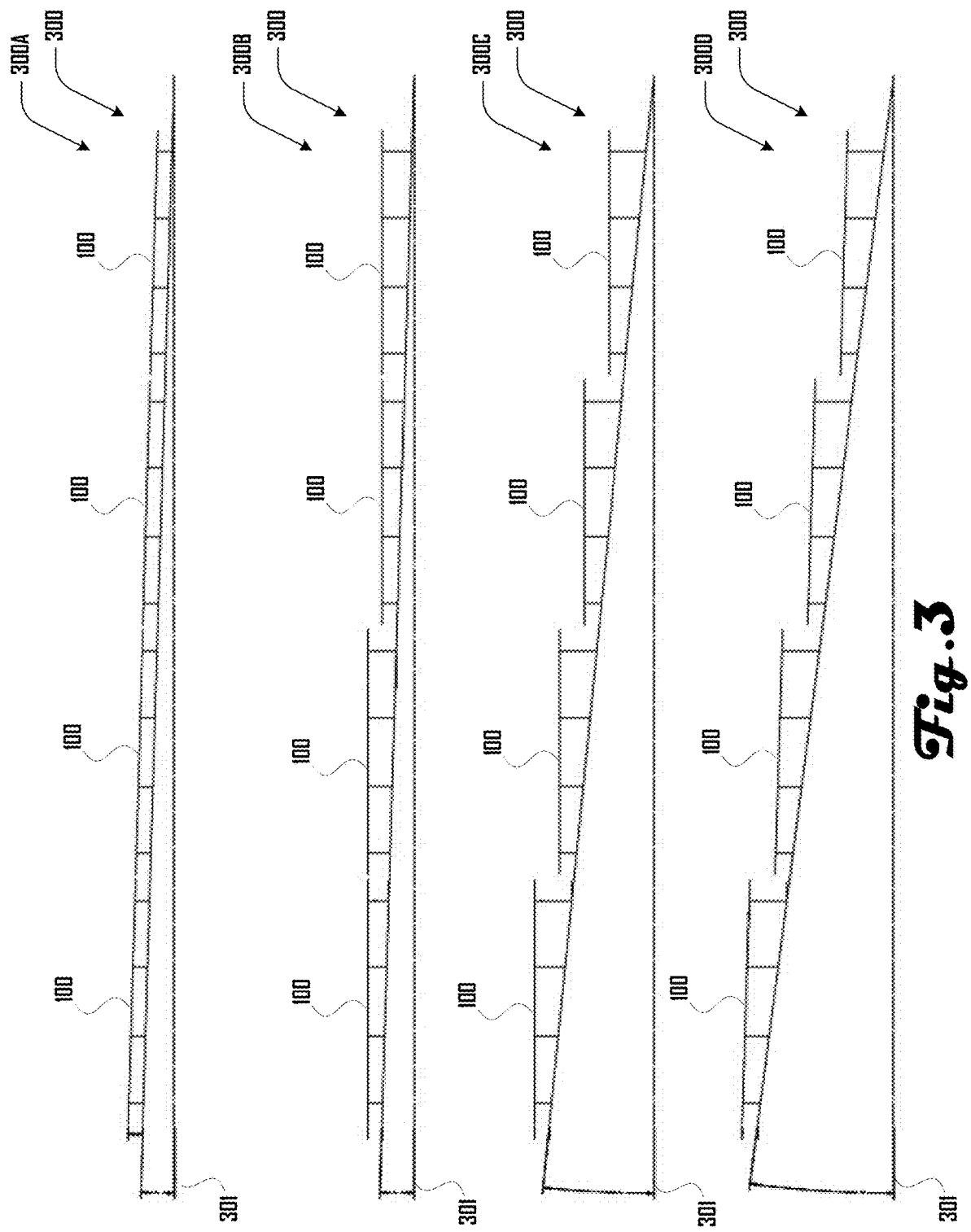

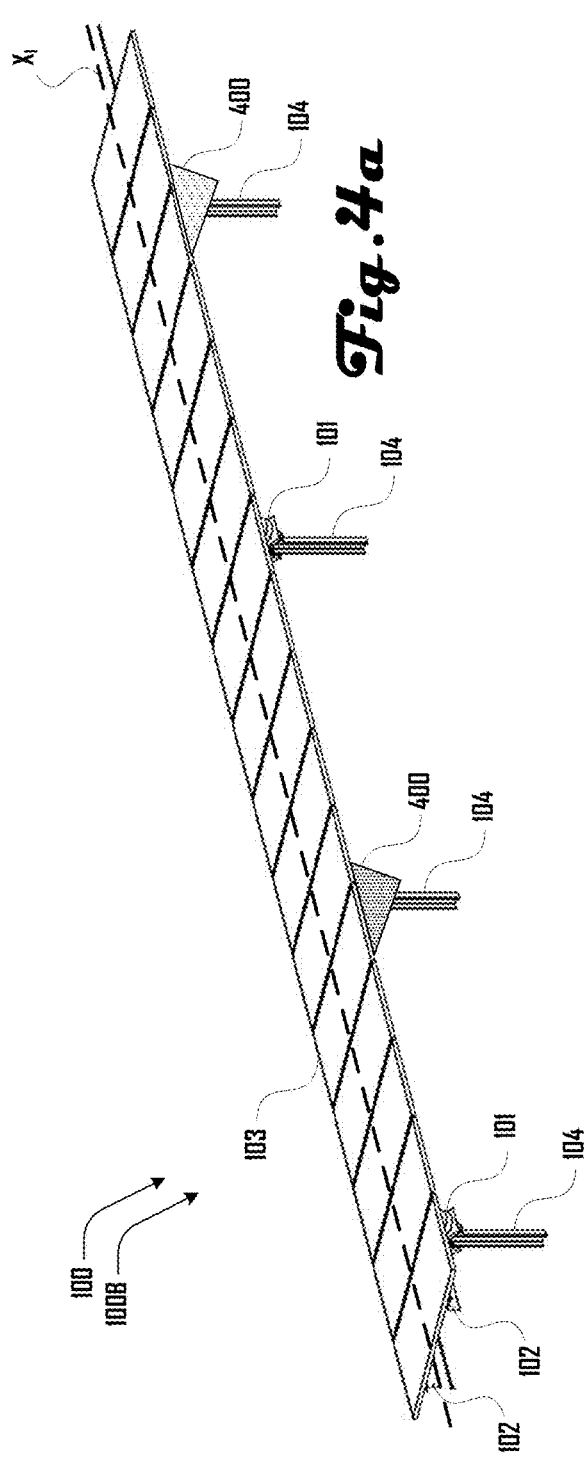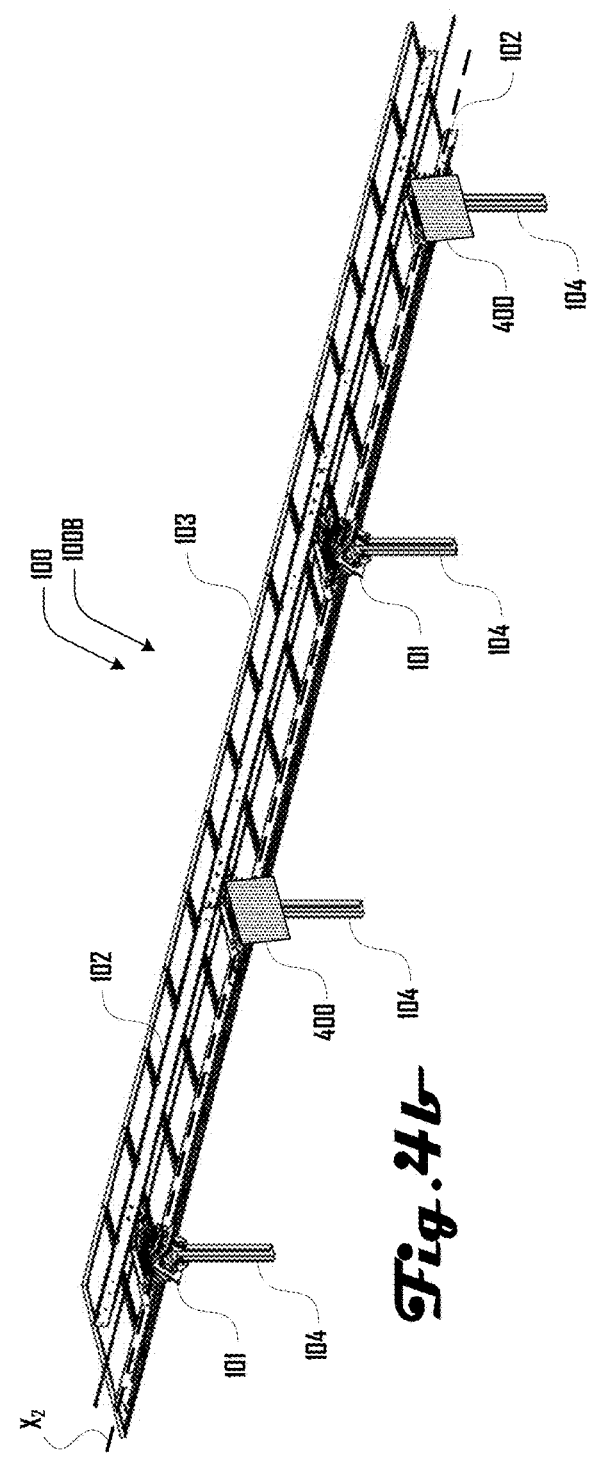

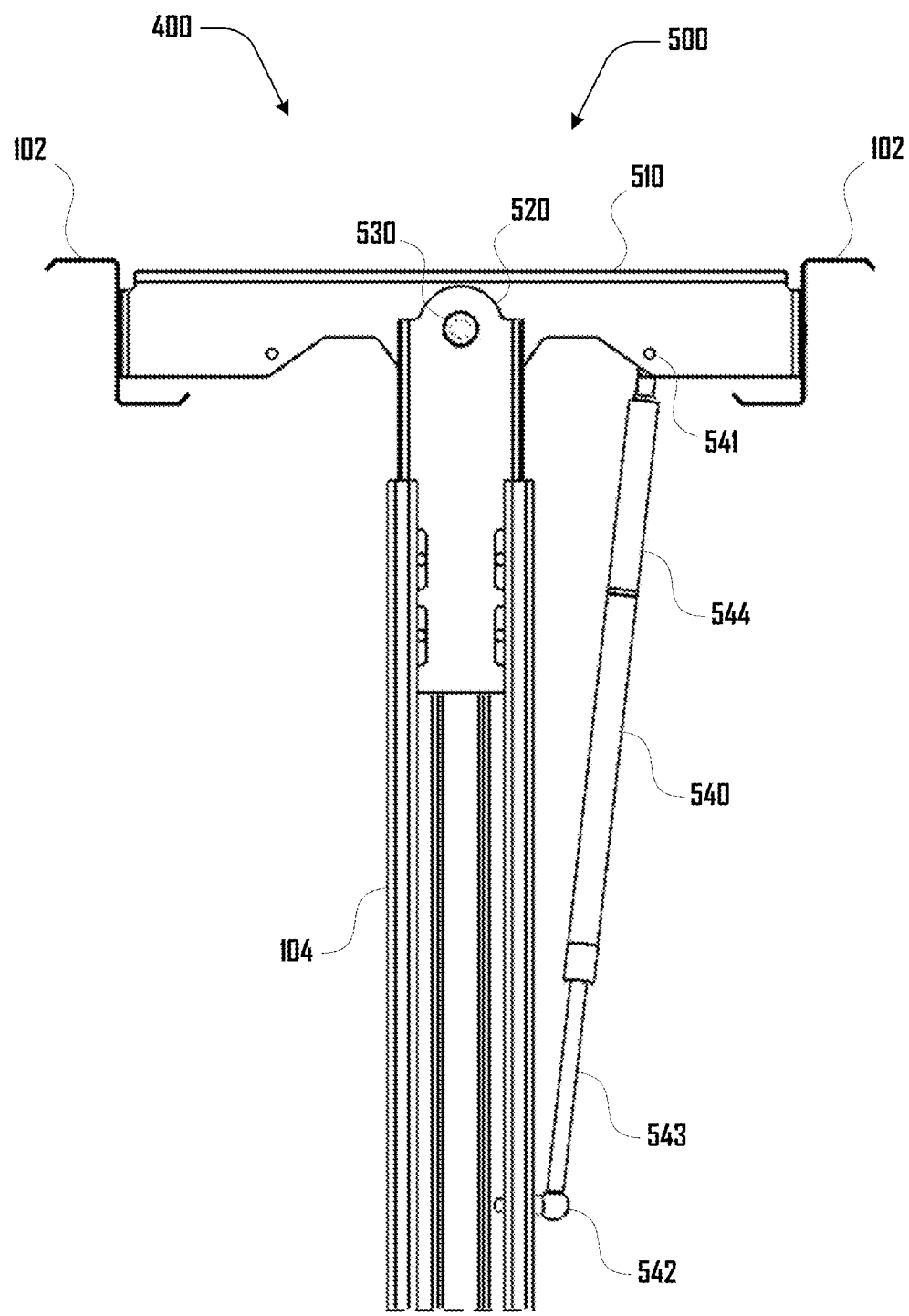

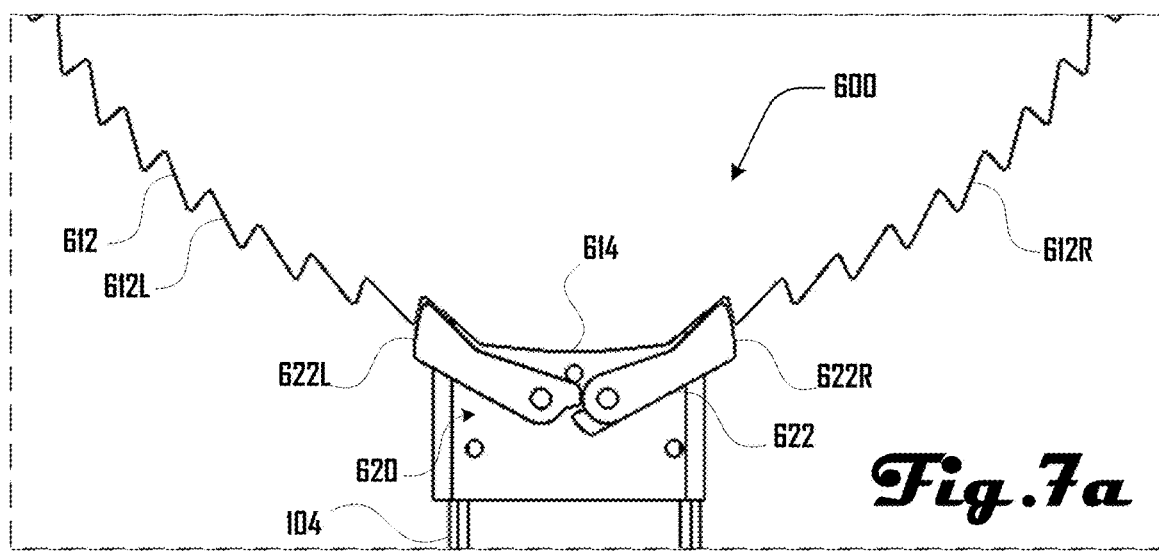
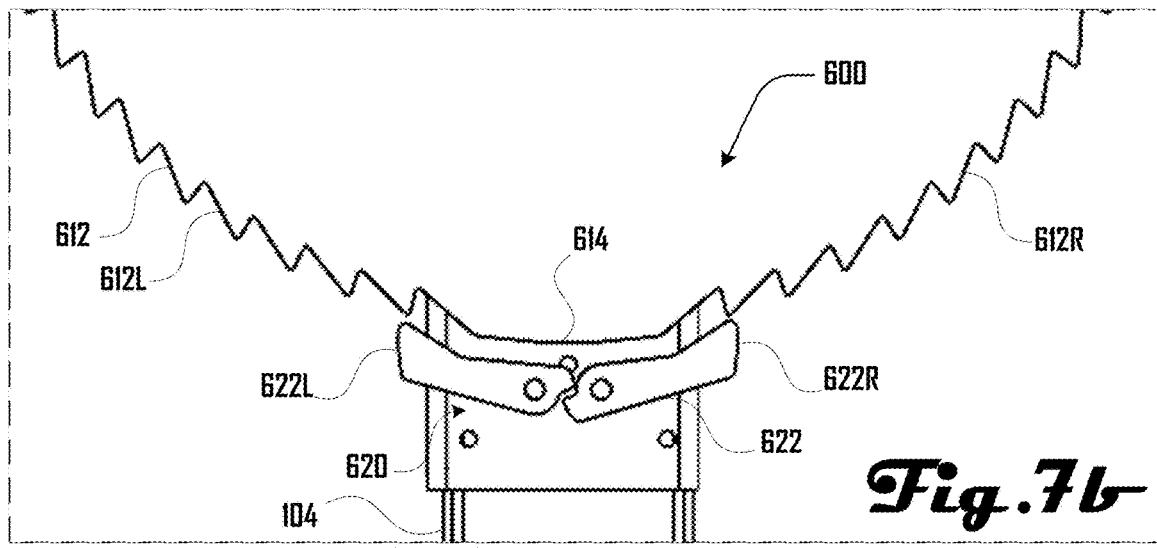
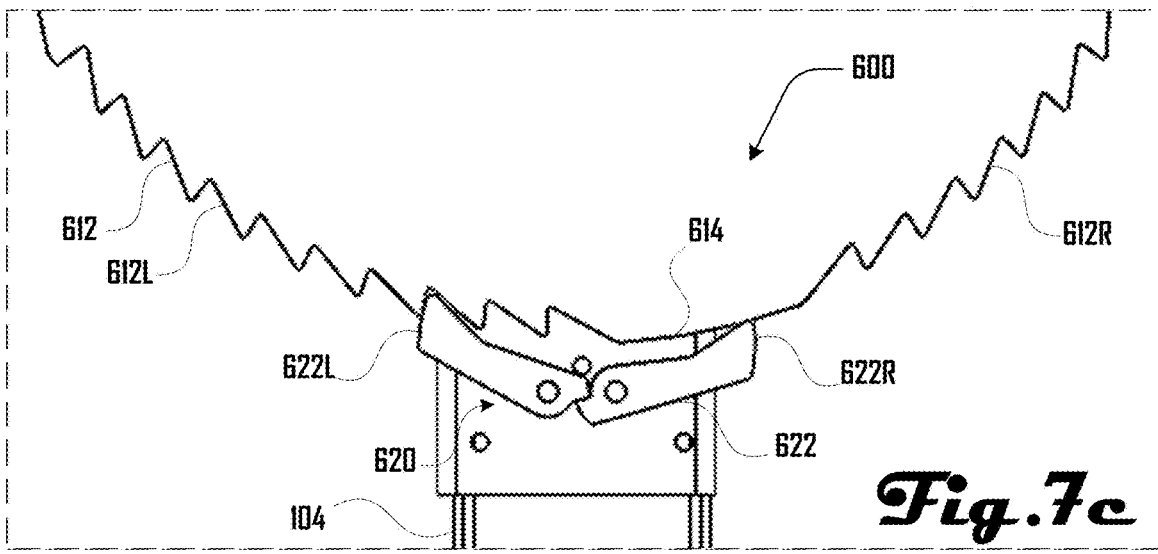

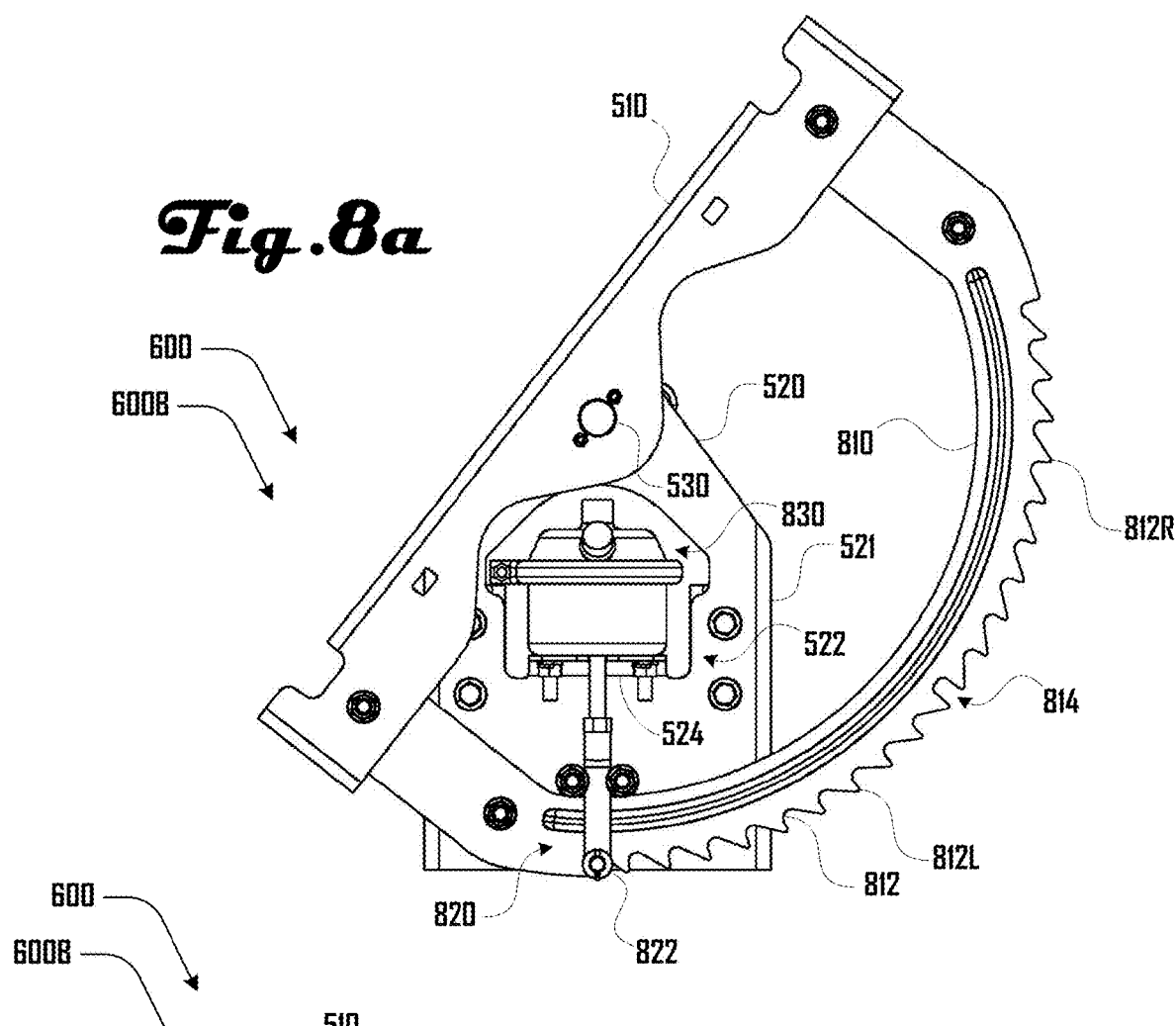
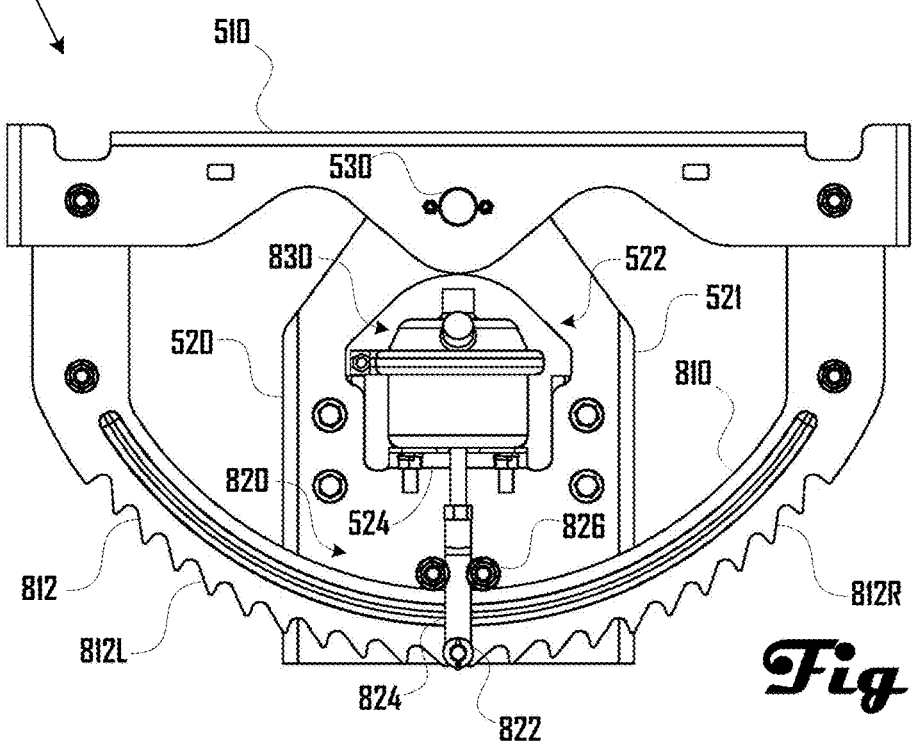

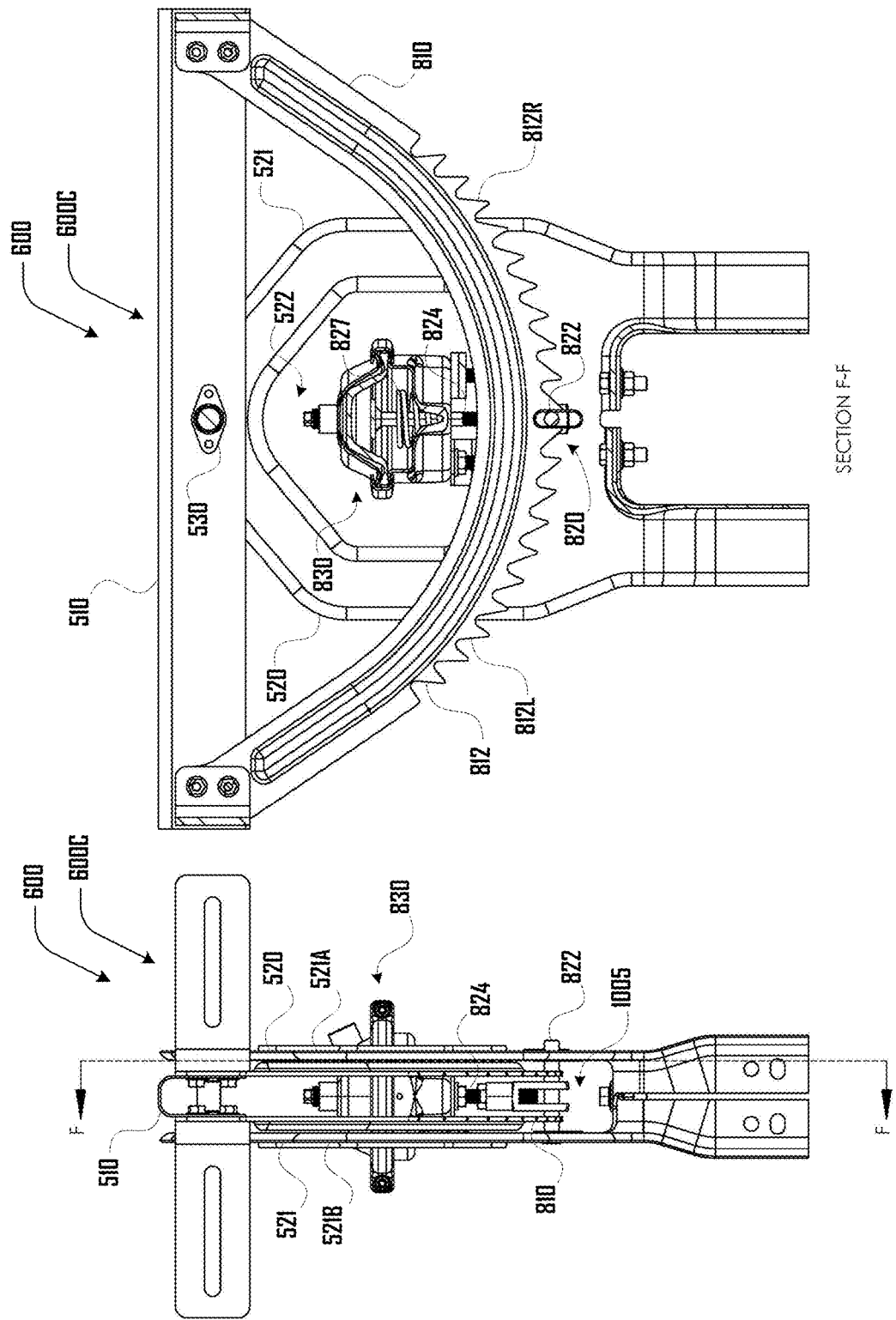

SECTION E-E

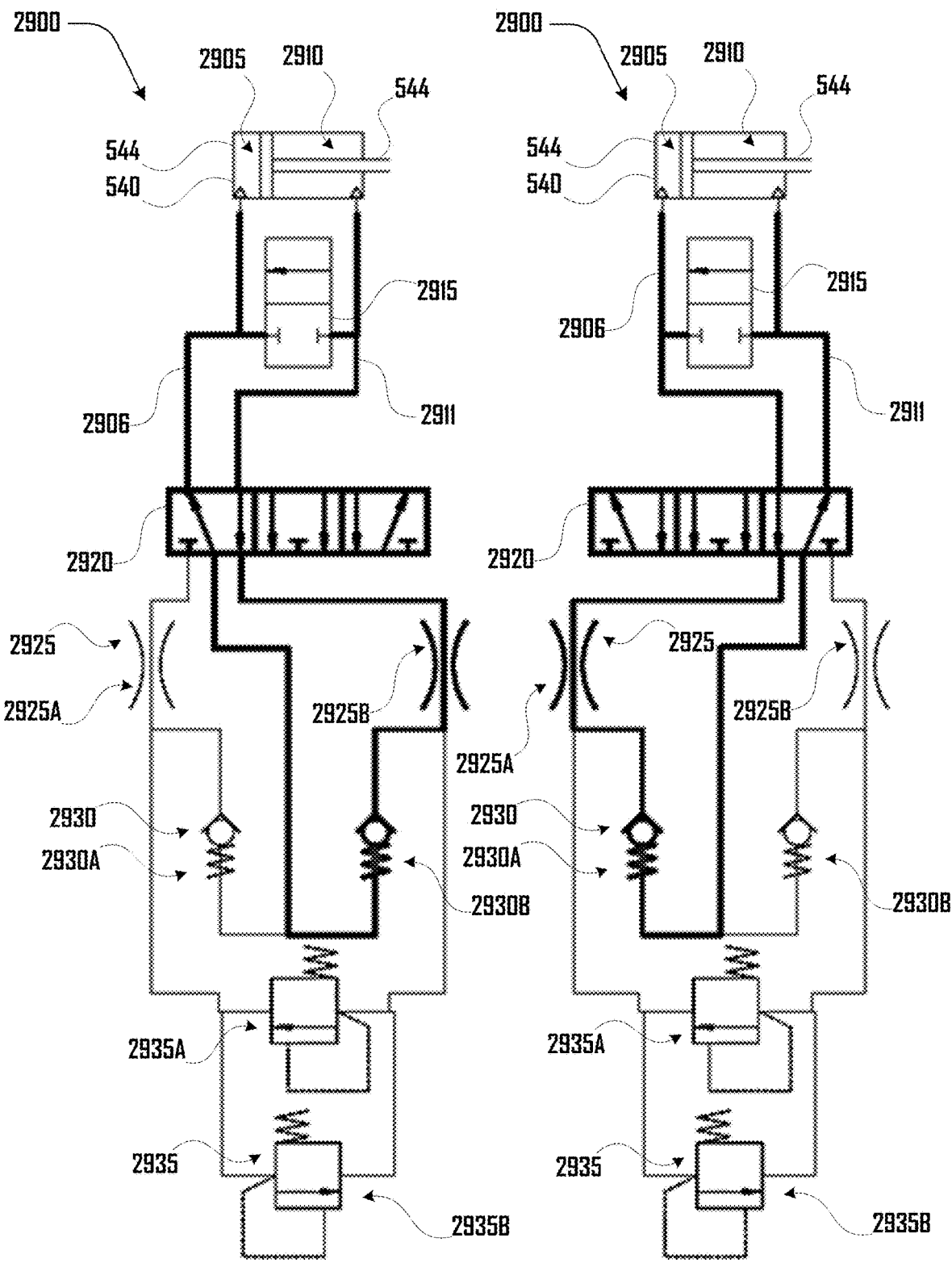

LOCKING, DAMPENING AND ACTUATION SYSTEMS AND METHODS FOR SOLAR TRACKERS

CROSS-REFERENCE TO RELATED APPLICATIONS

This application is a non-provisional of and claims priority to U.S. Provisional Application No. 63/042,460, filed Jun. 22, 2020 entitled "LOCKING AND DAMPENING SYSTEMS AND METHODS FOR SOLAR TRACKERS". This application is hereby incorporated herein by reference in its entirety and for all purposes.

This application is a non-provisional of and claims priority to U.S. Provisional Application No. 63/127,803, filed Dec. 18, 2020 entitled "LOCKING AND DAMPENING SYSTEMS AND METHODS FOR SOLAR TRACKERS". This application is hereby incorporated herein by reference in its entirety and for all purposes.

This application is also related to U.S. Non-Provisional applications filed Apr. 17, 2018 entitled "PNEUMATIC ACTUATOR SYSTEM AND METHOD", "PNEUMATIC ACTUATION CIRCUIT SYSTEM AND METHOD" and "SOLAR TRACKER CONTROL SYSTEM AND METHOD" having application Ser. Nos. 15/955,044, 15/955,506 and 15/955,519 respectively. These applications are hereby incorporated herein by reference in their entirety and for all purposes.

This application is also related to U.S. Non-Provisional application filed May 28, 2019 entitled "TUBULAR FLUIDIC ACTUATOR SYSTEM AND METHOD" having application Ser. No. 16/423,899. This application is hereby incorporated herein by reference in its entirety and for all purposes.

BRIEF DESCRIPTION OF THE DRAWINGS

FIG. 1a illustrates a top perspective view of a solar tracker in accordance with an embodiment.

FIG. 1b illustrates a bottom perspective view of the solar tracker of FIG. 1a.

FIG. 3 illustrates examples of solar tracker arrays having a plurality of solar trackers arranged in a linearly aligned row on a portion of the ground having increasing slopes in accordance with four respective example embodiments.

FIGS. 4a and 4b illustrate a respective top perspective and bottom perspective view of a solar tracker in accordance with another embodiment that includes a plurality of locking-dampening assemblies.

FIG. 5 illustrates a dampening portion of a locking-dampening assembly in accordance with one embodiment.

FIG. 7a illustrates an example locked-flat configuration of the ratchet assembly of FIGS. 6a and 6b, where the left and right pawls are respectively engaged with the first tooth of the left and right set of teeth on opposing sides of a central flat apex.

FIG. 7b illustrates an example unlocked configuration of the ratchet assembly where the left and right pawls are respectively retracted such that the left and right pawls are unable to engage the left and right set of teeth on opposing sides of the central flat apex.

FIG. 7c illustrates an example ratchet-to-flat configuration of the ratchet assembly where the solar tracker is tilted left and where the left and right pawls are biased toward the bottom arc of the gear plate such that the solar tracker can move freely toward the flat configuration, but the engaged left pawl prevents the solar tracker from tilting further left.

FIGS. 8a and 8b illustrate a ratchet assembly of a locking-dampening assembly in accordance with another embodiment, which includes a gear plate coupled to a bar along with a pawl assembly and pawl actuator.

FIG. 10a illustrates a side view of another embodiment of a locking-dampening assembly.

FIG. 10b illustrates a cut-away front view of the embodiment of the locking-dampening assembly of FIG. 10a.

FIG. 11b illustrates a rear view of the locking-dampening assembly of FIGS. 10a, 10b and 11a.

FIG. 12b illustrates a top view of the locking-dampening assembly of FIGS. 10a, 10b, 11a, 11b and 12a.

FIG. 19b illustrates a side view of a portion of the embodiment of the locking-dampening assembly of FIGS. 16, 17, 18 and 19a.

FIG. 31a illustrates an example of the fluidics of FIG. 29 in a first unidirectional-motion configuration where the main valve allows unidirectional fluid flow through the second flow control orifice and the second check valve.

FIG. 31b illustrates an example of the fluidics of FIG. 29 in a second unidirectional-motion configuration where the main valve allows unidirectional fluid flow through the first flow control orifice and the first check valve.

FIG. 37b illustrates a perspective view of the locking system of FIG. 37a.

FIG. 39b illustrates a further side view of the locking system of FIGS. 37a, 37b, 38b and 39a.

FIG. 40b illustrates a side view of a portion of a locking system comprising the latch system of FIG. 40a.

FIG. 41b illustrates a side view of the actuation-locking system of FIG. 41a.

FIG. 45b illustrates a second perspective cross-sectional view of the pin lock system of FIG. 45a.

FIG. 46b illustrates a perspective view of the tracker comprising the pin lock system of FIG. 46a.

Figure 2:
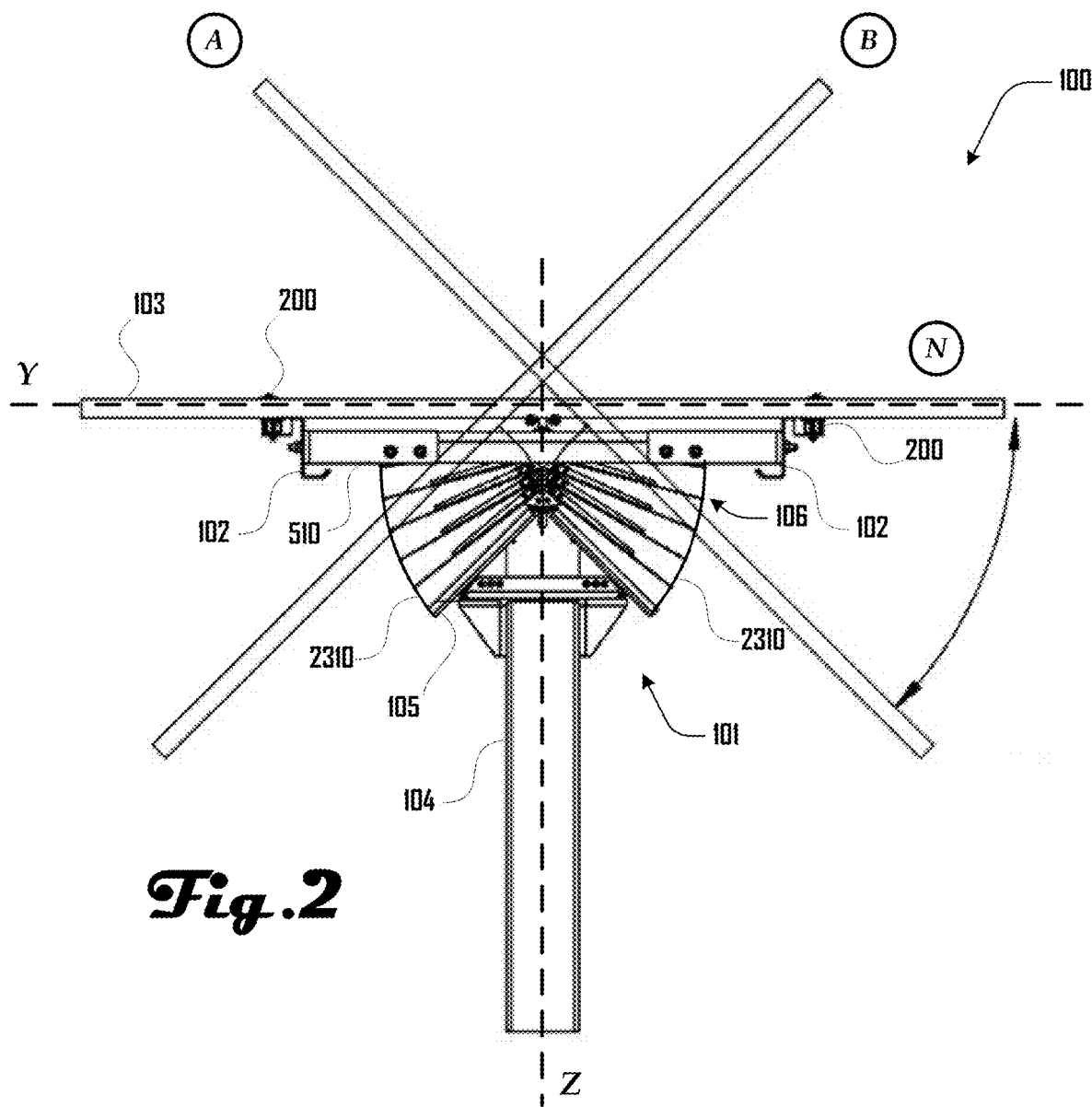
FIG. 2 illustrates a side view of a solar tracker in accordance with an embodiment.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION

Various embodiments discussed herein relate to solar tracker system that can be configured with a variety of driving and supporting mechanisms, which may be used independently or in concert with other mechanisms. Such mechanisms may exist in conjunction on a single post or in combination within a solar tracker system.

Basic function items of some embodiments can include one or more actuation device configured to orient the tracker to a particular position; one or more damping device configured to actively or passively control the speed at which a tracker system is able to move when driven by an external force, such as wind, or by an internal force such as one or more actuation device; and/or one or more locking device configured to hold the tracker in a specific position. In some embodiments, a locking device can include a one-way locking device (such as a ratcheting mechanism) which allows motion in one direction, and prevents motion in the other direction. In further embodiments, a locking device can include a two-way latch that can be configured to lock the tracker in various configurations such as in a flat configuration where solar panels are perpendicular to one or more ground-posts of the tracker system. Trackers systems can be designed with any suitable combination of actuating, locking and/or damping assemblies, so the specific embodiments discussed herein should not be construed as limiting and various suitable elements of various embodiments can be interchangeable with other embodiments or can be specifically absent in some embodiments.

Some embodiments can include a tracker system that comprises a fluidic actuator with flexible bladders to orient the tracker as desired by a control system; a locking mechanism which locks the tracker at a single position per lock (multiple lock points may be included within a single assembly); a locking mechanism which allows for passive locking, but requires active control to unlock; and an optional damper mechanism used to improve the stability of the tracker when unlocked.

One aspect of the present disclosure includes a locking and dampening system for solar trackers that can include a friction brake, pin brake, ratchet, or the like. One embodiment includes a linear actuator (including hydraulic, electric, solenoid, electric motor driven, or any other method of moving the suitable mechanism) that can drive one or more pawls which can engage and disengage a ratchet wheel. While some examples disclosed herein relate to pneumatic solar actuation, further embodiments can relate to any suitable type of solar trackers or can be applied in other suitable systems. Accordingly, the present disclosure should not be construed to be limiting.

Some embodiments increase the holding torque and re-engineer purlins to scale more effectively to longer spans, which in some examples can increase holding torque (e.g., locks of some sort); allow purlins to scale to longer spans more cost-effectively (e.g., closed sections), and the like.

In some examples, in systems with a plurality of tracker actuators one or more of such actuators can be replaced with locking and/or dampening assemblies as shown herein. The ratio and location of actuators to locking and/or dampening assemblies may be different than examples illustrated and described herein. In various embodiments, locking and/or dampening assemblies can be stiffer than actuators and have a lower cost.

In various embodiments, locking and/or dampening assemblies can include a lock and a bearing. The lock can be a friction brake (e.g., clasp, drum, strap, disc, or the like), pin brake, detent, eddy current damper, or a ratchet in some examples. Some examples include a single or bi-directional ratchet which allows movement towards flat. In some examples, locks can be driven by pneumatic actuators which may require additional fluidic harnesses and an update to tracker control systems. In some embodiments, the lock can comprise one or more dampers.

Locking and/or dampening assemblies of some examples can provide stiffness to a solar tracker, which can improve wind performance. Locking and/or dampening assemblies of some examples can provide increased stiffness, coupled with closed section purlins and can allow longer span lengths. Locking and/or dampening assemblies include a damper and/or a bearing.

In some embodiments a locking and/or dampening assembly can include a pneumatic linear actuator (e.g., piston or diaphragm), solenoid, or the like, which can drive one or more pawls which can engage and disengage a locking wheel or plate. An actuator and/or pawl assembly can be spring loaded so that the one or more pawls are normally engaged. When the one or more pawls are engaged, in some examples, the locking and/or dampening assembly will only allow the tracker to move towards flat, not away from flat; and once at flat, the tracker can be locked such that the tracker cannot move away from flat until the one or more pawls are disengaged.

In some embodiments of solar tracking, one or more ratchet pawls disengage to move, then re-engages when the movement is complete. In some embodiments, a wind stow functionality can include one or more ratchet pawls that remain engaged while the tracker moves towards flat, providing resistance to wind oscillations. In some examples, a power-off-stow can include, upon loss of power, a pawl that automatically engages (or stays engaged) and a crossover valve that drives the tracker to flat.

In some examples, internal pneumatics hardware can be reconfigured to actuate a lock. For example, interfaces can remain the same, with the exception of one additional harness tube (e.g., three per row instead of two). In various embodiments, pneumatics hardware can be reconfigured to reuse actuator interfaces to control the lock.

Some examples can provide reduced baseline product cost due to mechanical specialization (e.g., one or more pneumatic actuator drives movement and one or more locking and/or dampening assembly holds position of the solar tracker). For various examples, higher wind and snow loads can have less cost penalty, which can reduce constraint of the actuator needing high pointing accuracy under high load. Some examples can provide reduced design constraints related to bifacial modules including decreased shading, longer uninterrupted spans for improved structural optimization, or the like. Some examples can provide for reduced air consumption.

In some examples, pneumatic actuator holding torque can be low, which can cause dynamic behavior which then has to be mitigated in some way. Actuator internal stresses can be high due to high bladder pressures required for even moderate holding torque. This can make pneumatic actuators expensive. Accordingly, systems that support an actuator by providing resistance to external loading via a device paired with an actuator but not combined with it (e.g., various examples of a locking and/or dampening assembly) can be beneficial.

Increasing purlin spans may be difficult in some examples (e.g., limited by lateral buckling on long spans) and systems that provide for increased purlin spans (e.g., various examples of the locking and/or dampening assembly) can be beneficial. Maximizing or improving bifacial module performance can also be desirable.

Architecture of a system can have various suitable forms, including one actuator per post, no damping; one actuator per post, damping on adapter; one actuator per post, damping direct connection to actuator; one actuator per post+ brake; one actuator per post+brake; less than one actuator per post+brake, less than one actuator per post+dampers on non-actuator posts, less than one actuator per post+ratchet assemblies on non-actuator posts, and the like. Some examples can include various suitable purlins, torque tubes, and the like.

Brake systems in some examples can include a lock pin, clasp style brake, brake actuation with passive or active controls, and the like. Some embodiments can include augmenting an existing system with one or more additional pneumatic lines.

FIGS. 1a and 1b illustrate a respective top perspective and bottom perspective view of a solar tracker 100 in accordance with one embodiment 100A. FIG. 2 illustrates a side view of a solar tracker 100. As shown in FIGS. 1a, 1b and 2, the solar tracker 100 can comprise a plurality of photovoltaic cells 103 disposed along a length having axis $X_1$ and a plurality of fluidic actuator assemblies 101 configured to collectively move the array of photovoltaic cells 103. As shown in FIG. 1b, the photovoltaic cells 103 are coupled to rails 102 that extend along parallel axes $X_2$, which are parallel to axis $X_1$. Each of the plurality of actuators 101 extend between and are coupled to the rails 102, with the actuators 101 being coupled to respective posts 104. As shown in FIG. 2, the posts 104 can extend along an axis Z, which can be perpendicular to axes $X_1$ and $X_2$ in various embodiments.

Figure 44:
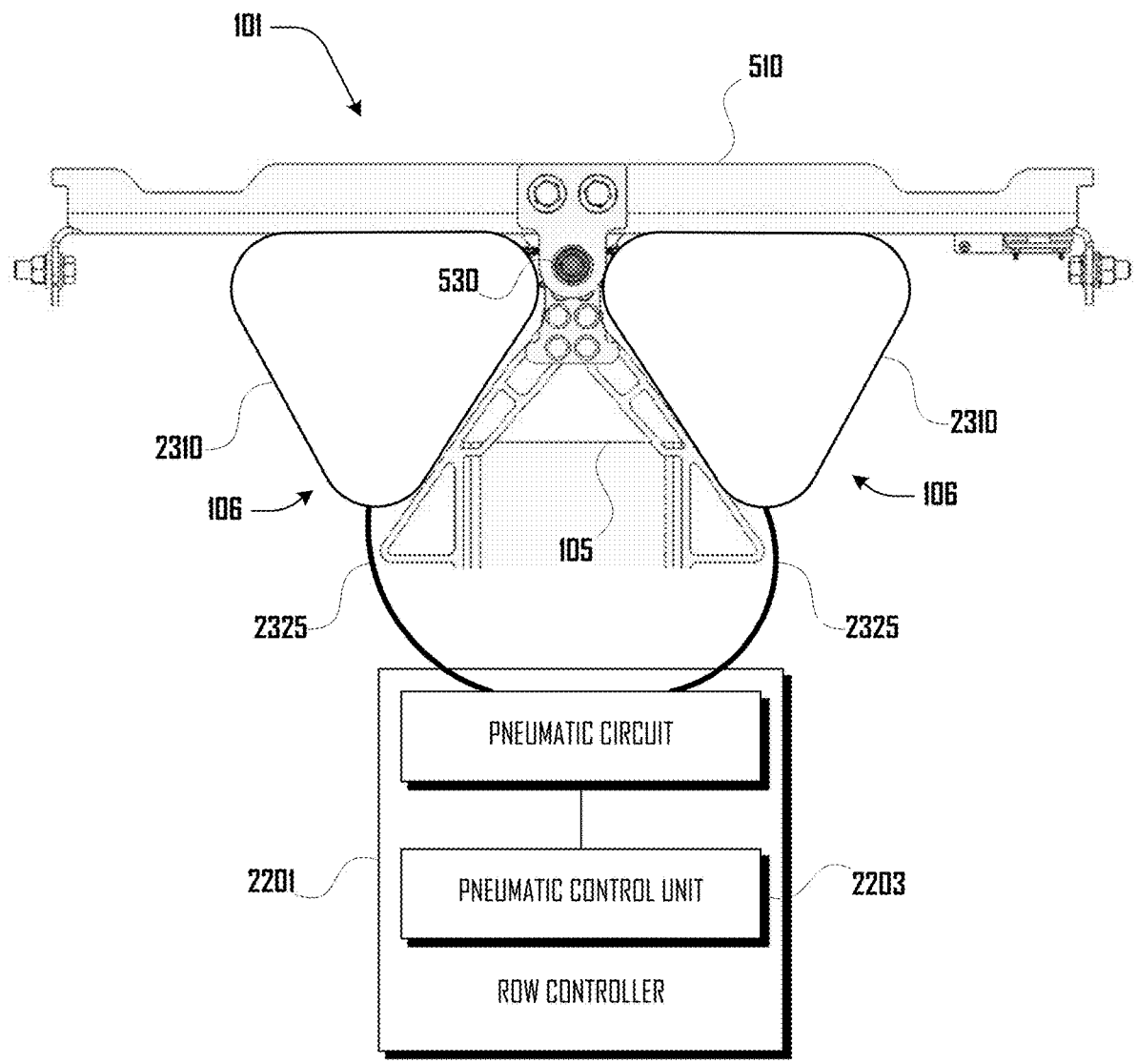
FIG. 44 illustrates an example embodiment of a fluidic actuation system having a pair of bladders coupled to a fluidic control system.
Figure 45A:
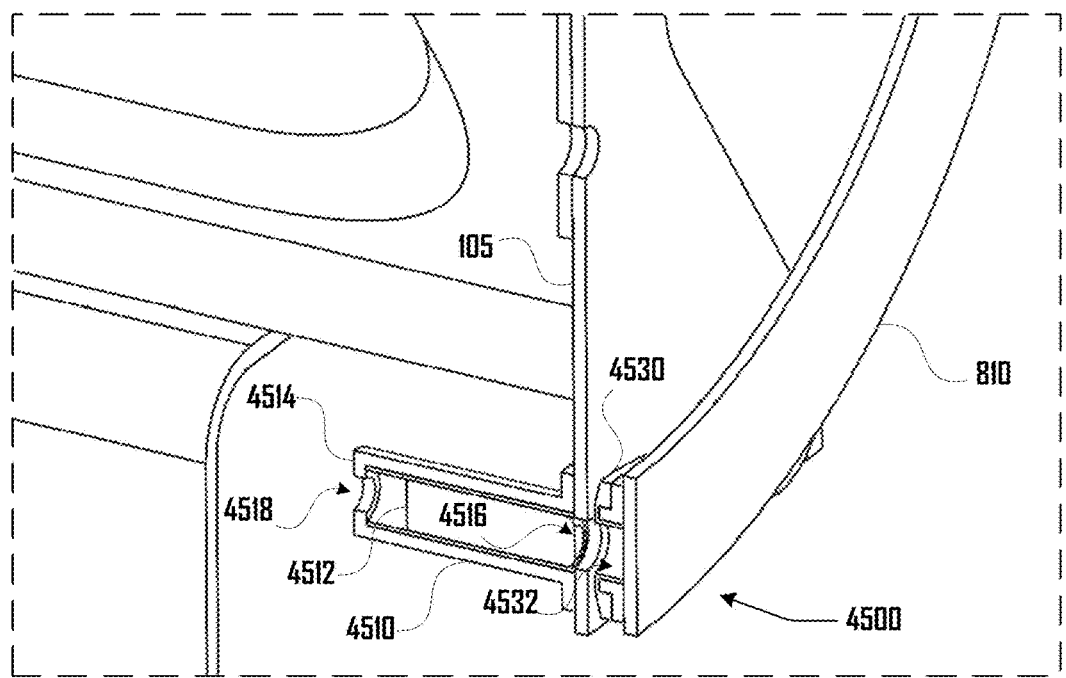
FIG. 45a illustrates a first perspective cross-sectional view of a pin lock system of one embodiment.
Figure 45B:
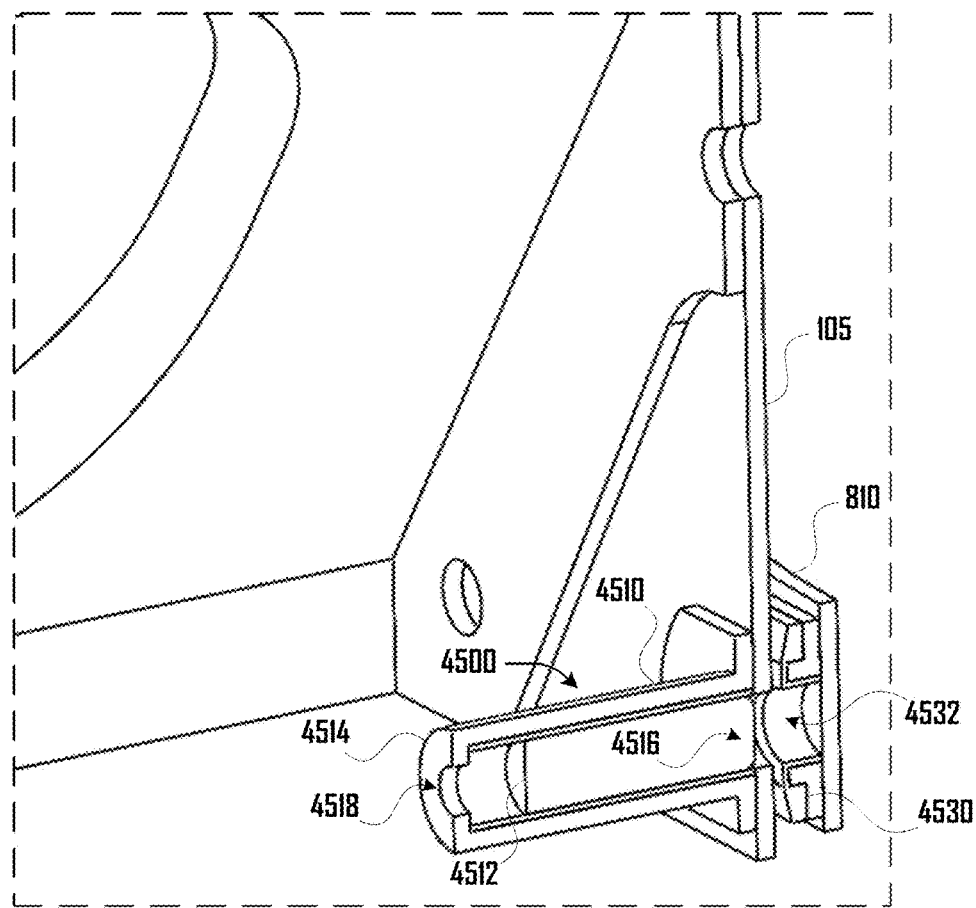

A fluidic actuator assembly 101 can comprise a bar 510 that is rotatably coupled to an angled base plate 105 via an axle 530, which defines cavities 106 on opposing sides of the base plate 105 defined by the bar 510 and respective side-faces of the base plate 105. A first and second bladder 2310 (also referred to herein as a "bellows", "inflatable actuator", and the like) are disposed within the respective cavities 106 and can engage the bar 510 and respective side-faces of the base plate 105. As shown and described in more detail herein the first and second bladders 2310 can be disposed antagonistically and can be can be selectively inflated and/or deflated to cause the bar 510 to rotate about the axle 530, which can cause the tracker 100 and associated panels 103 to rotate. Another embodiment of a fluidic actuator assembly is shown in FIG. 44.

Further examples of a fluidic actuator 101 are also shown in FIGS. 41a, 41b, 42a and 44 and shown and described in U.S. Non-Provisional application filed May 28, 2019 entitled "TUBULAR FLUIDIC ACTUATOR SYSTEM AND METHOD" having application Ser. No. 16/423,899.

As shown in FIG. 2, and discussed in more detail herein, the actuators 101 can be configured to collectively tilt the array of photovoltaic cells 103 based on an angle or position of the sun, which can be desirable for maximizing light exposure to the photovoltaic cells 103 and thereby maximizing, enhancing or optimizing electrical output of the photovoltaic cells 103. In various embodiments, the actuators 101 can be configured to move the photovoltaic cells 103 among a plurality of configurations as shown in FIG. 2, including a neutral configuration N where the photovoltaic cells 103 are disposed along axis Y that is perpendicular to axis Z. From the neutral configuration N, the actuators 101 can be configured to move the photovoltaic cells 103 to a first maximum tilt position A, to a second maximum tilt position B, or any position therebetween. In various embodiments, the angle between the neutral configuration N and the maximum tilt positions A, B can be any suitable angle, and in some embodiments, can be the same angle. Such movement can be used to position the photovoltaic cells 103 toward the sun, relative to an angle of the sun, to reflect light toward a desired position, or the like.

In one example embodiment as shown in FIGS. 1a and 1b, a solar tracker 100 can comprise a plurality of photovoltaic cells 103 that are collectively actuated by four actuators 101 disposed along a common axis. However, in further embodiments, a solar tracker 100 can comprise any suitable number of actuators 101 including one, two, three, four, five, six, seven, eight, nine, ten, fifteen, twenty, fifty, one hundred, or the like. Similarly, any suitable number of photovoltaic cells 103 can be associated with a solar tracker 100 in further embodiments. Also, any suitable size, shape or type of photovoltaic cells 103 can be associated with a solar tracker 100 in further embodiments. Additionally, while photovoltaic cells 103 are shown in example embodiments herein, in further embodiments, actuators 101 can be used to move various other objects or structures, including mirrors, reflectors, imaging devices, water purification devices, water collection devices, communications devices, and the like.

FIG. 3 illustrates examples of solar tracker arrays 300 having a plurality of solar trackers 100 arranged in a linearly aligned row on a portion of the ground 301 having increasing slopes in accordance with four respective example embodiments 300A, 300B, 300C, 300D. For example, the first embodiment 300A has the least slope and shows the trackers having posts 104 that are substantially the same length with the axis of the four solar trackers 100 conforming to the slope of the ground 301 and generally aligned along a common axis.

The second embodiment 300B shows pairs of solar trackers 100 aligned along a common axis that is perpendicular to the pull of gravity (or parallel to level ground), with the pairs being disposed at different axes at different heights above the ground 301. The third embodiment 300C shows solar trackers 100 aligned in parallel, but not coincident axes that are perpendicular to the pull of gravity (or parallel to level ground), with the solar trackers 100 each being disposed at different axes at different heights above the ground 301. The fourth embodiment 300D shows solar trackers 100 aligned in parallel, but not coincident axes, that are not perpendicular to the pull of gravity (or parallel to level ground), with the solar trackers 100 each being disposed at different axes at different heights above the ground 301.

In some examples, it can be desirable to tilt actuators 101 (see e.g., FIG. 2) of the solar trackers 100 to be perpendicular to the slope of the ground 301, while keeping posts 104 plumb to gravity. Accordingly, in some embodiments, a Z axis of an actuator 101 can be installed skew to a Z-axis of a post 104 associated with the actuator 101.

In various embodiments (including example embodiments discussed in more detail herein and in related patent application "PNEUMATIC ACTUATION CIRCUIT SYSTEM AND METHOD" having application Ser. No. 15/955,506, the solar trackers 100 of a solar tracker array 300 can be pneumatically or fluidically coupled via a pneumatic or fluidic system that can actuate the solar trackers 100 of the solar tracker array 300 in unison. In other words, the solar trackers 100 of the solar tracker array 300 can be driven collectively to have the same angle. However, in further embodiments, the actuators 101 can be any suitable type of actuator, such as an electric motor, or the like. Accordingly, the examples discussed herein relating to fluidic actuation should not be construed to be limiting on the wide variety of actuation systems for solar trackers that are within the scope of the present disclosure.

Additionally, while FIG. 3 shows solar tracker arrays 300 having solar trackers 100 aligned in linear rows, further embodiments can have tracker arrays 300 aligned in any suitable way, including an arc, a series of parallel rows, and the like. Additionally, in further embodiments, solar tracker arrays 300 can comprise any suitable number of solar trackers 100. Also, in some embodiments, a plurality of solar tracker arrays 300 can be configured into a solar tracker system. While some embodiments can include a movable solar tracker 100, further embodiments can include any suitable solar assembly, which can be movable, fixed tilt, static, or the like.

Some embodiments can include one or more of a ballasted actuator version with no bottom plate, a torque tube or a custom module mounting. Further embodiments can include an expanded web beam, comprising a web of an I-beam or C-channel that can be slit with three offset rows of slits and can be expanded like expanded metal to form triangular trusses in the web and a higher stiffness beam. In some embodiments, racking configurations can include torque tubes, c-channels, extruded aluminum sections, custom roll formed shapes, hot rolled steel sections, and the like. Still further embodiments can include ballast under the actuator modules to reduce the center of mass height, and such reduced center of mass height can lead to better tracking performance. Other embodiments can include a terrain-following tracker, which can comprise non-moment carrying racking connections to allow the tracker 100 to be installed with variable slope throughout the length of the tracker 100. Some embodiments can include any suitable damper and/or locking system, including a friction brake, pin brake, ratchet, centrifugal clutch, viscous damper, viscoelastic materials, friction damper, linear damper, rotary damper, eddy current damper, pneumatic cylinder, hydraulic cylinder, or the like.

For example, FIGS. 4a and 4b illustrate a respective top perspective and bottom perspective view of a solar tracker 100 in accordance with another embodiment 100B. As shown in FIGS. 4a and 4b, and similar to the embodiment 100A of FIGS. 1a and 1b, the solar tracker 100 can comprise a plurality of photovoltaic cells 103 disposed along a length having axis $X_1$ and a plurality of pneumatic actuators 101 configured to collectively move the array of photovoltaic cells 103. As shown in FIG. 4b, the photovoltaic cells 103 are coupled to rails 102 that extend along parallel axes $X_2$ (see FIG. 2), which are parallel to axis $X_1$. Each of the plurality of actuators 101 extend between and are coupled to the rails 102, with the actuators 101 being coupled to respective posts 104.

However, in contrast to the embodiment 100A of FIGS. 1a and 1b, the example embodiment 100B of FIGS. 4a and 4b comprises a plurality of locking-dampening assemblies 400. Each of the plurality of locking-dampening assemblies 400 extend between and are coupled to the rails 102, with the locking-dampening assemblies 400 being coupled to respective posts 104. As shown in the example of FIGS. 4a and 4b, the locking-dampening assemblies 400 are alternatingly disposed on respective posts 104 along the length of the solar tracker 100. However, in further embodiments, any suitable number or arrangement of locking-dampening assemblies 400 can be present. For example, there can be two, three, four, five actuators 101, or the like, between respective locking-dampening assemblies 400; there can be locking-dampening assemblies 400 at the ends of the solar tracker 100 with any suitable number of actuators 101 therebetween; there can be only one or two locking-dampening assemblies 400 in a solar tracker 100 regardless of the number of actuators 101; locking-dampening assemblies 400 can be disposed on adjacent posts 104; or the like.

Locking-dampening assemblies 400 can comprise various suitable elements in various suitable configurations. For example, in some embodiments, a tracker 100 can comprise various suitable elements that provide for locking and/or dampening of the tracker 100 with some examples having elements configured only for locking, some elements configured for only dampening and/or some elements configured for both locking and dampening. The use of the terms "locking" or "dampening" in reference to or associated with a given element or system should not be construed to imply that such an element or system in all embodiments is only configured for locking or dampening and should instead be construed to include the ability for both locking and dampening functionalities in some embodiments. In some embodiments, the terms "movement control", "rotation control", or the like can be used to describe elements, assemblies or systems that provide for locking and/or dampening functionalities.

For example, FIG. 5 illustrates an example locking and/or dampening portion 500 of a locking-dampening assembly 400 in accordance with one embodiment that includes a bar 510 that extends between and is coupled to the rails 102. The bar 510 is rotatably coupled to a central unit 520 via an axle 530 and the central unit 520 is coupled with a post 104. In some embodiments, the axle 530 can define an axis of rotation that is parallel to axis $X_1$ (see FIGS. 4a and 4b); coincident with a rotational axis of one or more other locking-dampening assemblies 400; and/or coincident with an axis of rotation of the solar tracker 100 or one or more actuators 101 of the solar tracker 100.

A cylinder 540 can be coupled to the bar 510 at a first send 541 and coupled to the post 104 at a second end 542 with the cylinder 540 comprising a shaft 543 that translates within a body 544. For example, in some embodiments, the cylinder 540 can comprise a fluidic cylinder that provides dampening and/or locking of rotation of the bar 510 about the central unit 520, which can provide for dampening and/or locking of rotation of the tracker 100 and photovoltaic cells 103. For example, the cylinder 540 can provide resistance to changes in wind and can reduce undesirable oscillations of the solar tracker 100. Such a cylinder 540 can be passive in some examples, so no additional controls or fluidic harnesses may be required in some embodiments for operation of the cylinder 540; however, in some embodiments such a cylinder 540 can be actively operated such as the examples of FIGS. 29, 30a, 30b, 31a, 31b, 32 and 33, which are discussed in more detail herein. In various embodiments, one or more cylinders 540 can operate with any suitable fluid including gas and/or liquid, of any suitable type.

In some embodiments, the cylinder 540 can be coupled to various suitable alternative locations of the solar tracker 100, such as a rail 102, or the like. Also, further embodiments can comprise a plurality of cylinders 540 (e.g., a pair of cylinders 540 coupled on opposing sides of the bar 510). Additionally, in various embodiments, other suitable dampening elements can be present in alternative or addition to a cylinder 540. In some embodiments, one or more pneumatic cylinder 540 can be connected to a pneumatic harness and controlled, such that the pneumatic cylinder 540 works to position the tracker 100 (e.g., in addition or in place of actuators 101 as discussed herein), as well as provide resistance to changes in the wind, reducing undesirable oscillations, and the like. Various suitable cylinders 540 can be used, such as a cylinder with 2.5" bore×16" stroke.

Figure 6A:
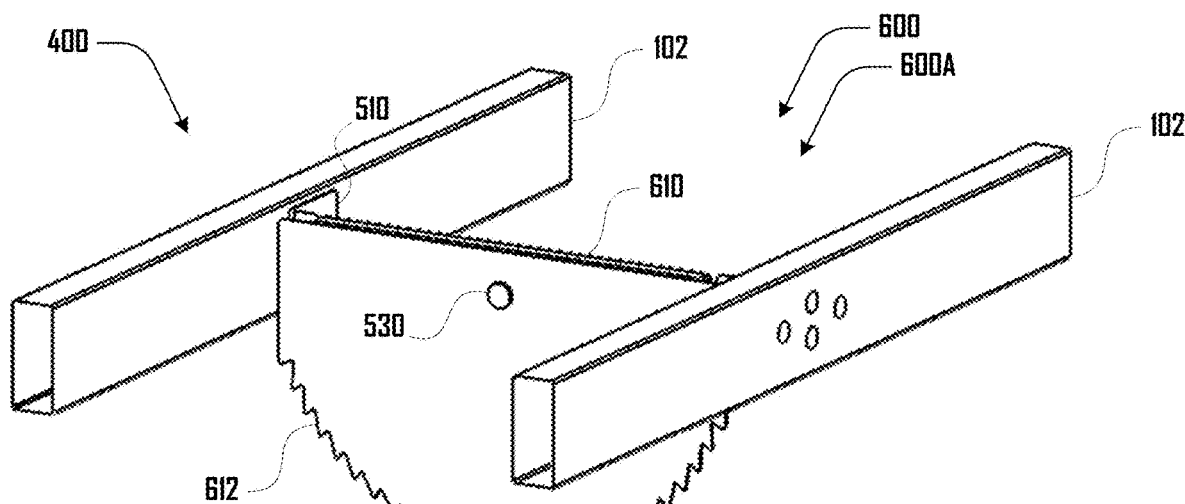
FIGS. 6a and 6b illustrate a ratchet assembly of a locking-dampening assembly in accordance with one embodiment, which includes a gear plate and a pawl assembly.
Figure 6B:
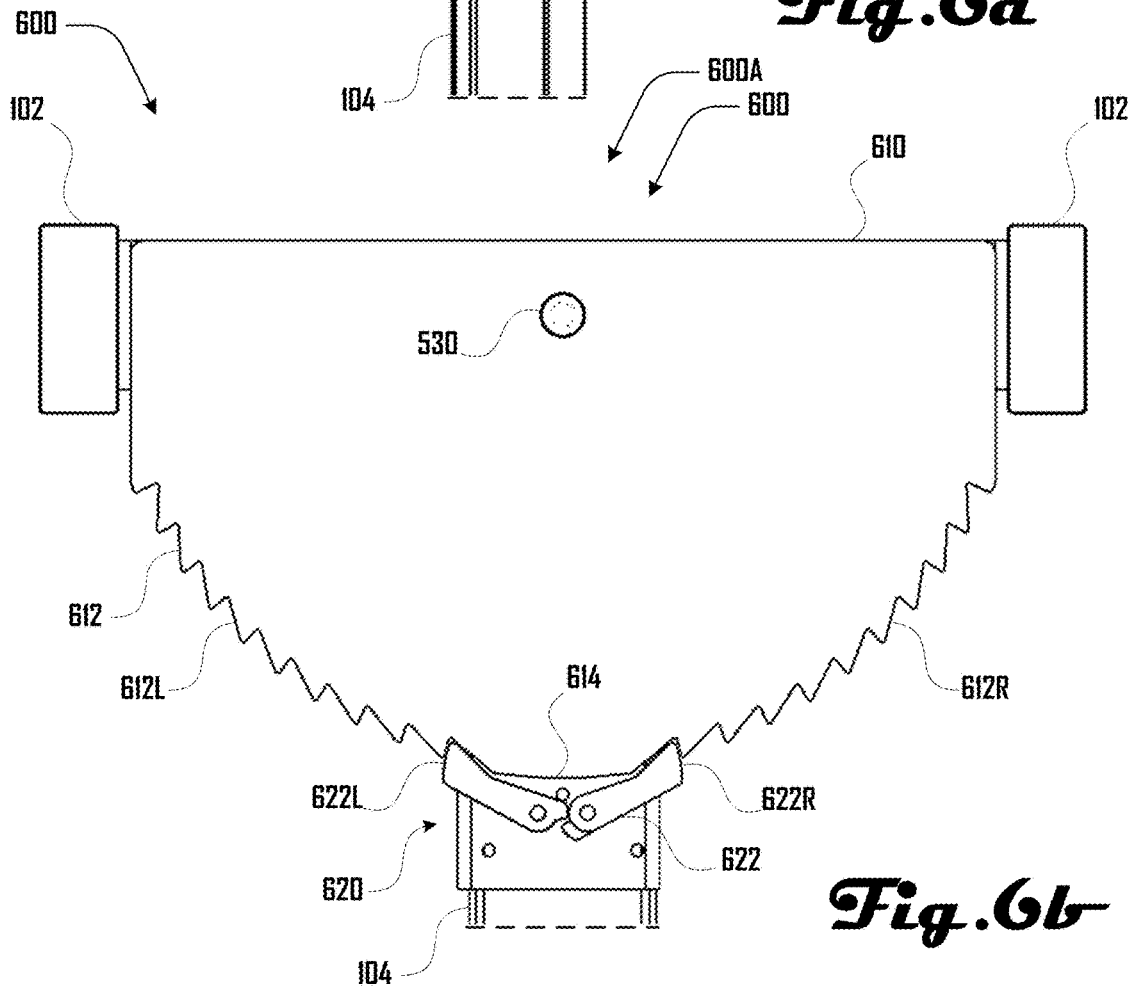

Turning to FIGS. 6a and 6b, a rotation control assembly 600 of a locking-dampening assembly 400 in accordance with one embodiment 600A is illustrated, which includes a gear plate 610 and a pawl assembly 620. The gear plate 610 defines a plurality of teeth 612 along a bottom arc of the gear plate 610, including a left and right set of teeth 612L, 612R disposed on opposing sides of a central flat apex 614. The rotation control assembly 600 can further include a pawl assembly 620 that includes a left and right pawl 622L, 622R that are configured to engage the teeth 612 along the bottom arc of the gear plate 610. In some embodiments, the left pawl 622L can be configured to only engage with the left set of teeth 612L and the right pawl 622R can be configured to only engage with the right set of teeth 612R.

In various examples, the rotation control assembly 600 can be configured to lock a solar tracker 100 in a flat configuration; allow the solar tracker 100 to freely tilt left and/or right; allow the solar tracker 100 to move toward a flat configuration without substantial additional back-tilting; and the like.

For example, FIG. 7a illustrates an example locked-flat configuration of the rotation control assembly 600 of FIGS. 6a and 6b, where the left and right pawls 622L, 622R are respectively engaged with the first tooth of the left and right set of teeth 612L, 612R on opposing sides of the central flat apex 614. Such a configuration can lock the solar tracker 100 and photovoltaic cells 103 of the solar tracker 100 in a flat configuration where the photovoltaic cells 103 are perpendicular to the post 104 and/or generally parallel with the ground and the tracker is unable to rotate. In some examples, the locked-flat configuration can be desirable for tracker stow during high-wind events; in the event that the tracker 100 experiences pressure or power loss; and the like.

FIG. 7b illustrates an example unlocked configuration of the rotation control assembly 600 where the left and right pawls 622L, 622R are respectively retracted such that the left and right pawls 622L, 622R are unable to engage the left and right set of teeth 612L, 612R on opposing sides of the central flat apex 614. Such a configuration can allow the tracker 100 and photovoltaic cells 103 to freely tilt left/right, east/west, or the like (see, e.g., FIG. 2). Such a configuration can be desirable for normal operation of the solar tracker 100 where the solar tracker 100 rotates to track the position of the sun over time.

FIG. 7c illustrates an example ratchet-to-flat configuration of the rotation control assembly 600 where the solar tracker is tilted left and where the left and right pawls 622L, 622R are biased toward the bottom arc of the gear plate 610 such that the left pawl 622L is engaging the left set of teeth 612L such that the left pawl 622L can engage the left set of teeth 612L such that the solar tracker 100 can move freely toward the flat configuration (see FIG. 7a), but the engaged left pawl 622L prevents the solar tracker from tilting further left. The right pawl 622R in this left-tilt configuration would not prevent rotation toward flat if the right pawl 622R is biased against the left set of teeth 612L or biased against the central flat apex 614 as shown in FIG. 7c. However, when reaching the flat configuration, the right pawl 622R can engage the first tooth of the right set of teeth 612R to lock the tracker 100 in the flat configuration (see FIG. 7a).

Similarly, where tracker 100 is tilted to the right (i.e., the opposite of what is shown in FIG. 7c, the right pawl 622R can engage the right set of teeth 612R such that the right pawl 622R can engage the right set of teeth 612R such that the solar tracker 100 can move freely toward the flat configuration (see FIG. 7a), but the engaged right pawl 622R prevents the solar tracker from tilting further right. The left pawl 622L in this right-tilt configuration would not prevent rotation toward flat if the left pawl 622L is biased against the right set of teeth 612R or biased against the central flat apex 614. However, when reaching the flat configuration, the left pawl 622L can engage the first tooth of the left set of teeth 612L to lock the tracker 100 in the flat configuration (see FIG. 7a). In some examples, the ratchet-to-flat configuration can be desirable for tracker stow during high-wind events; in the event that the tracker experiences pressure or power loss; and the like, by allowing the tracker to ratchet toward the flat locked position without continuing to rotate further left/right or east/west.

For example, in various embodiments, the tracker 100 can operate in the unlocked configuration as shown in FIG. 7a, where the pawls 622 do not contact the gear plate 610 and the tracker 100 is allowed to freely rotate as necessary to track the position of the sun. However, when a stow event occurs (e.g., high wind event, power loss, night-time, or the like), the pawls 622 can be biased toward the gear plate 610 (e.g., as shown in FIG. 7b) such that the tracker 100 can ratchet toward the flat and locked configuration as shown in FIG. 7c, regardless of whether the tracker 100 is tilted left or tilted right.

In some examples, a locking-dampening assembly 400, rotation control assembly 600, or the like can be configured to withstand a maximum wind speed of 40 mph, 50 mph, 60 mph, 70 mph, 80 mph, 90 mps, 100 mph, 110 mph, 120 mph and the like, at any tracker angle. In other words, in some examples a locked configuration or ratchet-to-flat configuration can be configured to withstand such a maximum wind speed without disengaging of the configuration or breaking of parts that maintain such a configuration.

Turning to FIGS. 8a and 8b, a rotation control assembly 600 of a locking-dampening assembly 400 in accordance with another embodiment 600B is illustrated, which includes a gear plate 810 coupled to a bar 510 along with a pawl assembly 820 and pawl actuator 830. The gear plate 810 defines a plurality of teeth 812 along a bottom arc of the gear plate 810, including a left and right set of teeth 812L, 812R disposed on opposing sides of a central slot 814. The rotation control assembly 600 of this embodiment 600B can further include a pawl assembly 820 that includes a pawl 822 disposed at an end of a rod 824 that is actuated by pawl actuator 830, with the rod 824 being held between a pair of guides 826 coupled to the central unit 520. The pawl 822 at the end of the rod 824 can be configured to engage the teeth 812 along the bottom arc of the gear plate 810 and the central slot 814. In some embodiments, the pawl actuator 830 and/or pawl assembly 820 can be biased (e.g., spring loaded) so that the pawl 822 is normally engaged.

In various embodiments, the central unit 520 can be defined by at least one central unit plate 521. As shown in the Example of FIGS. 8a and 8b, the at least one central unit plate 521 can define a plate cavity 522 on which the pawl actuator 830 can be disposed on a bridge 524 defined by the at least one central unit plate 521.

In various examples, the rotation control assembly 600 can be configured to lock a solar tracker 100 in a flat configuration; allow the solar tracker 100 to freely tilt left and/or right; allow the solar tracker 100 to move toward a flat configuration without substantial additional back-tilting; and the like, as discussed herein.

Figure 9A:
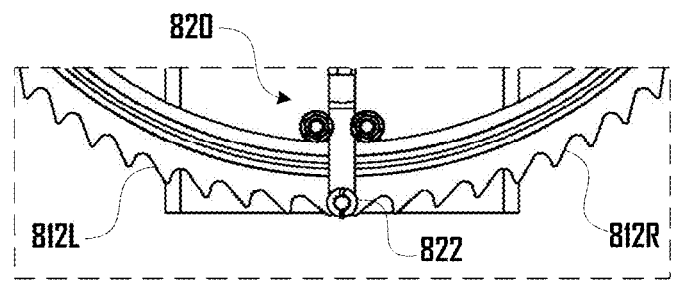
FIG. 9a illustrates an example locked-flat configuration of the ratchet assembly of FIGS. 8a and 8b, where the pawl is engaged with the central slot.

For example, FIGS. 9a, 9b, 9c and 9d illustrate various example configurations of the embodiment 600B of the rotation control assembly 600 of FIGS. 8a and 8b. For example, FIG. 9a illustrates an example locked-flat configuration of the rotation control assembly 600B of FIGS. 8a and 8b, where the pawl 822 is engaged with the central slot 814. Such a configuration can lock the solar tracker 100 and photovoltaic cells 103 of the solar tracker in a flat configuration where the photovoltaic cells 103 are perpendicular to the post 104 and/or generally parallel with the ground and the tracker is unable to rotate. In some examples, the locked-flat configuration can be desirable for tracker stow during high-wind events; in the event that the tracker experiences pressure or power loss; and the like.

Figure 9B:
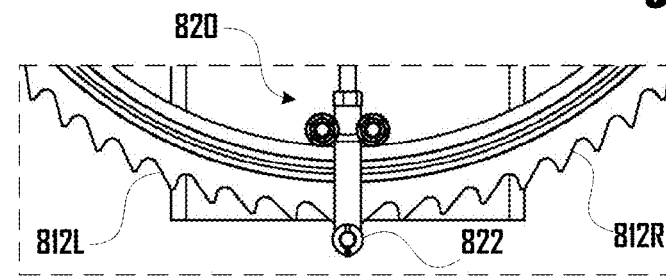
FIG. 9b illustrates an example unlocked configuration of the ratchet assembly where the pawl is retracted from the central slot.
Figure 9C:
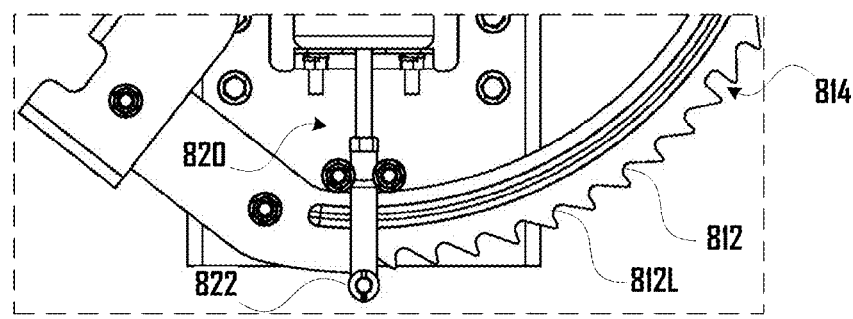
FIG. 9c illustrates an example unlocked configuration of the ratchet assembly where the bar and gear plate have tilted to the left and where the pawl is retracted from the central slot.

FIG. 9b illustrates an example unlocked configuration of the rotation control assembly 600B where the pawl 822 is retracted from the central slot 814. Such a configuration can allow the tracker 100 and photovoltaic cells 103 to freely tilt left/right, east/west, or the like (see, e.g., FIG. 2). Such a configuration can be desirable for normal operation of the solar tracker 100 where the solar tracker 100 rotates to track the position of the sun over time. FIG. 9c illustrates an example unlocked configuration of the rotation control assembly 600B where bar 510 and gear plate 810 have tilted to the left and where the pawl 822 is retracted from the central slot 814.

Figure 9D:
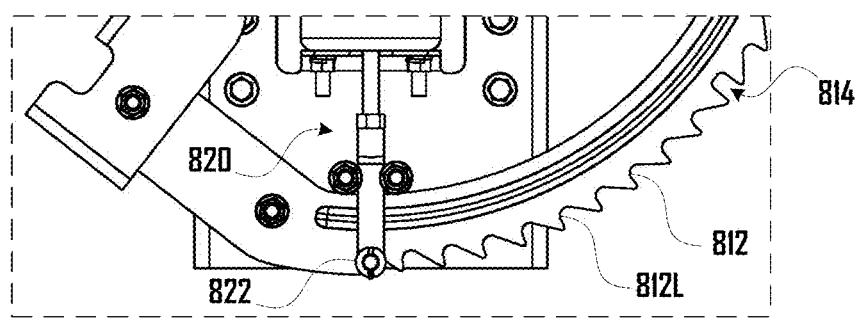
FIG. 9d illustrates an example ratchet-to-flat configuration of the ratchet assembly where the solar tracker is tilted left and where the pawl is biased toward the bottom arc of the gear plate such that the solar tracker can move freely toward the flat configuration, but the engaged pawl prevents the solar tracker from tilting further left.
Figure 11B:
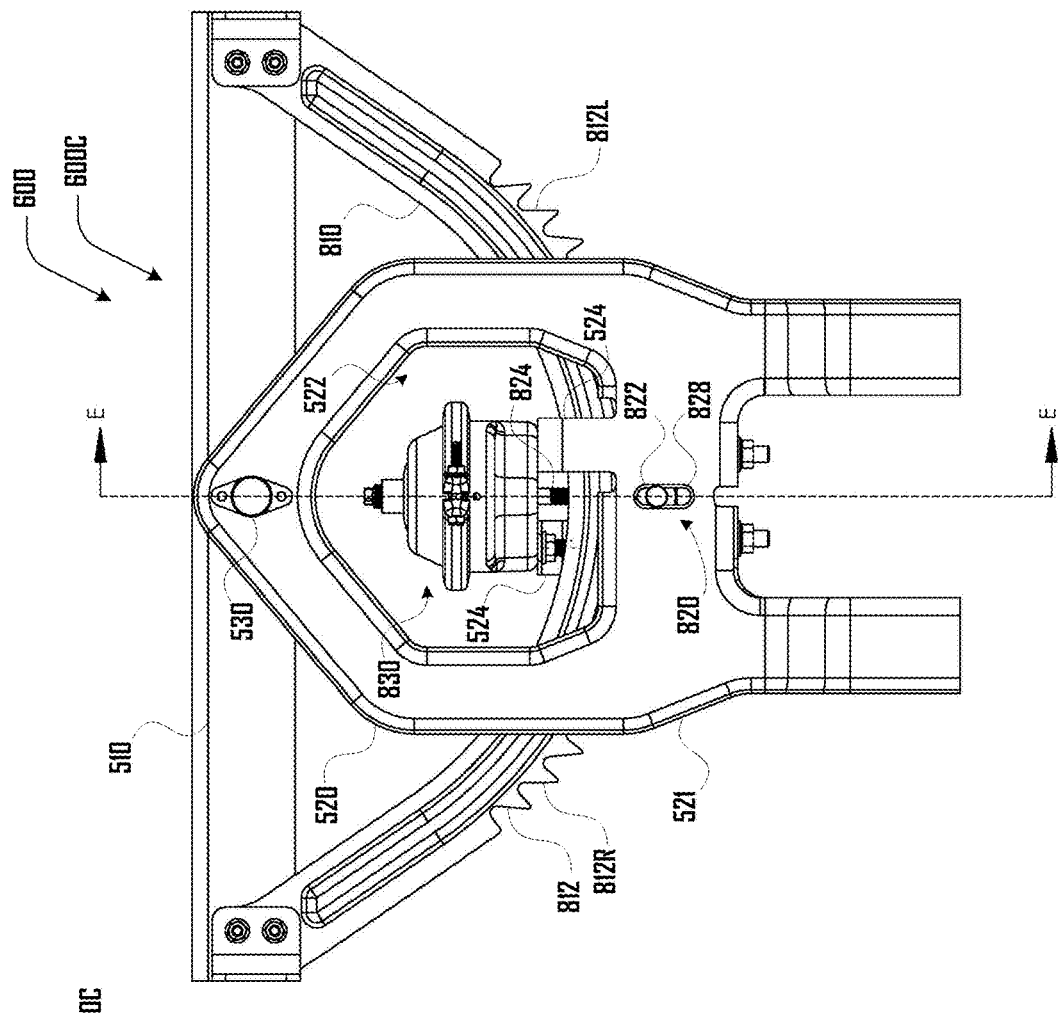
Figure 11A:
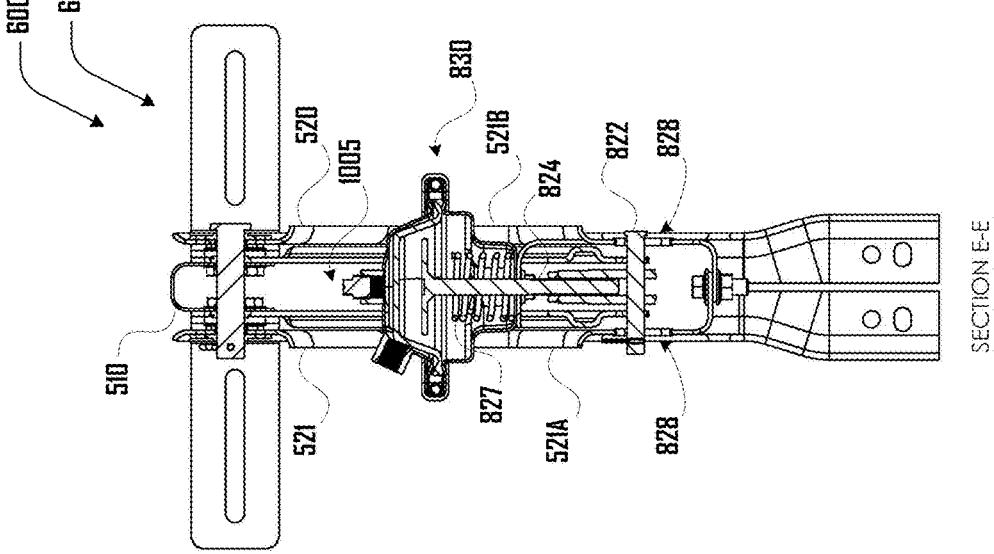
FIG. 11a illustrates a cross-sectional side view of the locking-dampening assembly of FIGS. 10a and 10b.
Figure 12A:
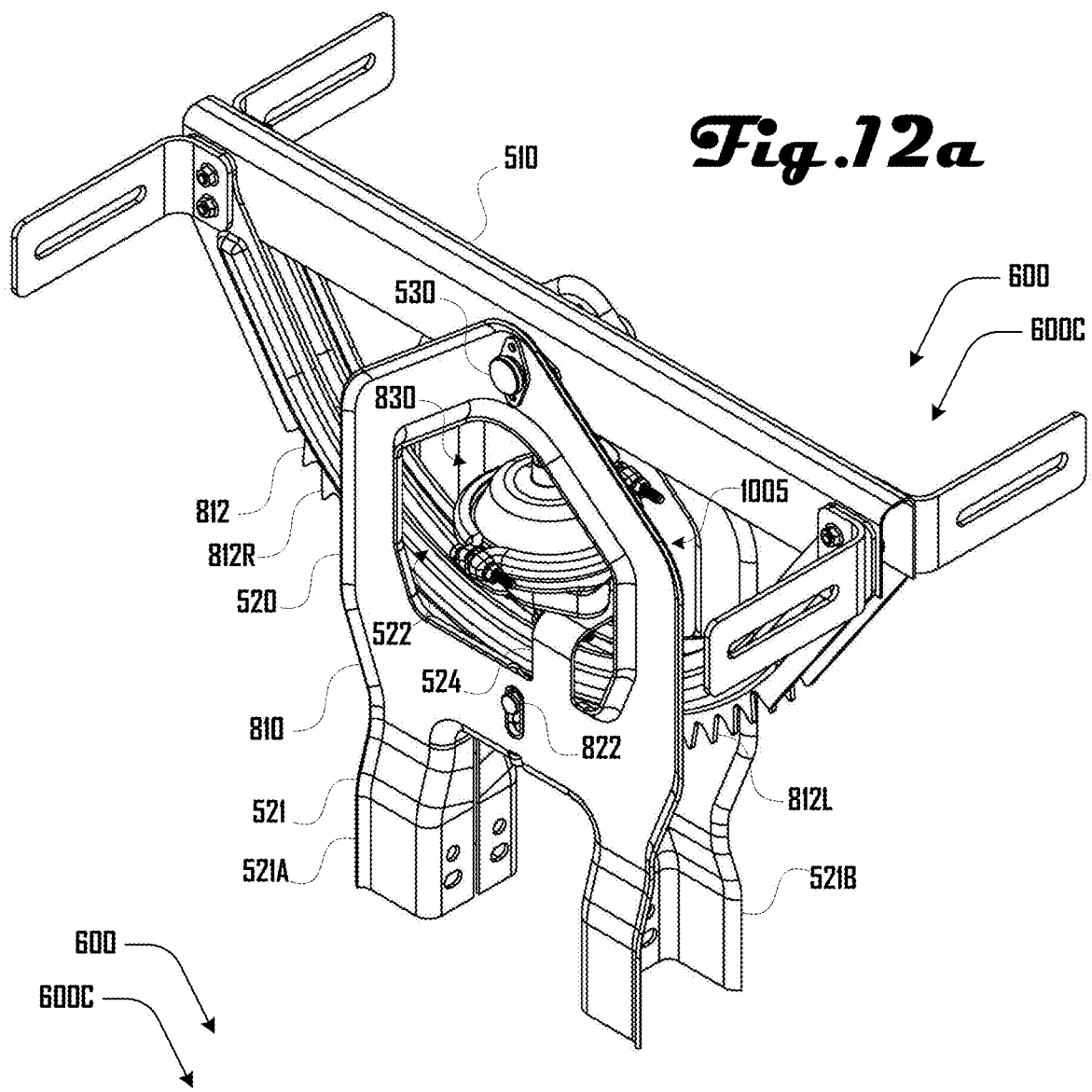
FIG. 12a illustrates a perspective view of the locking-dampening assembly of FIGS. 10a, 10b, 11a and 11b.
Figure 12B:
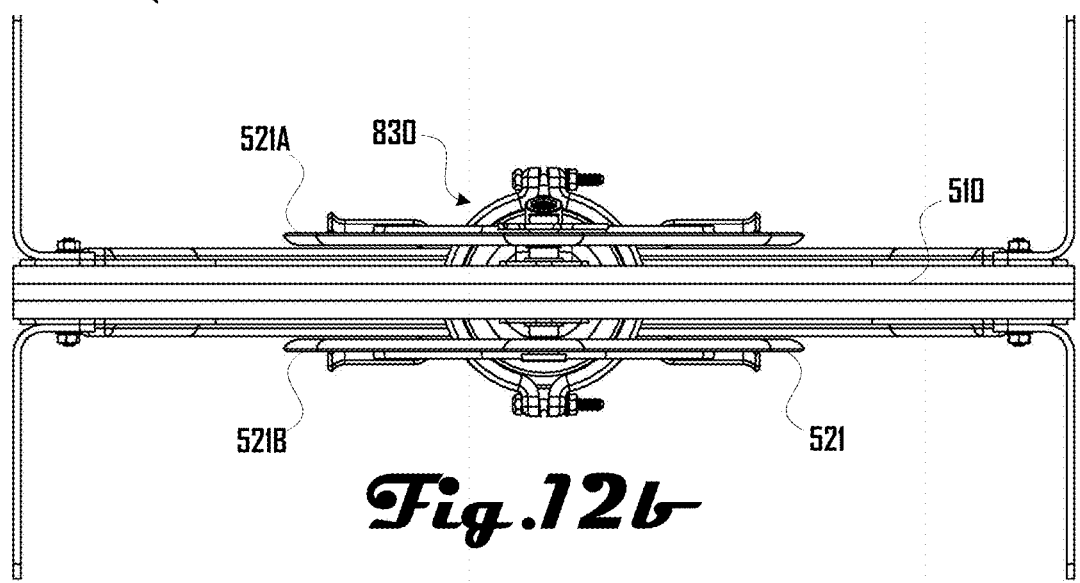
Figure 13:
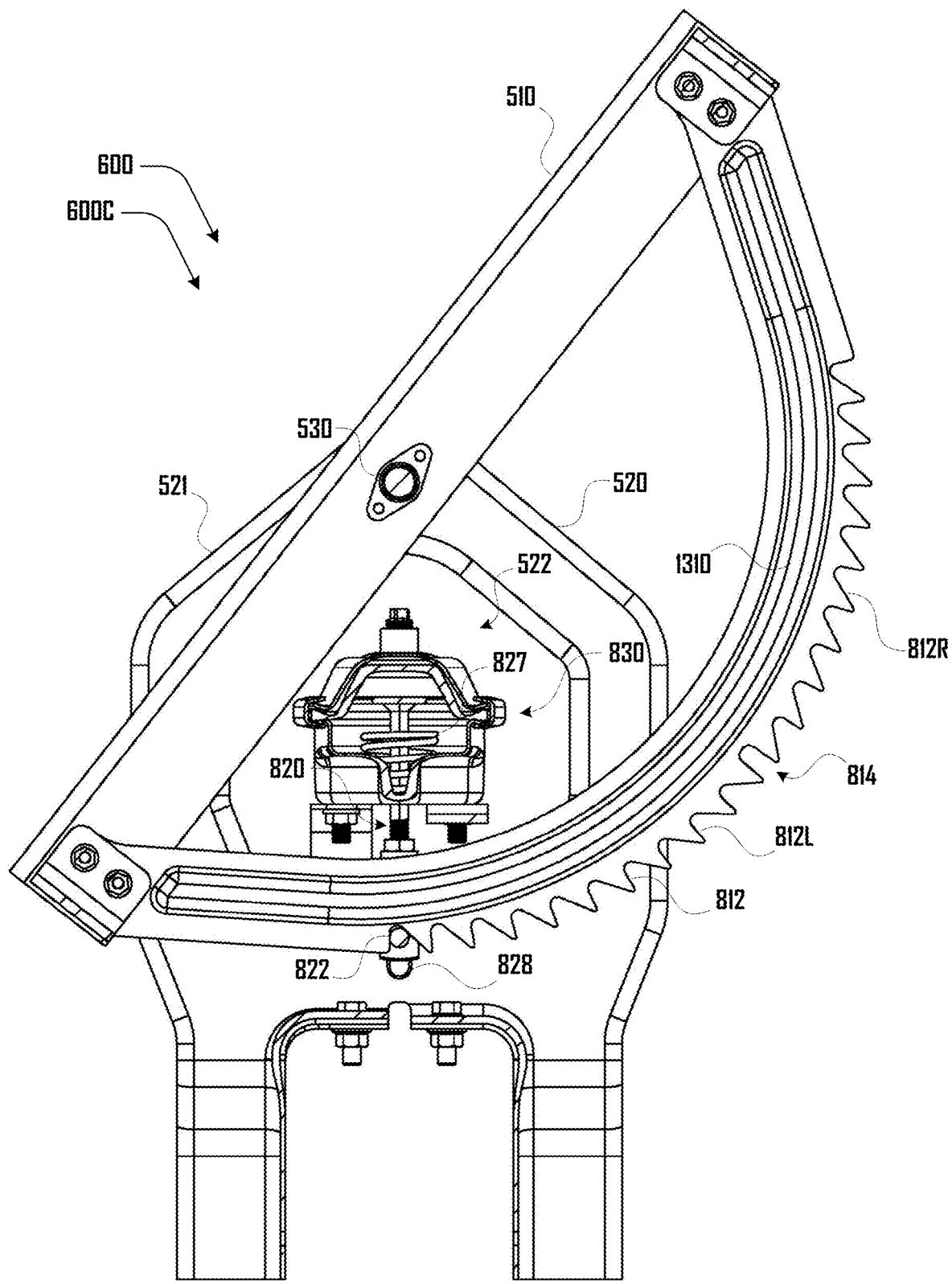
FIG. 13 illustrates a cut-away front view of the locking-dampening assembly of FIGS. 10a, 10b, 11a, 11b, 12a and 12b in a tilted configuration.
Figure 14A:
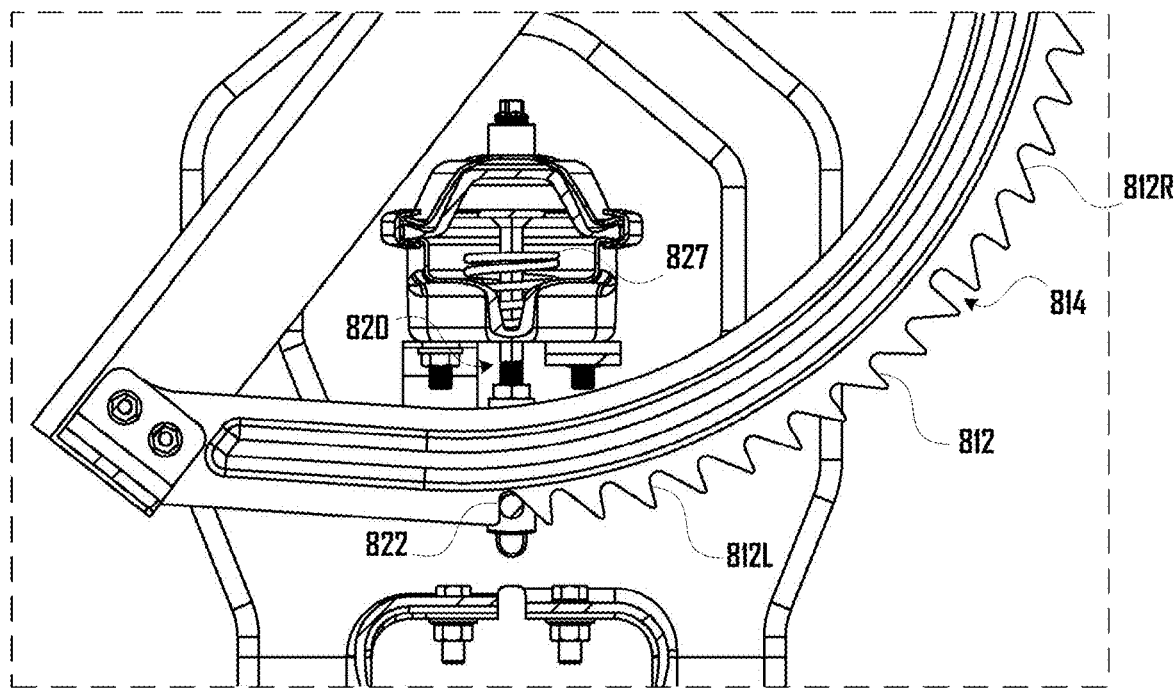
FIG. 14a illustrates a close-up view of the pawl assembly shown in FIG. 13 where the solar tracker is tilted left and where the pawl is biased toward the bottom arc of the gear plate such that the solar tracker can move freely toward the flat configuration.
Figure 14B:
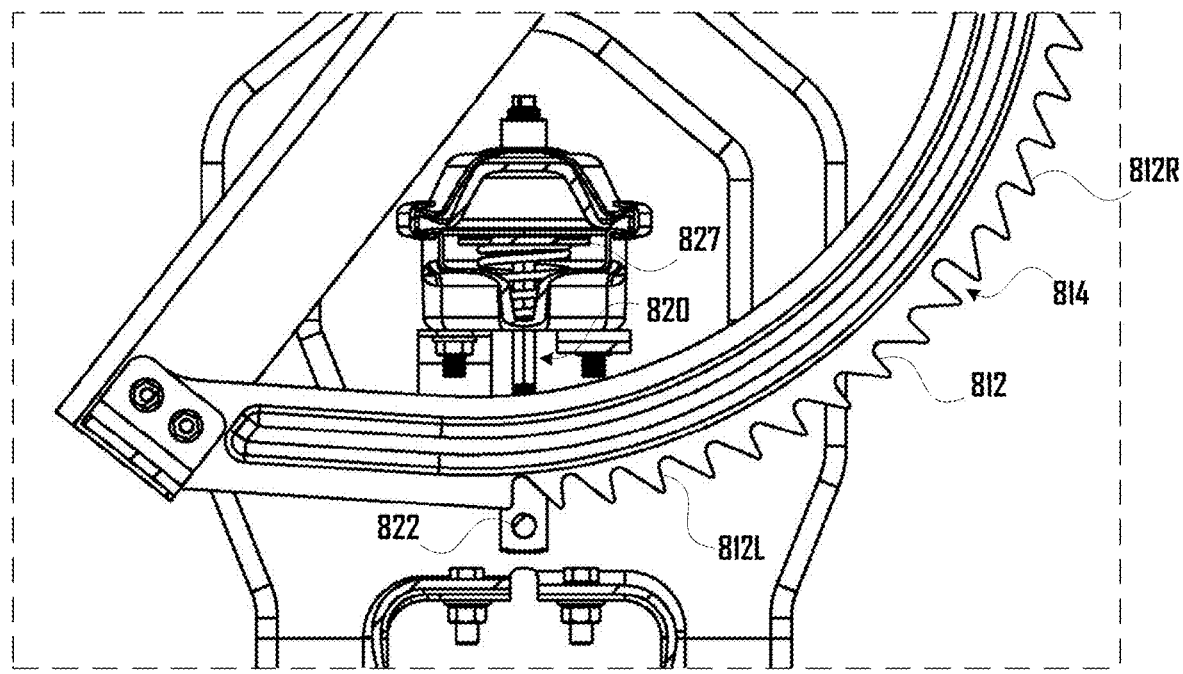
FIG. 14b illustrates a close-up view of the pawl assembly shown in FIGS. 13 and 14a where the solar tracker is tilted left and where the pawl is actuated away from the bottom arc of the gear plate such that the solar tracker can tilt left or right.

FIG. 9d illustrates an example ratchet-to-flat configuration of the rotation control assembly 600B where the solar tracker 100 is tilted left and where the pawl 822 is biased toward the bottom arc of the gear plate 810 such that pawl 822 is engaging the left set of teeth 812L such that the pawl 822 can engage the left set of teeth 812L such that the solar tracker 100 can move freely toward the flat configuration (see FIG. 9a), but the engaged pawl 822L prevents the solar tracker 100 from tilting further left. When reaching the flat configuration, the pawl 822R can engage the central slot 814 to lock the tracker 100 in the flat locked configuration (see FIG. 9a).

Similarly, where the tracker 100 is tilted to the right (i.e., the opposite of what is shown in FIGS. 9c and 9d), the pawl 822 can engage the right set of teeth 812R such that the pawl 822 can engage the right set of teeth 812R such that the solar tracker 100 can move freely toward the flat configuration (see FIG. 9a), but the engaged pawl 822 prevents the solar tracker from tilting further right. When reaching the flat configuration, the pawl 822R can engage the central slot 814 to lock the tracker 100 in the flat locked configuration (see FIG. 9a).

Turning to FIGS. 10a, 10b, 11a, 11b, 12a, and 12b, a rotation control assembly 600 of a locking-dampening assembly 400 in accordance with another embodiment 600C is illustrated, which includes a gear plate 810 coupled to a bar 510 along with a pawl assembly 820 and pawl actuator 830. The gear plate 810 defines a plurality of teeth 812 along a bottom arc of the gear plate 810, including a left and right set of teeth 812L, 812R disposed on opposing sides of a central slot 814. The rotation control assembly 600 of this embodiment 600C can further include a pawl assembly 820 that includes a pawl 822 disposed at an end of a rod 824 that is actuated by pawl actuator 830. The pawl 822 at the end of the rod 824 can be slidably held within a slot 814 defined by the gear plate 810 and can be configured to engage the teeth 812 along the bottom arc of the gear plate 810 and the central slot 814.

In some embodiments, the pawl actuator 830 and/or pawl assembly 820 can be biased (e.g., spring loaded) so that the pawl 822 is normally engaged. For example, as shown in FIGS. 10b, 13, 14a and 14b, the pawl actuator 830 can include a spring 827 that can bias the pawl 822.

Further embodiments can include various suitable mechanisms for locking a tracker 100 in a flat configuration (e.g., as shown in FIGS. 8b, 9a, 10b, and the like). One embodiment can include a pawl 822 that engages with a central slot 814 as discussed herein. Another embodiment can include a two-way latch (e.g., a butterfly fork latch) that allows a bar to enter the latch from two opposing sides, where the bar can be held within the latch and prevented from leaving.

Figure 35A:
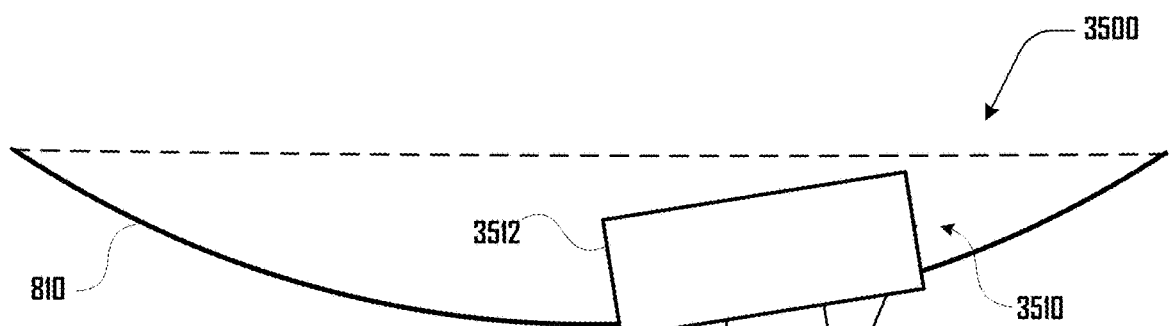
FIG. 35a illustrates an embodiment of a latch system with a gear plate with a latch assembly configured to rotate toward a latch bar, with FIG. 35a showing the latch assembly on the right side of the latch bar.
Figure 35B:
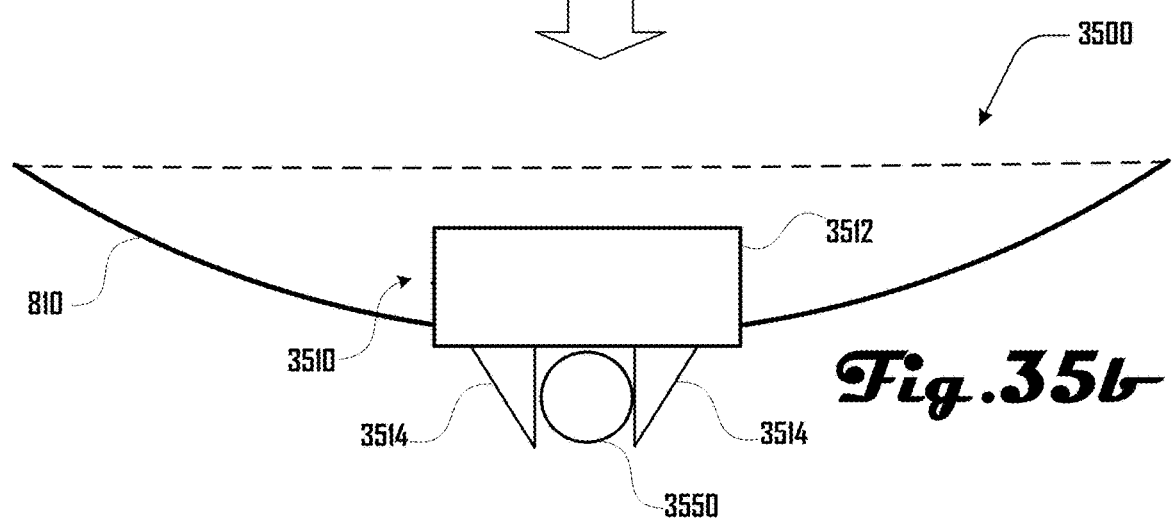
FIG. 35b illustrates the embodiment of the latch system of FIG. 35a with the latch bar being held within a latch slot of the latch assembly.
Figure 35C:
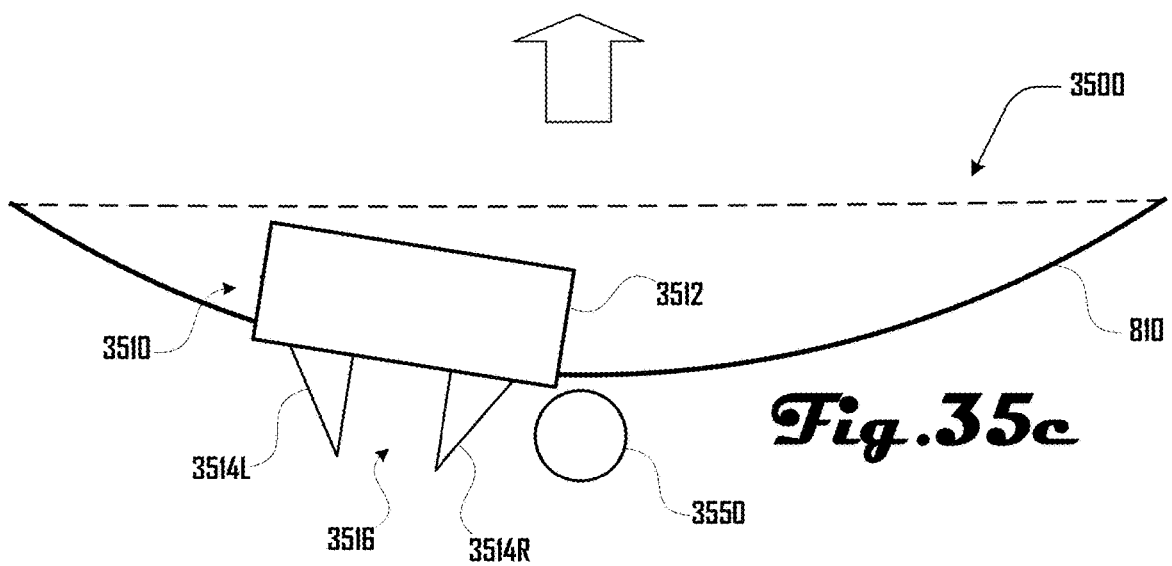
FIG. 35c illustrates the embodiment of the latch system of FIGS. 35a and 35b with the latch assembly on the left side of the latch bar.

For example, FIGS. 35a-c illustrate an example embodiment of a latch system 3500 with gear plate 810 that comprises a latch assembly 3510 that is configured to rotatably couple with a latch bar 3550. In this example, the latch assembly 3510 comprises a housing 3512 and a pair of latch arms 3514 that define a latch slot 3516. The latch arms 3514 can be configured to rotate, retract, or the like, when engaged by the latch bar 3550 on a peripheral face of the latch arms 3514, which allows the latch bar 3550 to enter the latch slot 3516 and moving latch arm 3514 to return to an original configuration such that the latch bar 3550 is held within the latch slot 3516. Such a latch assembly 3510 can allow a tracker 100 to automatically lock at flat.

For example, the gear plate 810 can be configured to rotate with the latch assembly 3510 on the left and right side of the latch bar 3550 as shown in FIGS. 35a and 35c. Using FIG. 35a as an initial example, the latch assembly 3510 can be on the right side of the latch bar 3550 and the gear plate 810 can rotate (e.g., via an axel 530) such that a left latch arm 3514L engages the latch bar 3550, which causes the left latch arm 3514L to move (e.g., rotate, retract, or the like) until the latch bar 3550 enters and is held within the latch slot 3516 as shown in FIG. 35b. Alternatively, the latch assembly 3510 can be on the left side of the latch bar 3550 as shown in FIG. 35c and the gear plate 810 can rotate such that a right latch arm 3514R engages the latch bar 3550, which causes the right latch arm 3514R to move (e.g., rotate, retract, or the like) until the latch bar 3550 enters and is held within the latch slot 3516 as shown in FIG. 35b. In some embodiments, the latch bar 3550 can comprise or act as a pawl (e.g., pawl 822), and in some embodiments, the latch assembly 3510 can be present in place of or in addition to elements such as a central slot 814, or the like.

Figure 23:
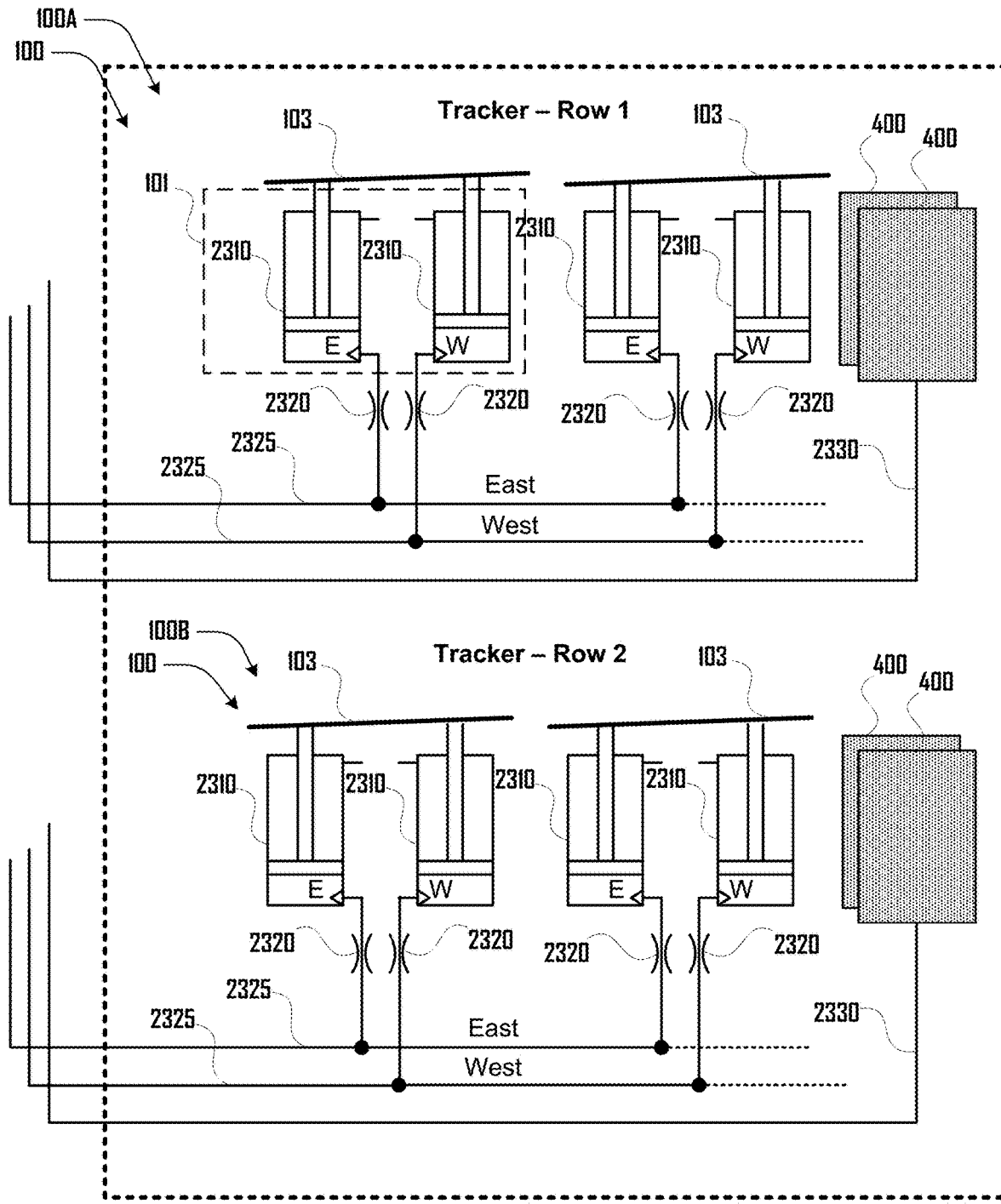
FIG. 23 is an exemplary illustration of a set of solar tracker rows, including a first row and second row and a set of locking-dampening assemblies.

In various embodiments, the latch bar 3550 can be configured to be retracted or otherwise moved out of the latch slot 3516 or the latch bar 3550 can be disposed in a retracted configuration such that the latch bar 3550 does not engage the latch assembly 3510 when the latch assembly 3510 rotates in proximity to the latch bar 3550 as discussed above. Such a configuration of the latch bar 3550 can allow an automatic lock at flat feature to be disabled or can release the tracker 100 from being locked at flat such as shown in FIG. 35b. Retracting or moving the latch bar 3550 can be done in various suitable ways such as moving the latch bar 3550 downward and out of the latch slot 3516 (e.g., similar to as shown in FIGS. 9a-c) or retracting the latch bar 3550 out a side of the latch slot 3516 (e.g., perpendicular to the plane of the view of FIGS. 35a-c). In some examples, latch arms 3514 can be forced down by gravity, a spring, centrifugal force, passive mechanism, or the like. In some embodiments, the latch arms 3514 can be biased (e.g., spring loaded) toward an extended or retracted configuration. Control methods for actuation of the latch bar 3550 can include one or more of: direct tracker controller operation via an independent fluidic control channel (e.g., fluidic tubing 2330 as shown in FIG. 23); a solenoid controlled via wired and/or wireless communication or triggered via a fluidic input, or the like.

In various embodiments, the latch bar 3550 can be any suitable shape such as round, square, trapezoidal, or any other suitable shape. Additionally, in various embodiments, each latch assembly 3510 and latch bar 3550 can define a single locking position. Further embodiments can include additional locking positions based on the presence of additional latch assemblies 3550 and/or additional latch bars 3550. For example, one latch assembly 3510 and one latch bar 3550 can define one locked position; one latch assembly 3510 with the latch bars 3550 can define up to three lock positions; three latch assemblies 3510 and three latch bars 3550 can define up to nine lock positions; and the like.

Figure 36A:
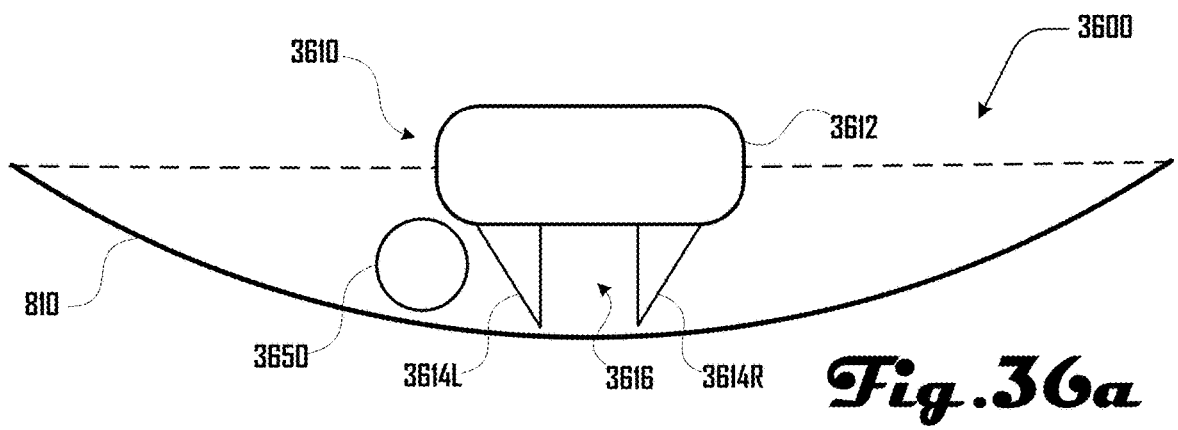
FIG. 36a illustrates another embodiment of a latch system with a latch bar disposed on a gear plate, with FIG. 36a showing the latch bar on the left side of the latch assembly.
Figure 36B:
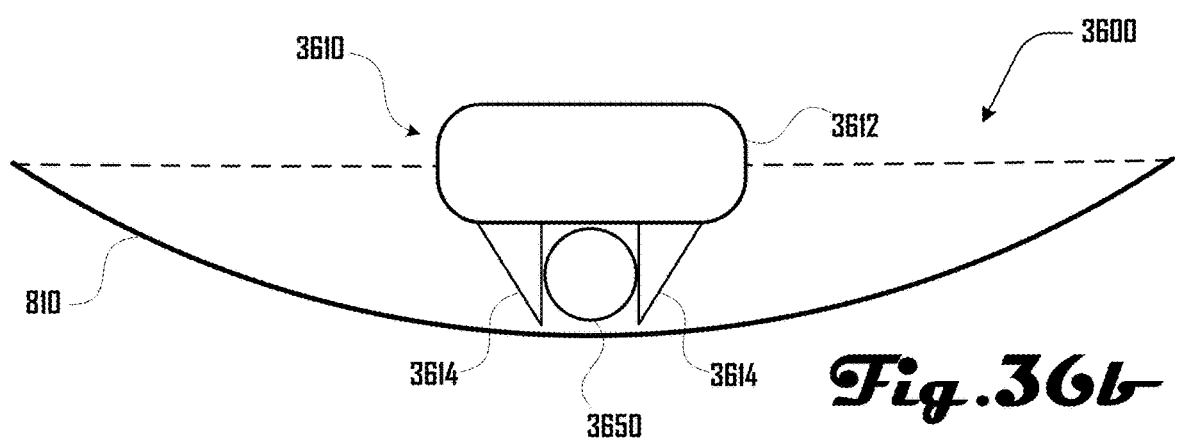
FIG. 36b illustrates the embodiment of the latch system of FIG. 36a with the latch bar being held within a latch slot of the latch assembly.
Figure 36C:
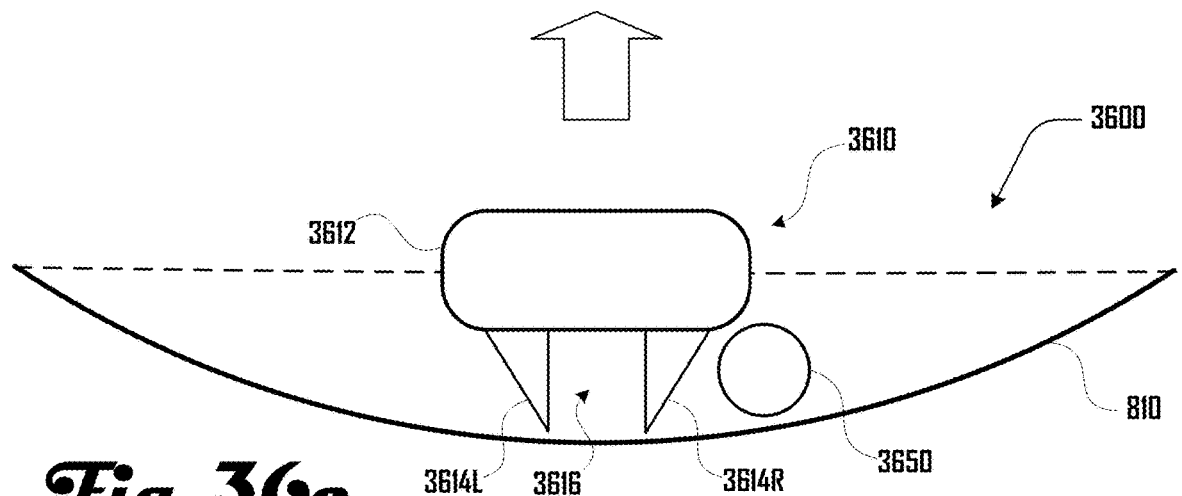
FIG. 36c illustrates the embodiment of the latch system of FIGS. 36a and 36b with the latch bar on the right side of the latch assembly.

In another example, FIGS. 36a-c illustrate another example embodiment of a latch system 3600 with a gear plate 810 that comprises a latch assembly 3610 that is configured to rotatably couple with a latch bar 3650. In this example, the latch assembly 3610 comprises a housing 3612 and a pair of latch arms 3614 that define a latch slot 3616. The latch arms 3614 can be configured to rotate, retract, or the like, when engaged by the latch bar 3650 on a peripheral face of the latch arms 3614, which allows the latch bar 3650 to enter the latch slot 3616 and moving latch arm 3614 to return to an original configuration such that the latch bar 3650 is held within the latch slot 3616. Such a latch assembly 3610 can allow a tracker 100 to automatically lock at flat.

For example, the latch bar 3650 can be disposed on the gear plate 810 and the gear plate 810 can be configured to rotate (e.g., via an axel 530) with the latch bar 3650 on the left and right side of the latch assembly 3610 as shown in FIGS. 36a and 36c. Using FIG. 36a as an initial example, the latch bar 3650 can be on the left side of the latch assembly 3610 and the gear plate 810 can rotate such that a left latch arm 3614L engages the latch bar 3650, which causes the left latch arm 3614L to move (e.g., rotate, retract, or the like) until the latch bar 3650 enters and is held within the latch slot 3616 as shown in FIG. 36b. Alternatively, the latch bar 3650 can be on the right side of the latch assembly 3610 as shown in FIG. 36c and the gear plate 810 can rotate such that a right latch arm 3614R engages the latch bar 3650, which causes the right latch arm 3614R to move (e.g., rotate, retract, or the like) until the latch bar 3650 enters and is held within the latch slot 3616 as shown in FIG. 36b. In some embodiments, the latch assembly 3610 can be present in place of or in addition to elements such as a central slot 814, or the like.

Figure 37A:
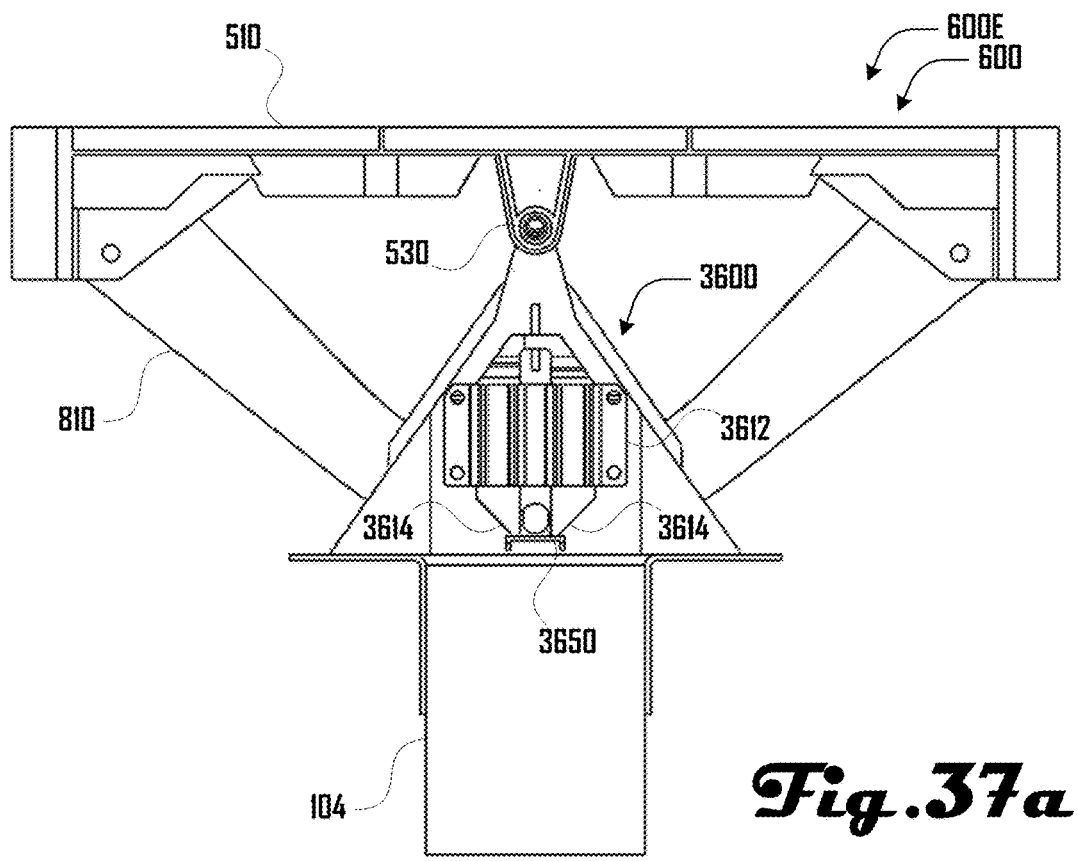
FIG. 37a illustrates a side view of an embodiment of a locking system disposed on a post and comprising the latch system of FIGS. 36a-c.
Figure 37B:
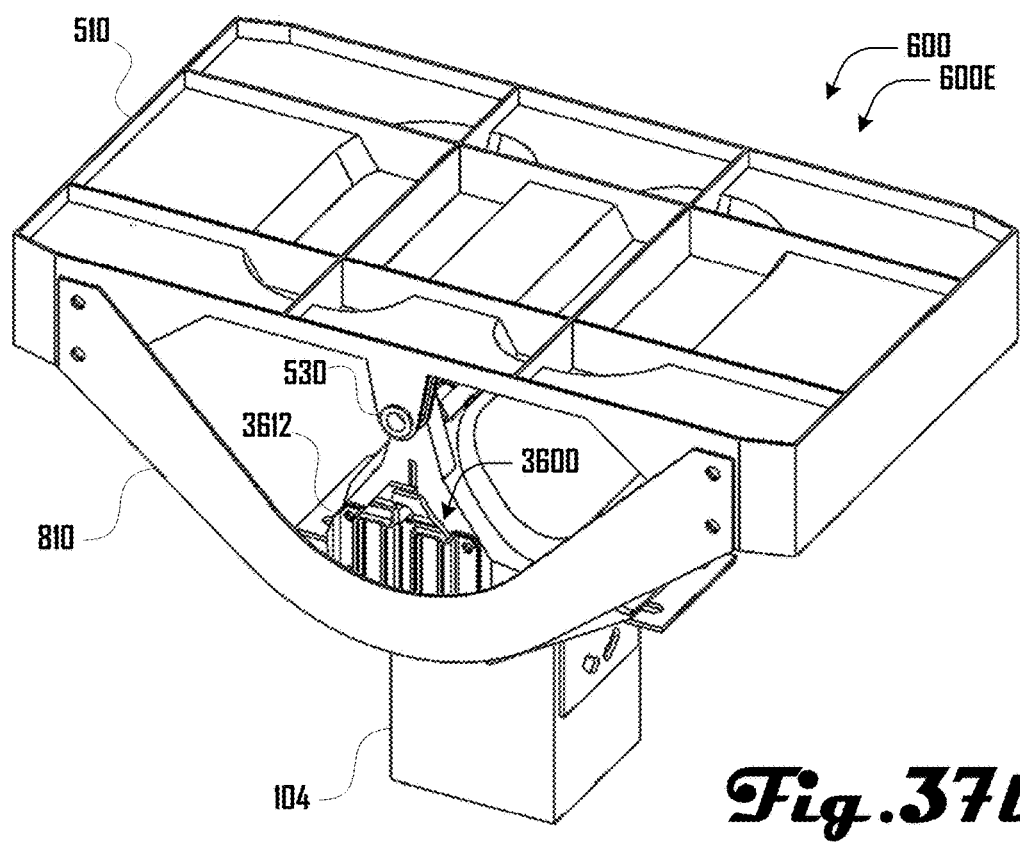
Figure 38A:
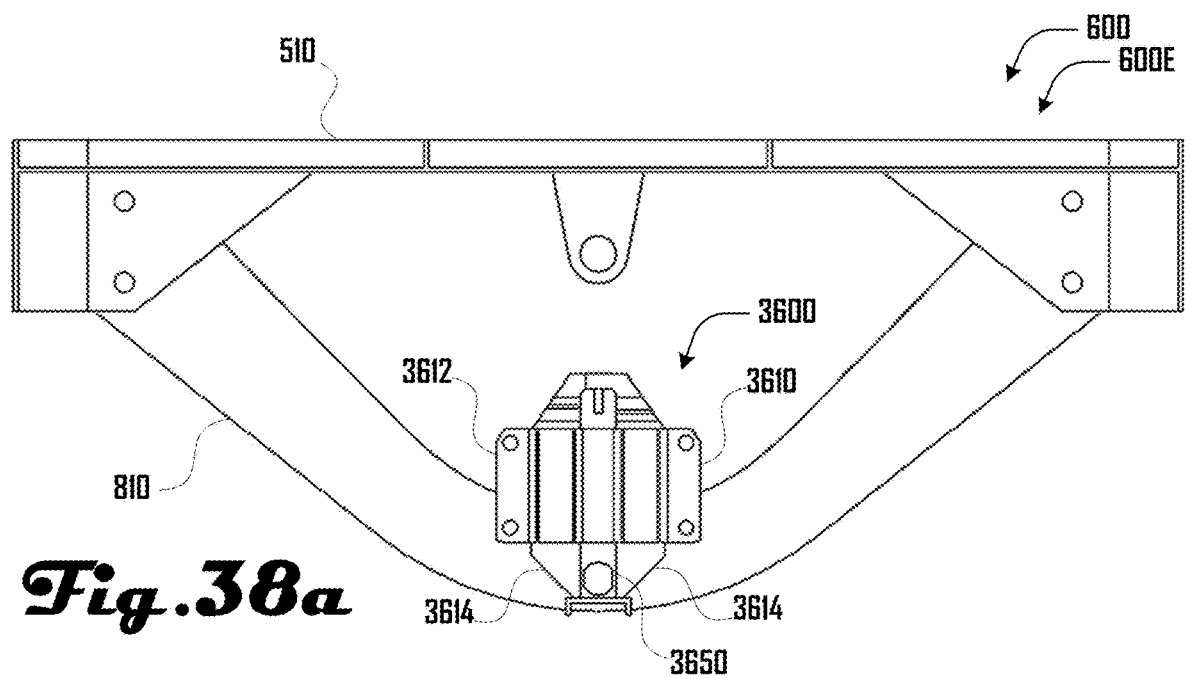
FIG. 38a illustrates a side view of a portion of the locking system of FIGS. 37a and 37b.
Figure 38B:
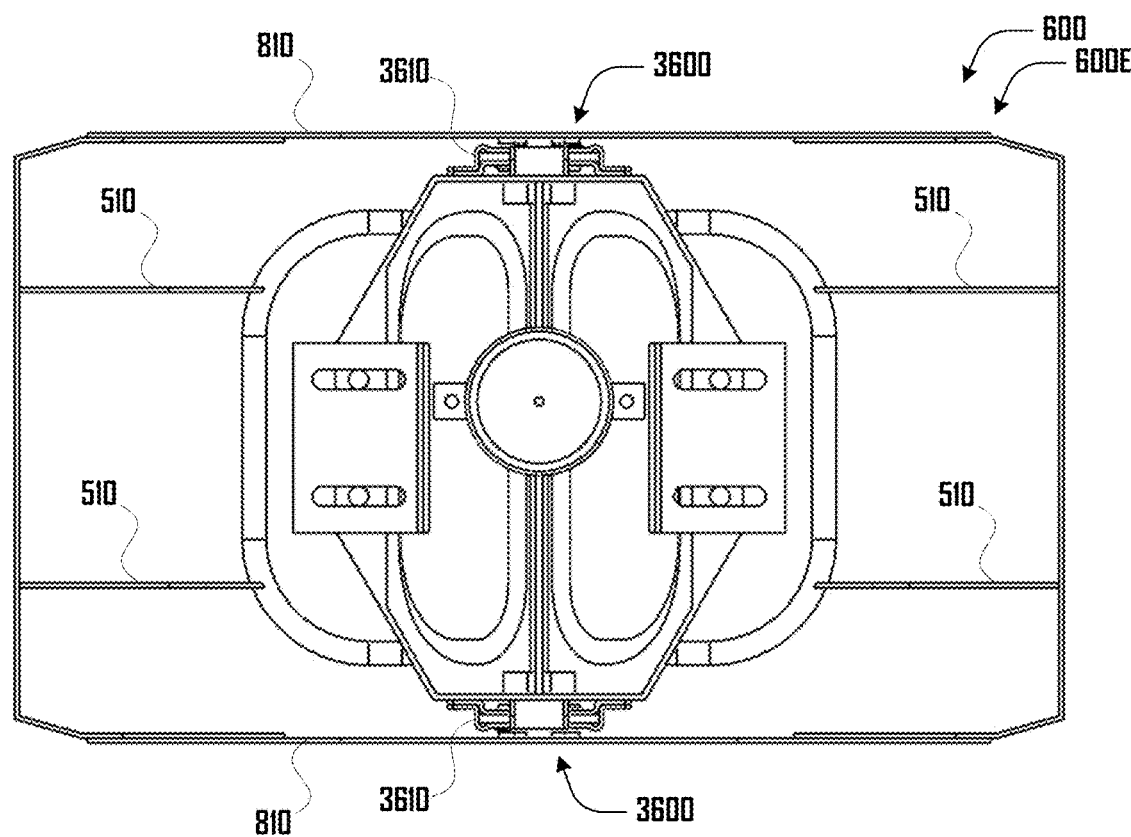
FIG. 38b illustrates a bottom view of the locking system of FIGS. 37a and 37b.
Figure 39A:
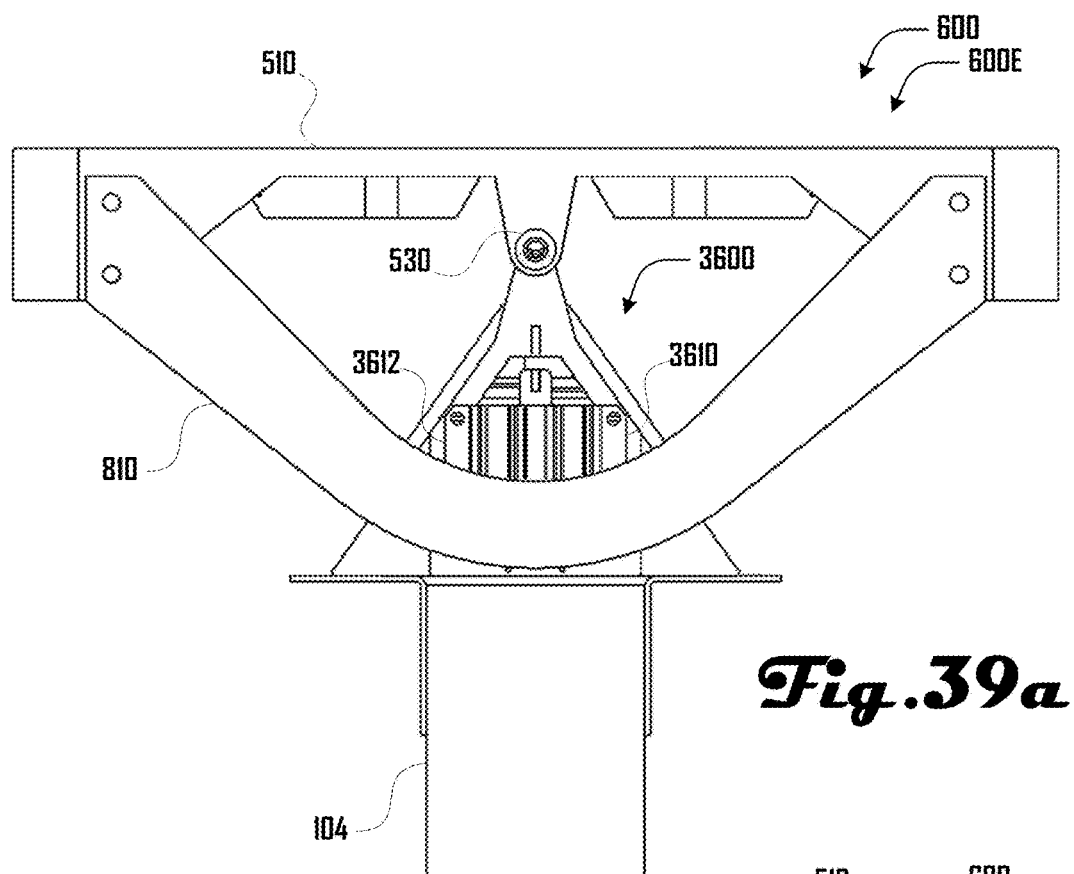
FIG. 39a illustrates another side view of the locking system of FIGS. 37a, 37b and 38b.
Figure 39B:
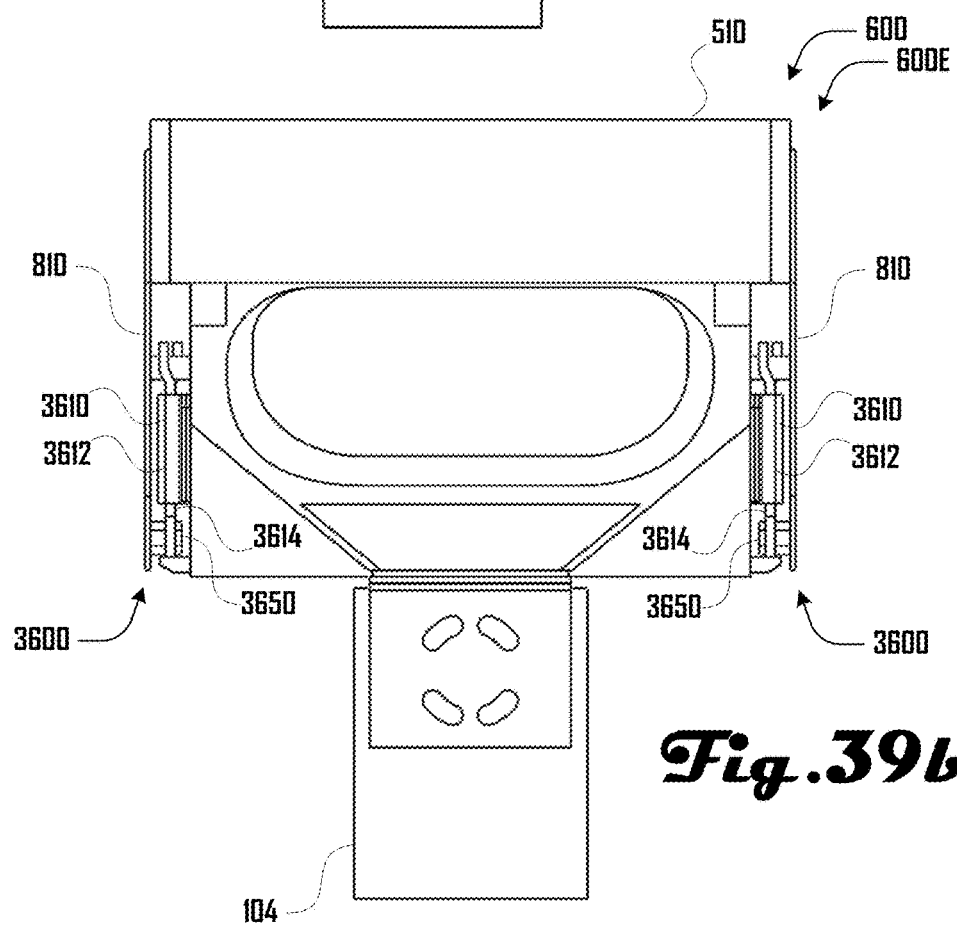

In various embodiments, the latch arms 3614 can be configured to be retracted or otherwise moved such that the latch bar 3650 can move out of the latch slot 3616 or the latch arms 3614 can be disposed in a retracted configuration such that the latch bar 3650 does not engage the latch assembly 3610 when the latch bar 3650 rotates in proximity to the latch assembly 3610 as discussed above. Such a configuration of the latch assembly 3610 can allow an automatic lock at flat feature to be disabled or can release the tracker 100 from being locked at flat such as shown in FIG. 36b (or FIGS. 37a and 37b as discussed herein). Retracting or moving the latch assembly 3610 can be done in various suitable ways such as retracting the latch arms 3614 into the latch housing 3612. In some examples, latch arms 3614 can be forced down by gravity, a spring, centrifugal force, passive mechanism, or the like. In some embodiments, the latch arms 3614 can be biased (e.g., spring loaded) toward an extended or retracted configuration.

Control methods for actuation of the latch arms 3614 can include one or more of: direct tracker controller operation via an independent fluidic control channel (e.g., fluidic tubing 2330 as shown in FIG. 23); a solenoid controlled via wired and/or wireless communication or triggered via a fluidic input, or the like.

In various embodiments, the latch bar 3650 can be any suitable shape such as round, square, trapezoidal, or any other suitable shape. Additionally, in various embodiments, each latch assembly 3610 and latch bar 3650 can define a single locking position. Further embodiments can include additional locking positions based on the presence of additional latch assemblies 3650 and/or additional latch bars 3650. For example, one latch assembly 3610 and one latch bar 3650 can define one locked position; one latch assembly 3610 with the latch bars 3650 can define up to three lock positions; three latch assemblies 3610 and three latch bars 3650 can define up to nine lock positions; and the like.

Figure 40A:
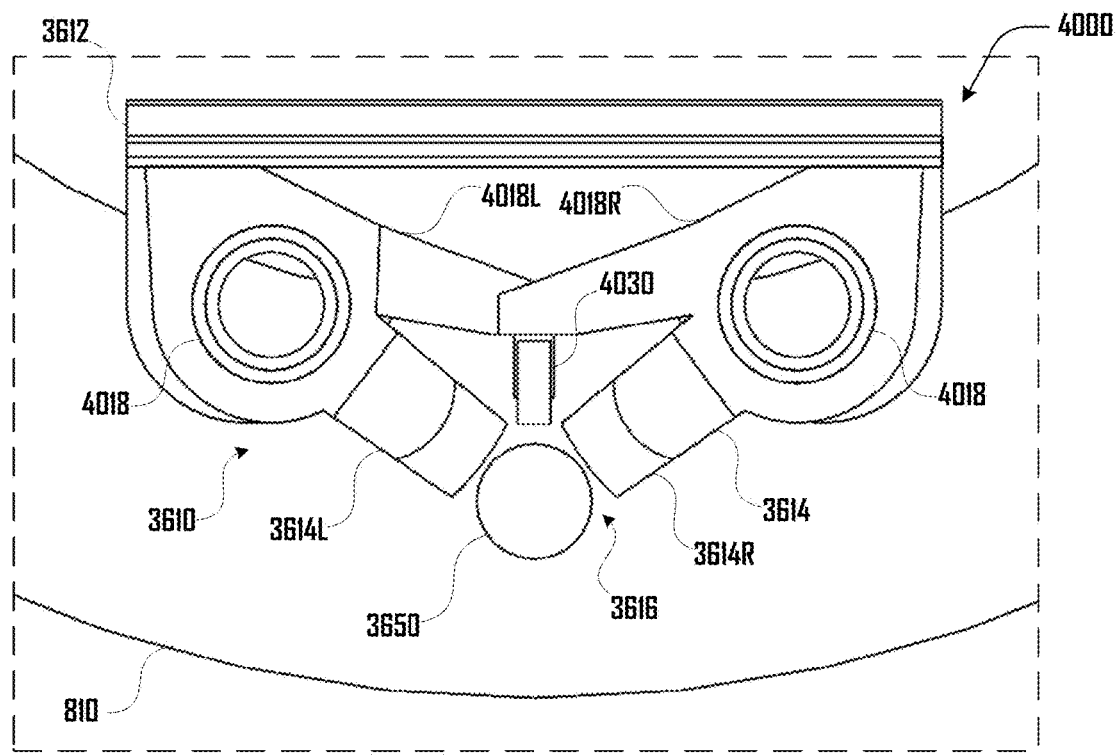
FIG. 40a illustrates a close-up side view of a latch system in accordance with another embodiment.
Figure 40B:
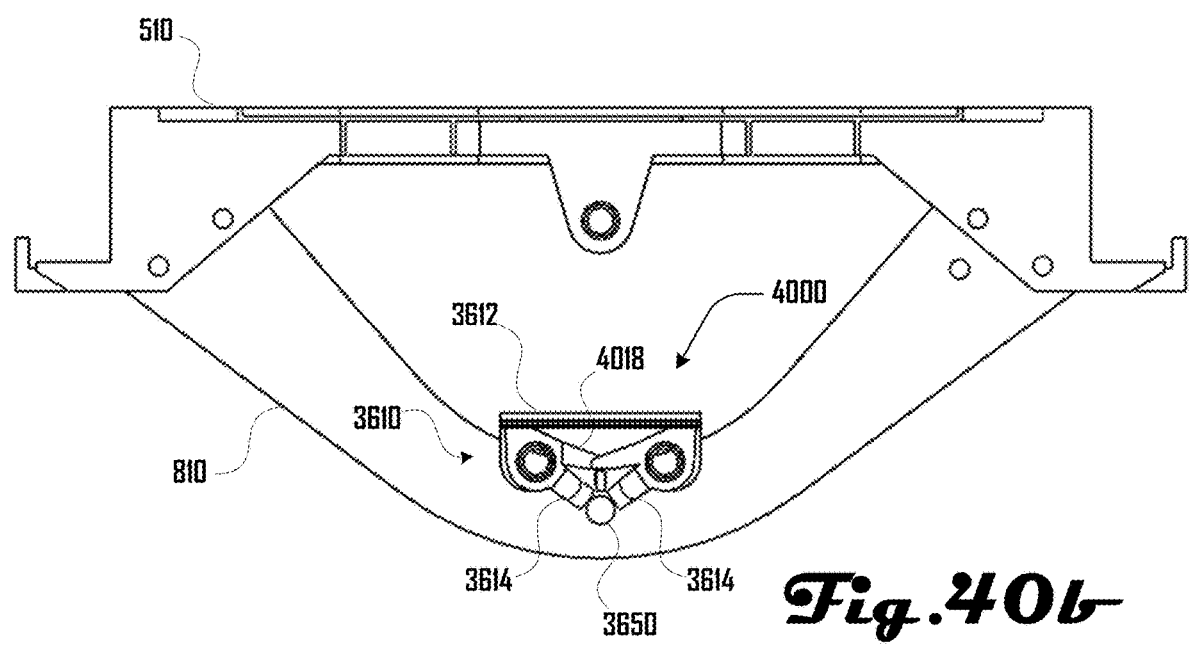
Figure 41A:
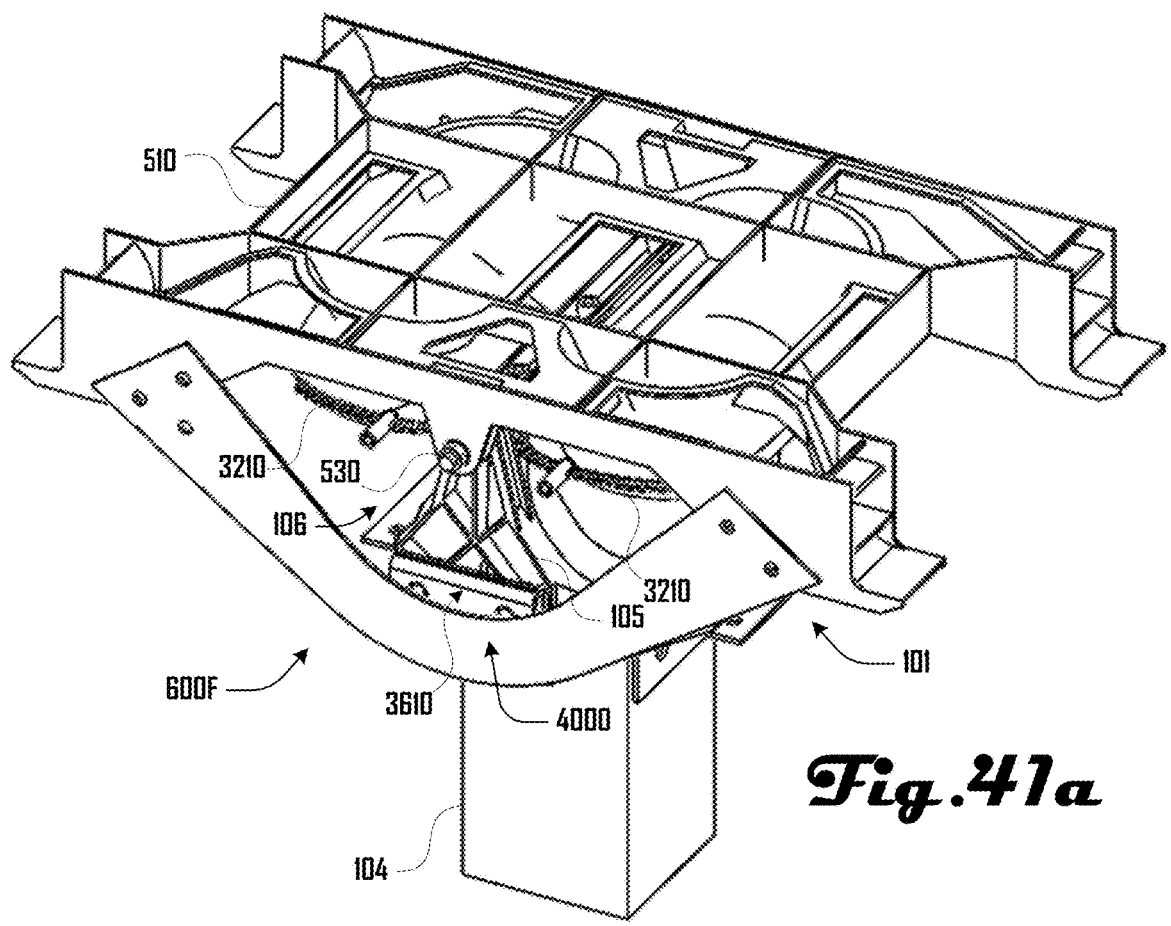
FIG. 41a illustrates a perspective view of an embodiment of an actuation-locking system that includes the latch system of FIGS. 40a and 40b.
Figure 41B:
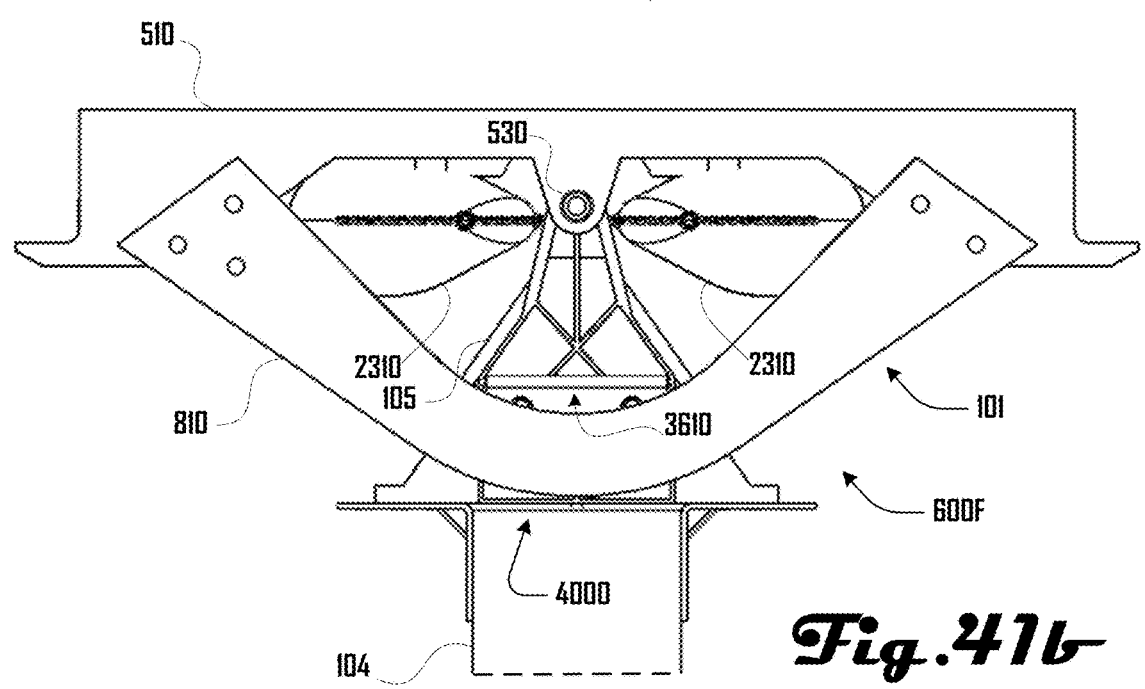
Figure 42A:
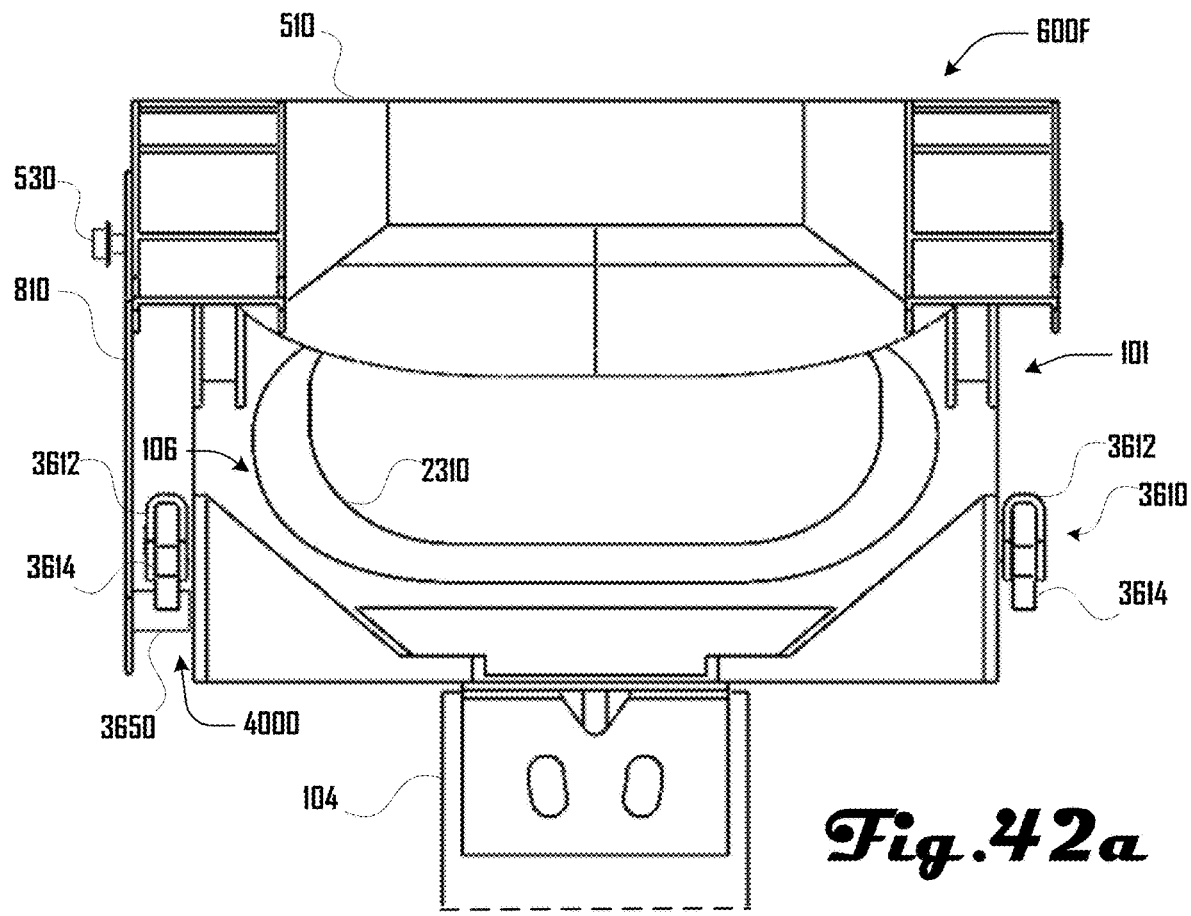
FIG. 42a illustrates another side view of the actuation-locking system of FIGS. 41a and 41b.
Figure 42B:
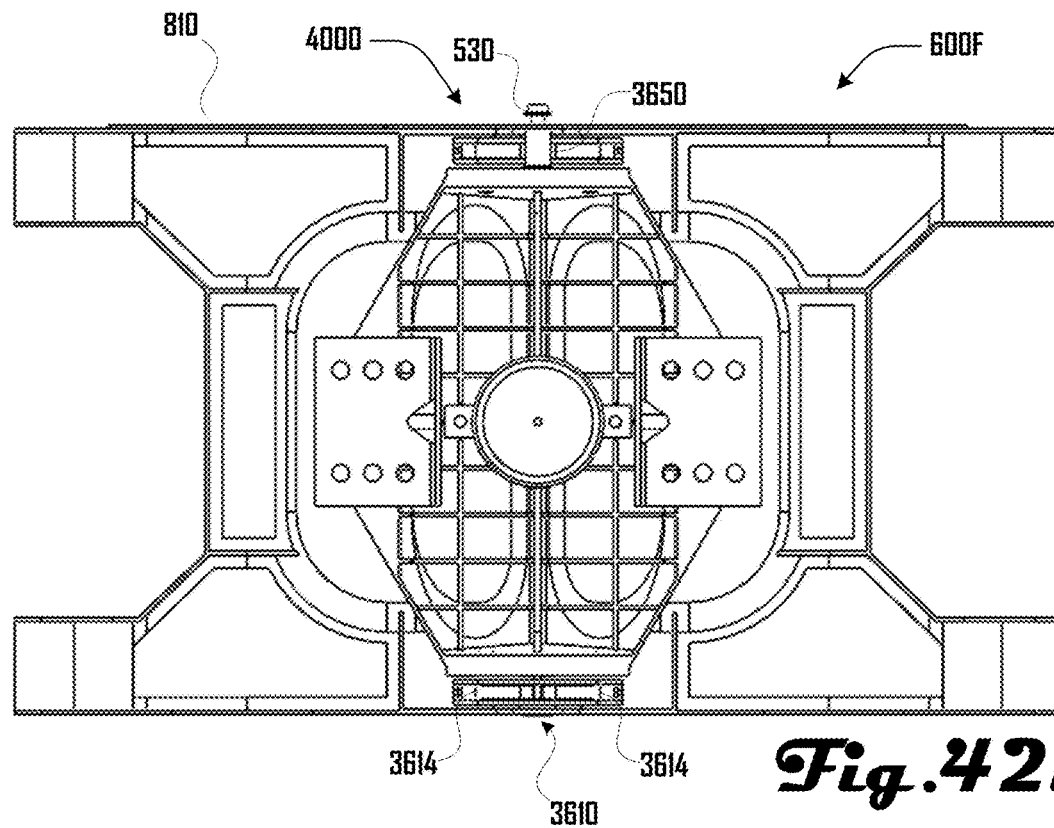
FIG. 42b illustrates a bottom view of the actuation-locking system of FIGS. 41a, 41b, 42a and 42b.

In another example, FIGS. 40a and 40b illustrate another example embodiment of a latch system 4000 with a gear plate 810 that comprises a latch assembly 3610 that is configured to rotatably couple with a latch bar 3650. In this example, the latch assembly 3610 comprises a housing 3612 and a pair of latch arms 3614 that define a latch slot 3616. The latch arms 3614 can be configured to rotate, retract, or the like, via respective latch axles 4018 when engaged by the latch bar 3650 on a peripheral face of the latch arms 3614, which allows the latch bar 3650 to enter the latch slot 3616 and moving latch arm 3614 to return to an original configuration such that the latch bar 3650 is held within the latch slot 3616 via the latch bars 3630. Such a latch assembly 3610 can allow a tracker 100 to automatically lock at flat.

For example, the latch bar 3650 can be disposed on the gear plate 810 and the gear plate 810 can be configured to rotate (e.g., via an axel 530) with the latch bar 3650 on the left and right side of the latch assembly 3610 (see, e.g., FIGS. 36a and 36c). As an initial example, the latch bar 3650 can be on the left side of the latch assembly 3610 and the gear plate 810 can rotate such that a left latch arm 3614L engages the latch bar 3650, which causes the left latch arm 3614L to move (e.g., rotate, retract, or the like) until the latch bar 3650 enters and is held within the latch slot 3616 as shown in FIGS. 40a and 40b. Alternatively, the latch bar 3650 can be on the right side of the latch assembly 3610 and the gear plate 810 can rotate such that a right latch arm 3614R engages the latch bar 3650, which causes the right latch arm 3614R to move (e.g., rotate, retract, or the like) until the latch bar 3650 enters and is held within the latch slot 3616 as shown in FIGS. 40a and 40b. In some embodiments, the latch assembly 3610 can be present in place of or in addition to elements such as a central slot 814, or the like.

In various embodiments, the latch arms 3614 can be configured to be retracted, rotated or otherwise moved such that the latch bar 3650 can move out of the latch slot 3616 or the latch arms 3614 can be disposed in a retracted configuration such that the latch bar 3650 does not engage the latch assembly 3610 when the latch bar 3650 rotates in proximity to the latch assembly 3610 as discussed above. Such a configuration of the latch assembly 3610 can allow an automatic lock at flat feature to be disabled or can release the tracker 100 from being locked at flat. Retracting or rotating the latch assembly 3610 can be done in various suitable ways such as rotating the latch arms 3614 via the latch axles 4018. In some embodiments, the latch arms 3614 can be biased (e.g., spring loaded) toward an extended or retracted configuration. In some examples, latch arms 3614 can be forced down by gravity, a spring, centrifugal force, passive mechanism, or the like. In some embodiments, the latch arms 3614 can be biased (e.g., spring loaded) toward an extended or retracted configuration. Control methods for actuation of the latch arms 3614 can include one or more of: direct tracker controller operation via an independent fluidic control channel (e.g., fluidic tubing 2330 as shown in FIG. 23); a solenoid controlled via wired and/or wireless communication or triggered via a fluidic input, or the like.

Figure 43A:
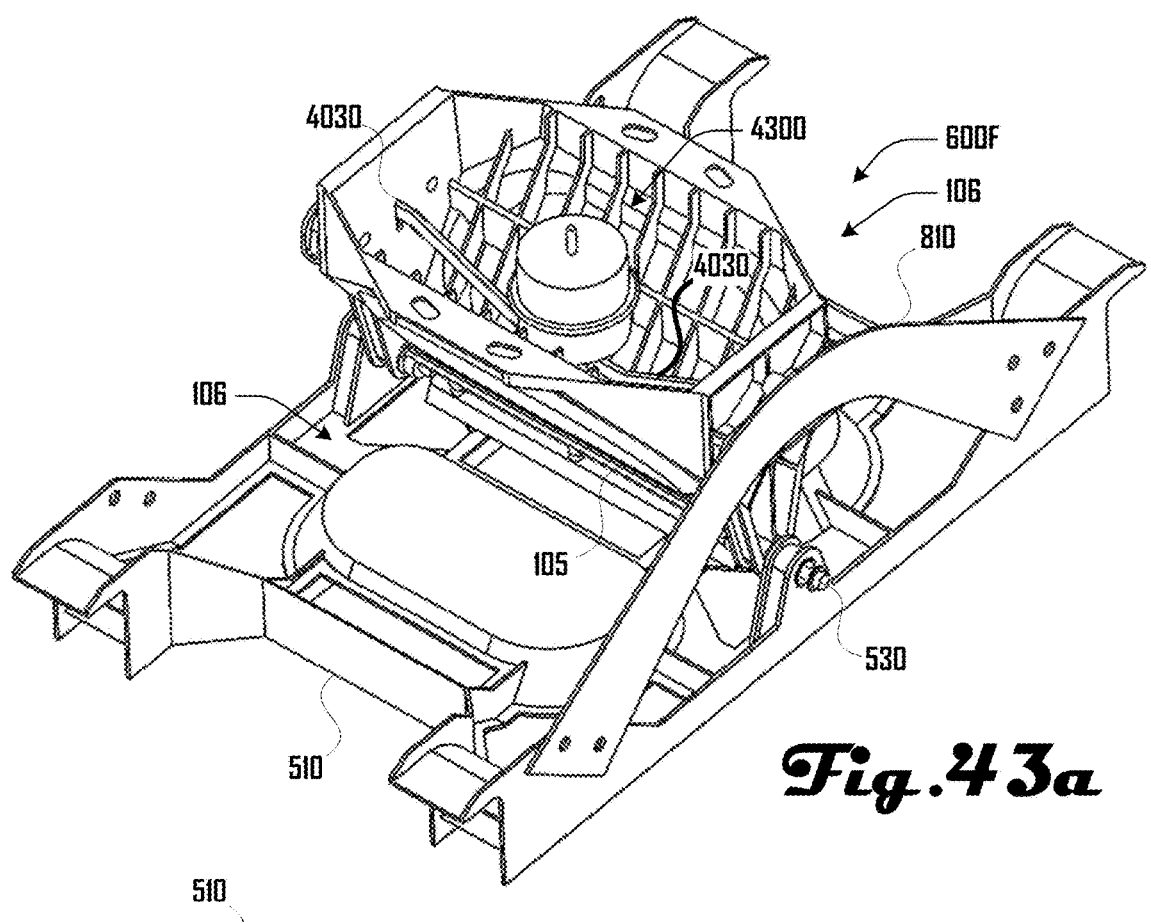
FIG. 43a illustrates a bottom perspective view of a portion of the actuation-locking system of FIGS. 41a, 41b, 42a and 42b.
Figure 43B:
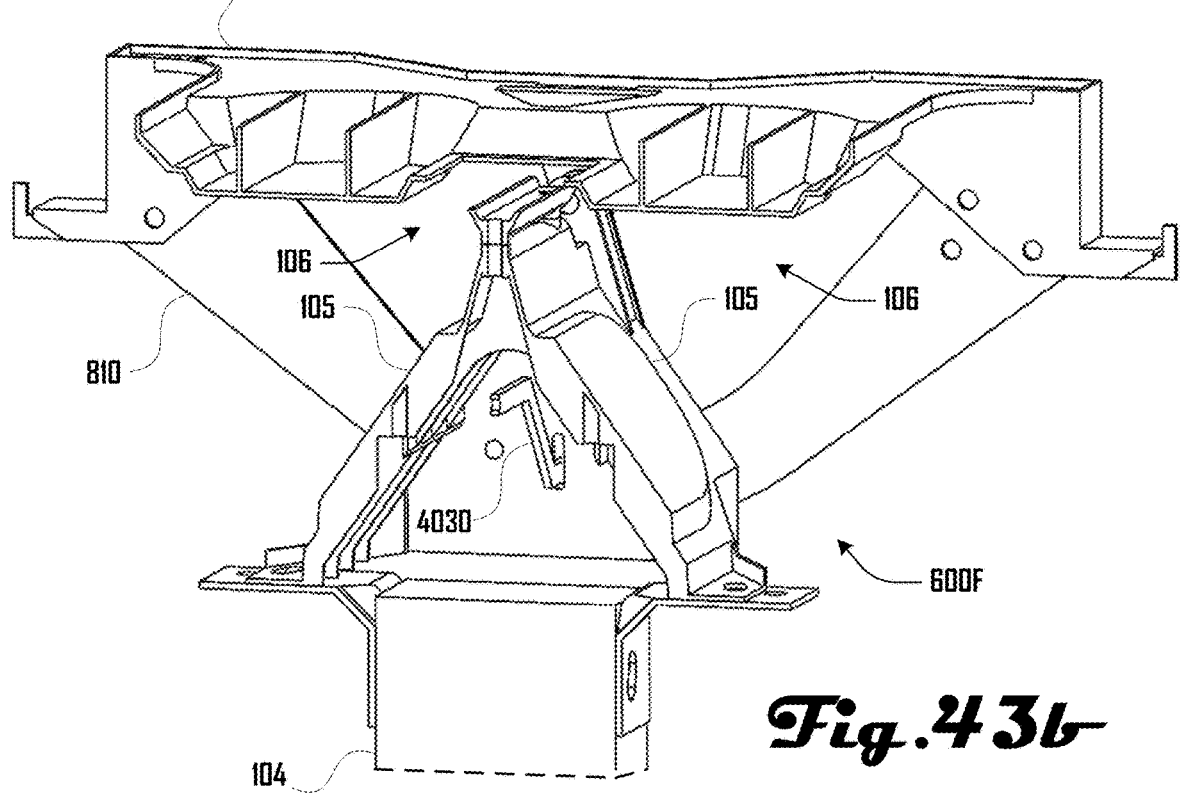
FIG. 43b illustrates a cutaway side-perspective view of a portion of the actuation-locking system of FIGS. 41a, 41b, 42a and 42b.

For example, in one embodiment, the latch assembly 3610 can comprise a latch arm actuation rod 4030 that can be actuated up and down to engage and move latch flanges 4018, which cause the latch arms 3614 to rotate upward and release the latch bar 3650 from the latch slot 3616 or make it so the latch bar 3650 will not be caught in the latch slot 3616 when moving proximate to the latch arms 3614. FIGS. 43a and 43b illustrate and example of how one or more latch actuator rod 4030 can be actuated by a rod actuator 4300, which as discussed herein can comprise various suitable actuators such as a fluidic actuator, motor actuator, solenoid, or the like.

Figure 15:
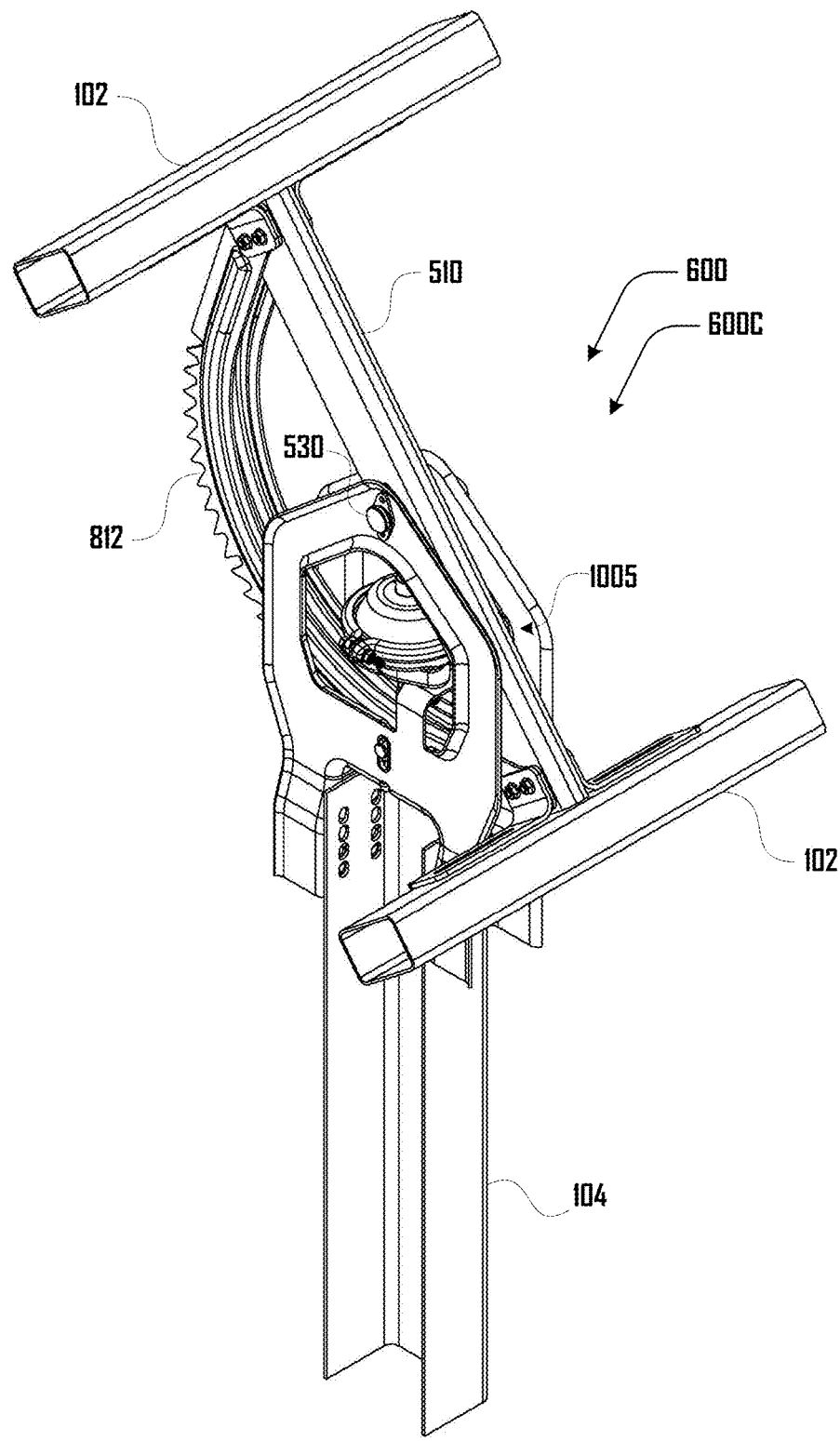
FIG. 15 illustrates a perspective view of the locking-dampening assembly of FIGS. 10a, 10b, 11a, 11b, 12a, 12b and 13 in a tilted configuration and including rails coupled to the bar of the locking-dampening assembly.

Returning to the example embodiment 600C of FIGS. 10a, 10b, 11a, 11b, 12a, and 12b, the central unit 520 is shown being defined by a first and second central unit plate 521A, 521B, which define a gear plate cavity 1005 in which the gear plate 810 is disposed and configured to rotate within (see e.g. FIG. 15) in a rotation plane that is parallel to the planes defined by the first and second central unit plates 521A, 521B. The first and second central unit plates 521A, 521B can further define a respective plate cavity 522 and the pawl actuator 830 can be disposed within a portion of the plate cavities 522 and a portion of the gear plate cavity 1005. The pawl actuator 830 can be coupled to the central unit plates 521 of the central plate 520 via one or more bridges 524, which in some examples can include one or more tabs that extend from one or both of the central unit plates 521.

As shown in the example embodiment 600C, the rod 824 and pawl 822 of the pawl assembly 820 can extend between the central unit plates 521 within the gear plate cavity 1005 with the pawl 822 extending perpendicular to the rod 824 in two directions at an end of the rod 824. Opposing ends of the pawl 822 can extend into and through pawl slots 828 defined respectively by the first and second central unit plates 521A, 521B. The pawl 822 can be configured to slidably move within the pawl slots 828 with pawl slots 828 providing a guide for movement of the pawl 822 when actuated via the pawl assembly 820.

In some examples, the ratchet-to-flat configuration can be desirable for tracker stow during high-wind events; in the event that the tracker experiences pressure or power loss; and the like, by allowing the tracker to ratchet toward the flat locked position without continuing to rotate further left/right or east/west.

For example, in various embodiments, the tracker 100 can operate in the unlocked configuration as shown in FIGS. 9b and 9c, where the pawl 822 does not contact the gear plate 810 and the tracker 100 is allowed to freely rotate as necessary to track the position of the sun. However, when a stow event occurs (e.g., high wind event, power loss, nighttime, or the like), the pawl 822 can be biased toward the gear plate 810 (e.g., as shown in FIG. 9d) such that the tracker 100 can ratchet toward the flat and locked configuration as shown in FIG. 9a, regardless of whether the tracker 100 is tilted left or tilted right.

In some embodiments, a wind stow functionality can include a ratchet pawl that remains engaged while the tracker 100 moves towards flat as discussed here, providing resistance to wind oscillations. In some examples, a power-off-stow can include, upon loss of power, a pawl that automatically engages (or stays engaged) and/or a crossover valve that drives the tracker 100 to flat. In some embodiments of solar tracking, a ratchet pawl disengages to move, then re-engages when the movement is complete.

A tracker 100 and/or rotation control assembly 600 can be configured to rotate left/right, east/west, or the like, in various suitable amounts up to a maximum tilt. For example, one embodiment allows for a maximum tilt of +/−52° from flat. Further embodiments can include a maximum tilt of no greater than +/−65°, +/−60°, +/−55°, +/−50°, +/−45°, +/−40°, +/−35°, or +/−30° from flat, and the like.

In some examples, a locking-dampening assembly 400, dampener 500, rotation control assembly 600, or the like can include a locking failsafe. For example, where a tracker 100 operates via fluidic pressure and electric power, loss of power or fluidic pressure can result in locking of a locking-dampening assembly 400, dampener 500, rotation control assembly 600, or the like. In some examples, an actuator or other elements can be biased toward a locked configuration with power and/or fluidic pressure holding such an element in an open or unlocked configuration such that the element automatically reverts to the locked configuration upon power or sufficient fluidic pressure loss. An example of such states is illustrated in Table 1 below.

TABLE 1

Example Locking Failsafe

| | Pressure | No Pressure |
|---|---|---|
| Power | Able to move as commanded by control system or selectively locked. | Failsafe-Locked. No Movement possible |
| No Power | Failsafe-Locked. No movement possible | Failsafe-Locked. No movement possible. |

In some examples, a system can include a locked and/or ratchet-to-flat failsafe. For example, where a tracker 100 operates via fluidic pressure and electric power, loss of power or fluidic pressure can result in locking or ratchet-to-flat of a locking-dampening assembly 400, dampener 500, rotation control assembly 600, or the like. In some examples, an actuator (e.g., a pawl actuator 830) or other elements can be biased toward a locked or ratchet-to-flat configuration with power and/or fluidic pressure holding such an element in an open or unlocked configuration (e.g., as shown in FIGS. 9b and 9c) such that the element automatically reverts to a locked or ratchet-to-flat configuration (e.g., as shown in FIGS. 9a and 9d) upon power or sufficient fluidic pressure loss. In other words, where the tracker 100 is tilted at an angle away from flat, a pawl actuator 830 can cause the pawl 822 to automatically engage the ratchet plate 810 upon power or sufficient fluidic pressure loss to generate a ratchet-to-flat failsafe, which can allow the tracker 100 to move toward flat and then lock when the pawl 822 engages the central slot 814. However, where the tracker 100 is in a flat configuration the pawl actuator 830 can cause the pawl 822 to automatically engage the central slot 814 upon power or sufficient fluidic pressure loss to generate a locked configuration. An example of such states is illustrated in Table 2 below.

TABLE 2

Example Locking and Ratchet-to-Flat Failsafe

| | Pressure | No Pressure |
|---|---|---|
| Power | Able to move as commanded by control system. Can be selectively locked or put into a ratchet-to-flat configuration. | Failsafe-Locked or Ratchet-to-Flat. Allow movement toward flat or locked if at flat. |
| No Power | Failsafe-Locked or Ratchet-to-Flat. Allow movement toward flat or locked if at flat. | Failsafe-Locked or Ratchet-to-Flat. Allow movement toward flat or locked if at flat. |

Figure 16:
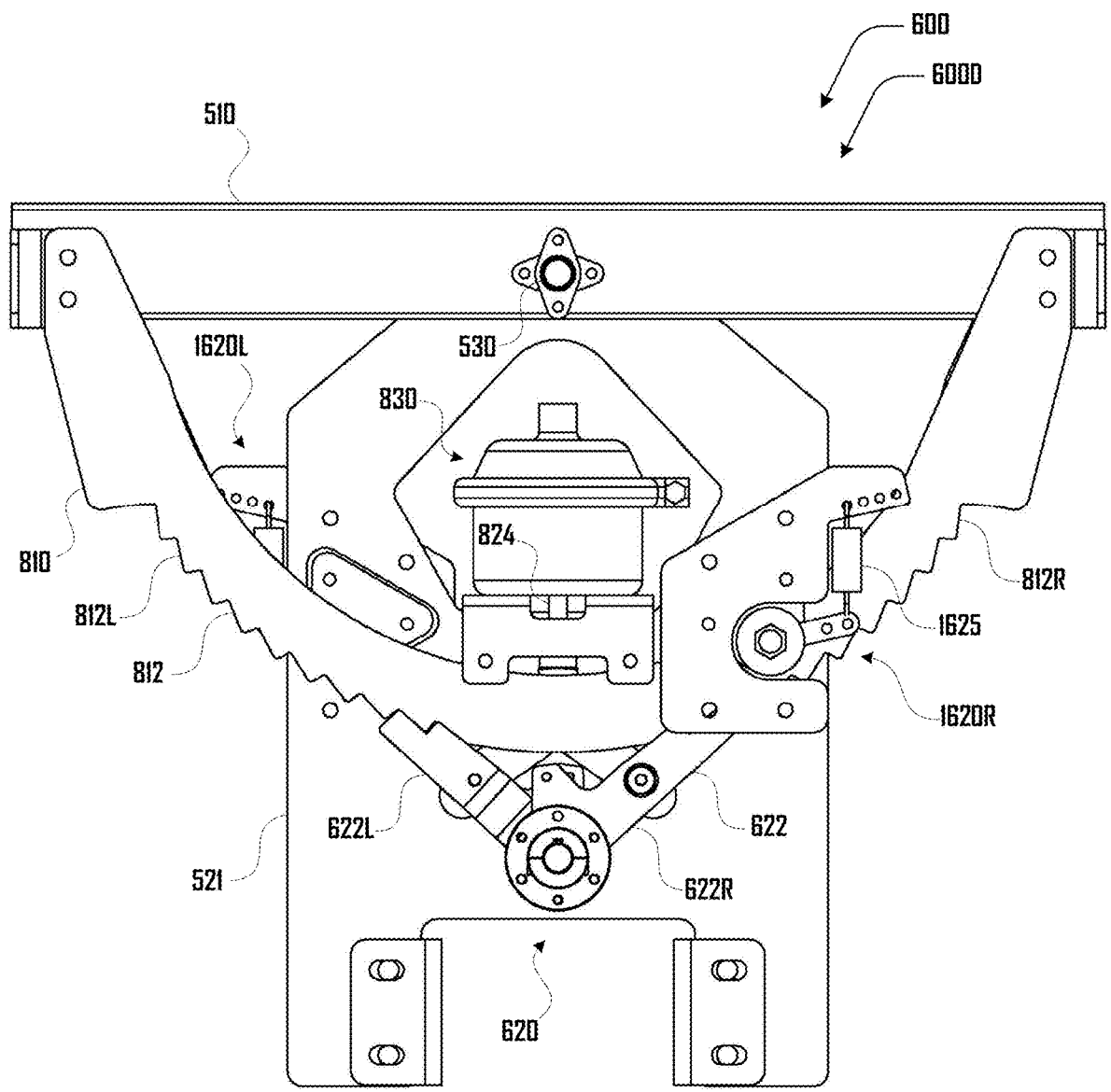
FIG. 16 illustrates a side cutaway view of a portion of a further embodiment of a locking-dampening assembly.
Figure 17:
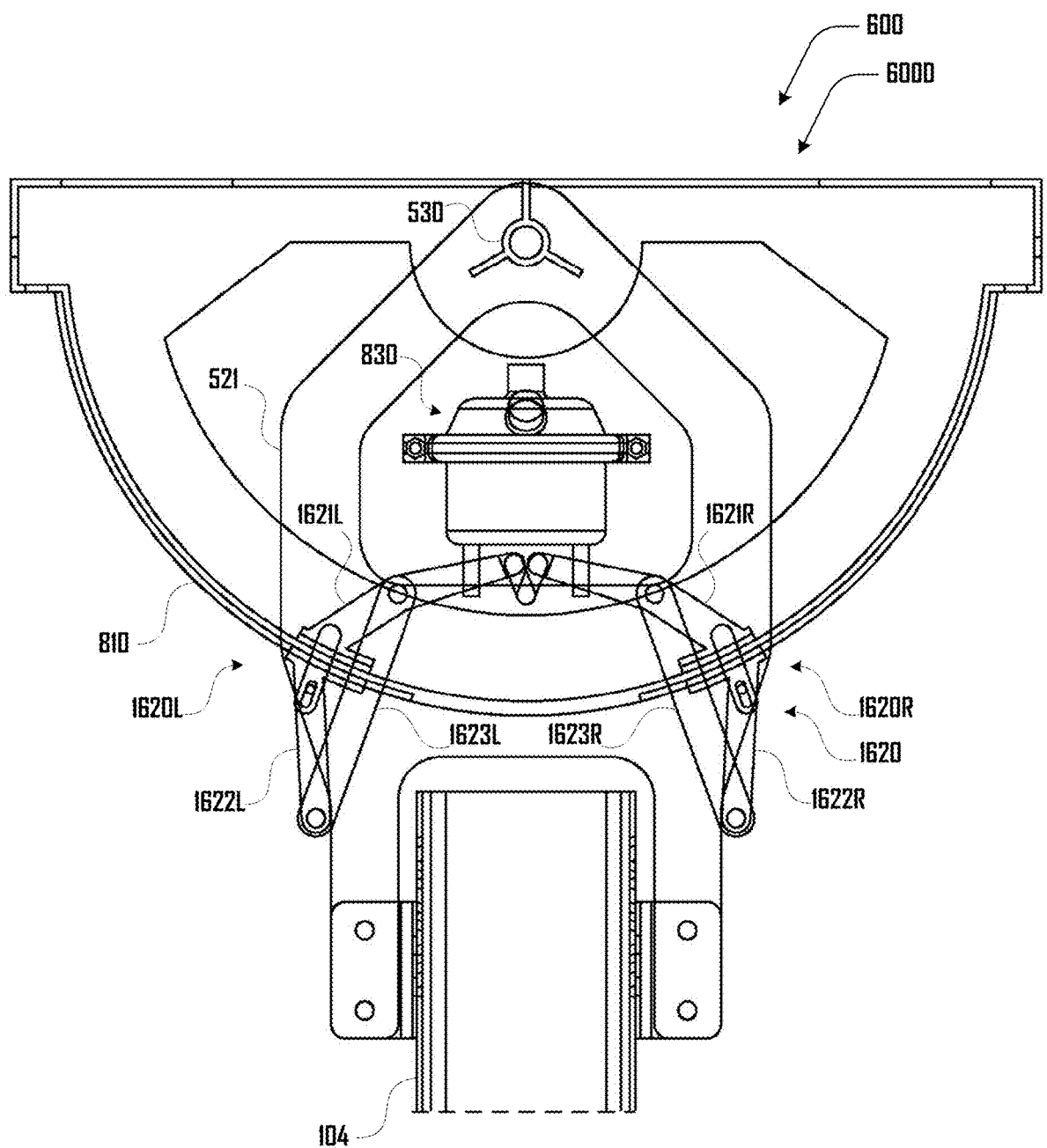
FIG. 17 illustrates a side cutaway see-through view of a portion of the embodiment of the locking-dampening assembly of FIG. 16.
Figure 18:
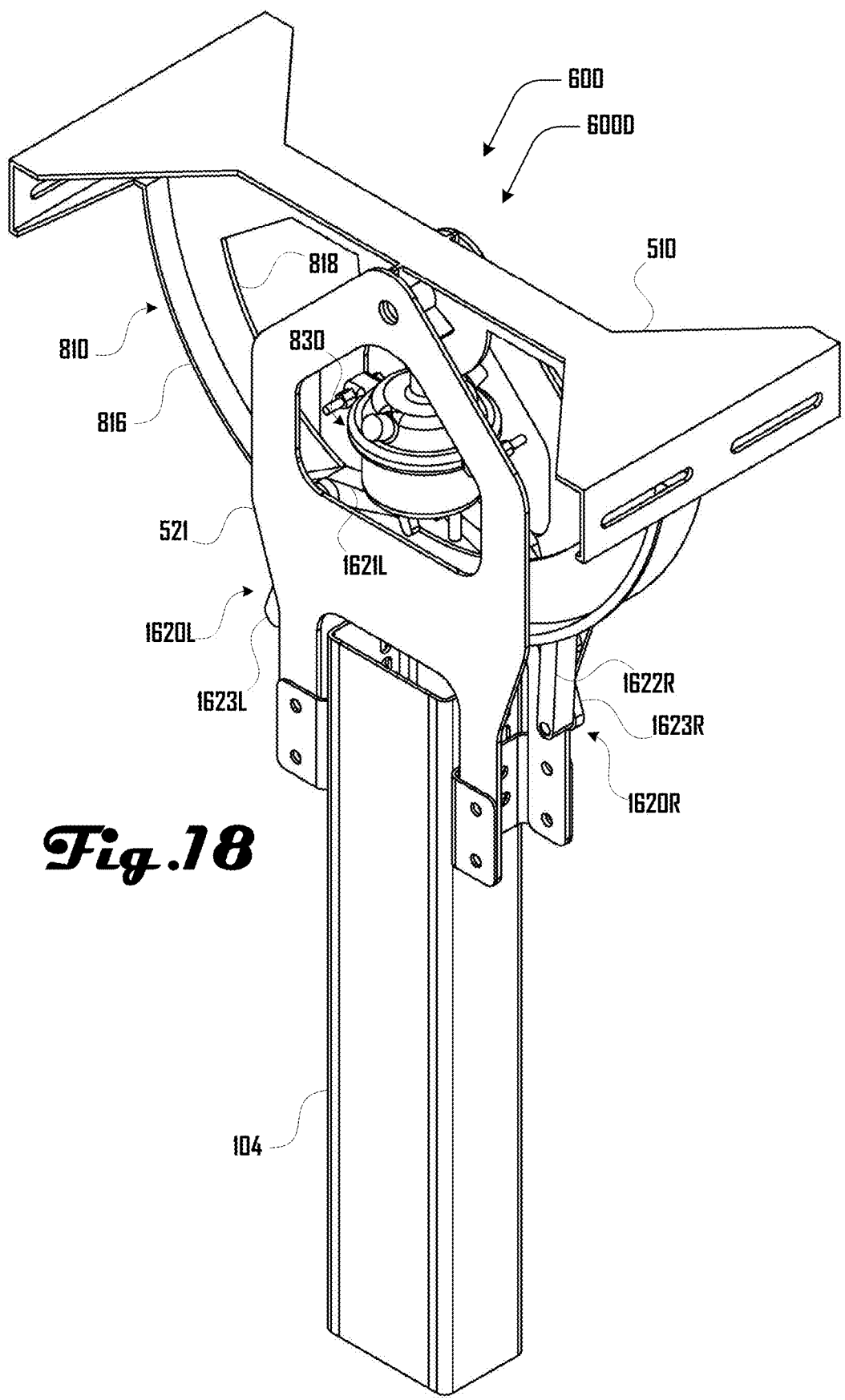
FIG. 18 illustrates a perspective view of a portion of the embodiment of the locking-dampening assembly of FIGS. 16 and 17.
Figure 19A:
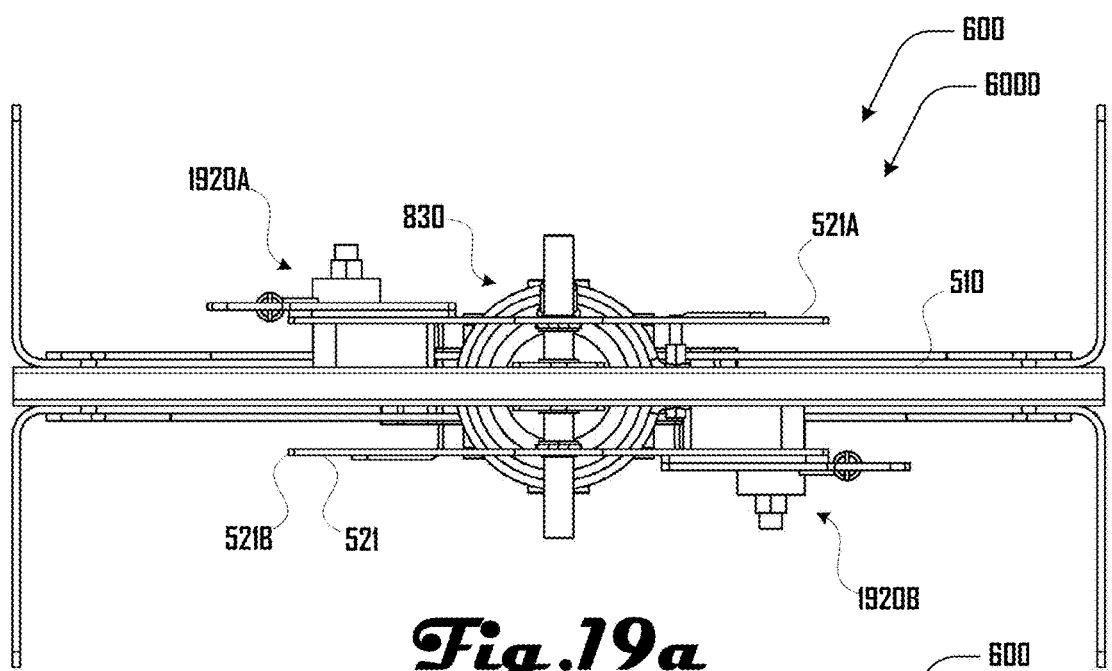
FIG. 19a illustrates a top view of a portion of the embodiment of the locking-dampening assembly of FIGS. 16, 17 and 18.
Figure 19B:
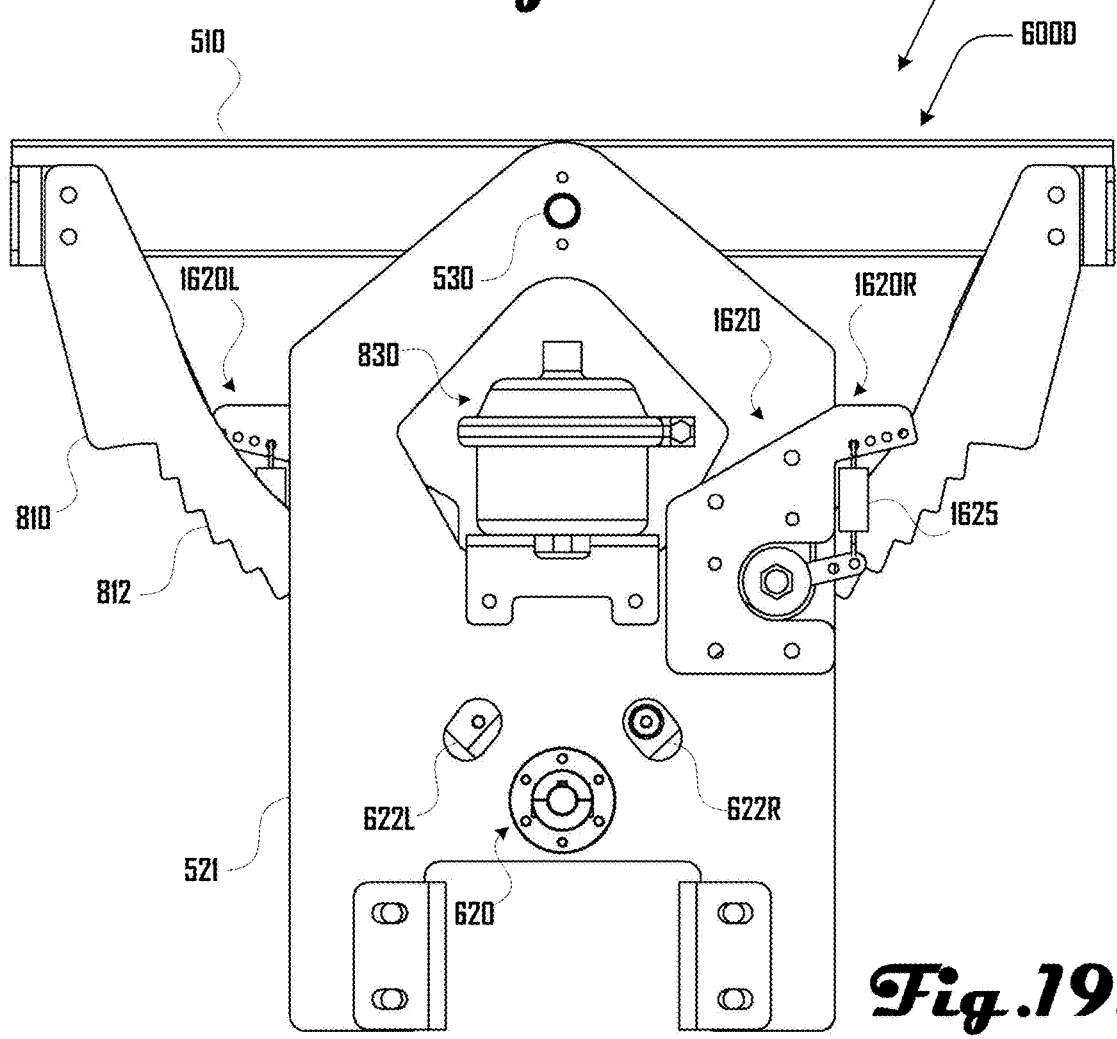
Figure 20:
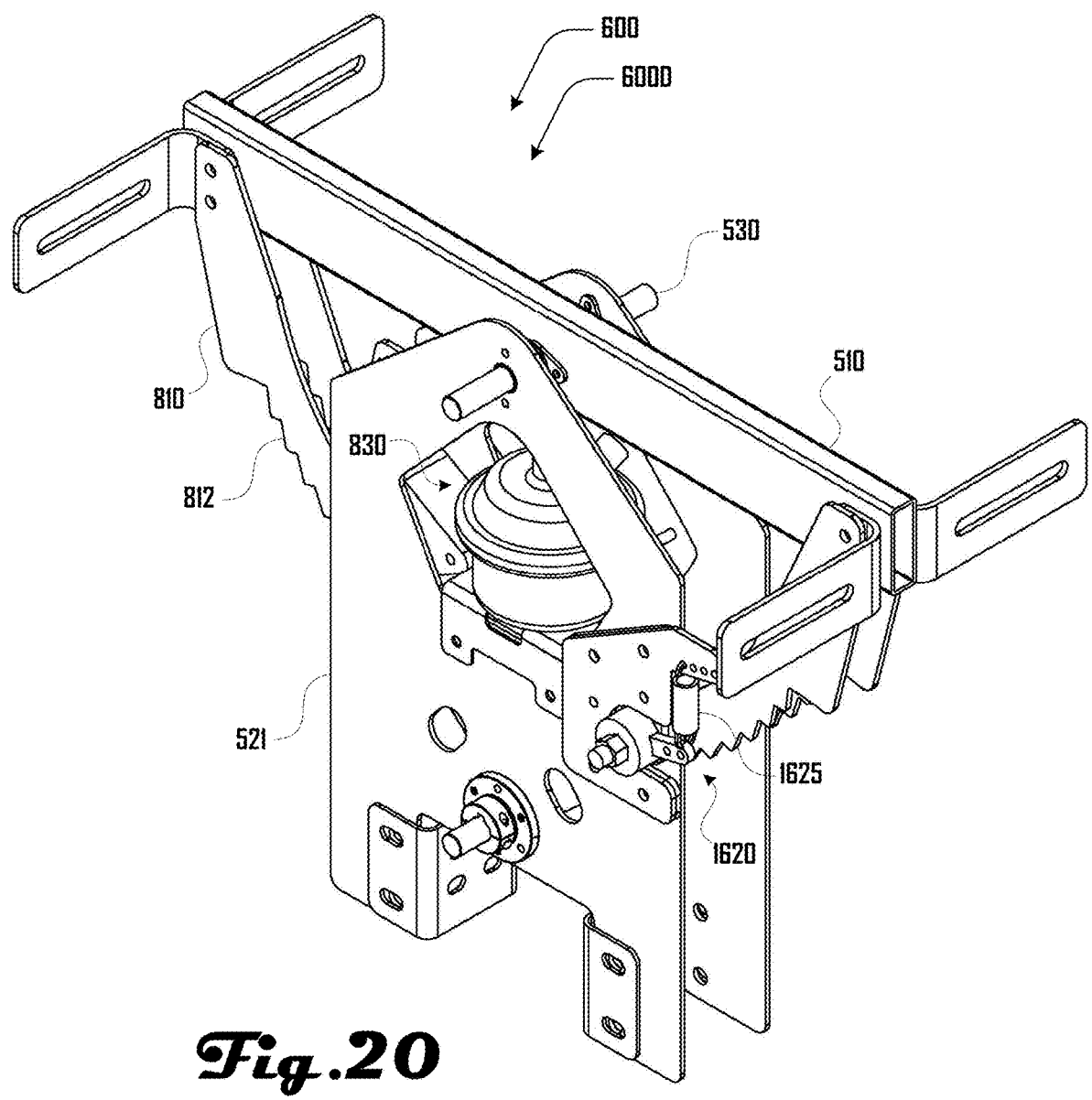
FIG. 20 illustrates a perspective view of a portion of the embodiment of the locking-dampening assembly of 16, 17, 18, 19a and 19b.
Figure 21:
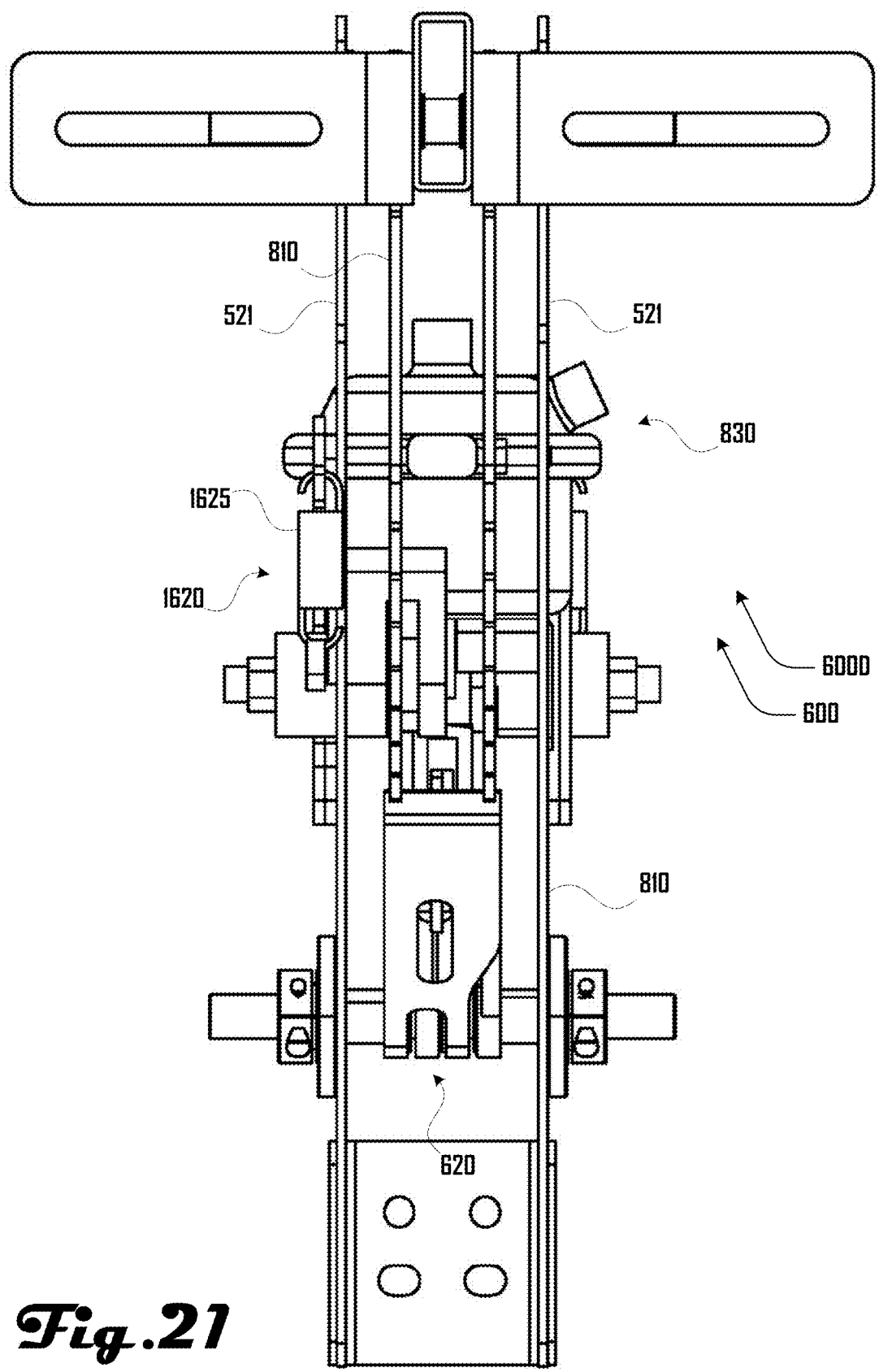
FIG. 21 illustrates a side view of a portion of the embodiment of the locking-dampening assembly of FIGS. 16, 17, 18, 19a, 19b, and 20.

Turning to FIGS. 16-21, another embodiment 600D of a rotation control assembly 600 is illustrated that includes a brake assembly 1620, including a left and right brake assembly portion 1620L, 1620R, and a pawl assembly 620 that includes a left and right pawl 622L, 622R. As shown in FIG. 17, the left and right brake assembly portion 1620L, 1620R can include a first and second brake arm 1621, 1622 having a brake head that engages opposing sides of a rim 816 of the gear plate 810 (see FIG. 18), which can be configured by an actuator 830 (e.g., via an actuator rod 824 as shown in FIG. 16, or the like). The first and second brake arm 1621, 1622 can be coupled via a linkage 1623. In various embodiments, the left and right brake assembly portions 1620L, 1620R can be biased, via a spring 1625 (see FIGS. 16, 19b, 20 and 21), toward braking configuration where the first and second brake arm 1621, 1622 engage the gear plate 810.

As shown in the example embodiment 600D of FIGS. 16-21, the left and right brake assembly portions 1620L, 1620R can be disposed on respective left and right sides of the rotation control assembly 600 and on opposing sides of the rotation control assembly 600. Additionally, in various embodiments, the first and second brake arms 1621, 1622 of the respective left and right brake assembly portions 1620L, 1620R can engage respective rims 816 on opposing sides of a gear plate flange 818 of the gear plate 810. For example, first and second left brake arms 1621L, 1622L can engage a first rim 816 on a first side of the gear plate flange 818, and first and second right brake arms 1621R, 1622R can engage a second rim 816 on a second side of the gear plate flange 818.

In various embodiments one or more friction brakes can be used to prevent additional motion such as to reduce or eliminate motion from relatively low-force disturbances, reduce the speed of motion for high-force disturbances, and the like. For example, while the example embodiment 600D discussed above has left and right brake assembly portions 1620L, 1620R, that each have a first and second brake arm 1621, 1622, further embodiments can include a single brake assembly portion 1620 with one or more brake arms 1621, 1622.

In some examples, one or more friction brakes can comprise a caliper brake that clamps to the toothed ratchet wheel, a drum brake with internal or external friction surfaces (e.g., a rim 816) that lead or trail a pivot point and may be spring assisted. However, further embodiments can include various suitable rotational friction devices or other suitable braking mechanisms.

In some embodiments, one or more friction brakes can be normally engaged by one or more passive force-generating mechanisms, which can include a mechanical spring (e.g., spring 1625), pneumatic pressure, hydraulic pressure, magnetics, and the like.

In some examples, one or more brakes may or may not be disengaged using actively controlled force generating mechanisms including mechanical springs, pneumatics, electric solenoids, motors, hydraulics, piezoelectrics, wax motors, or other actively controlled means that may or may not transmit their force through linkages, and the like. Brakes may or may not be disengaged using cam surfaces, dampers, clutches, springs, masses, or other suitable passively controlled means.

In some embodiments, self-locking brakes can prevent rotation away from the center/flat/0 degree position (see e.g., FIGS. 6b, 8b, 9a and 9b, 16 and the like) without direction from the control system, while still allowing for motion towards the center/flat/0 degree position. Positional stability can be achieved in some examples using pneumatically-controlled friction brake mechanisms in some examples. Brake mechanisms can be characterized as "self-locking," in some embodiments, akin to how a doorstop interfaces with the ground to prevent a door from closing.

In various examples (e.g., embodiment 600D), one respective brake mechanism (e.g., left and right brake assembly portions 1620L, 1620R) can be used to prevent motion in each direction (clockwise & counterclockwise). In the "self-locking" direction, the orientation of one or more braking arms is such that braking friction inherently increases contact pressure at the contact area, and motion is completely prevented or substantially hindered. In the "self-unlocking" direction, the orientation of one or more braking arms can be such that braking friction inherently decreases contact pressure at the contact area, and motion is freely allowed, less constrained, or at least less constrained than in the "self-locking direction." The degree to which a given mechanism is self-locking and/or self-unlocking can vary by design or type of mechanism, and may be complete or partial in various embodiments.

Brake mechanisms can be actively controlled in some embodiments, for example one or more braking arms 1621, 1622 of one or more brake portions 1620 may be controlled together or separately. Brake mechanisms are normally engaged by a mechanical spring or other passive means. Brake mechanisms in various embodiments can be actively disengaged by pneumatic actuators, electric solenoids, motors, hydraulics, piezoelectrics, linkages, wax motors, or the like.

Brake mechanisms can allow motion of a tracker 100 towards the neutral, flat position. For example, in some embodiments, when the tracker 100 is at the neutral, flat position, one or more brake pad friction surfaces can be touching their respective contact areas. When the tracker is pointed in a clockwise direction, only the one or more brake mechanisms that self-lock for clockwise motion is in contact with its braking surface. When the tracker is pointed in a counterclockwise direction, only the one or more brake mechanisms that self-lock for counterclockwise motion is in contact with its braking surface.

In various examples, if the tracker 100 experiences a disturbance while pointed at a non-flat angle (e.g., clockwise), the brake mechanisms can allow nearly free movement towards the neutral, flat position (e.g., counterclockwise). When the tracker moves from its initial position (e.g., clockwise) and reaches the neutral, flat position (e.g., after a counterclockwise motion), one or more brakes that self-lock for motion past flat (e.g., counterclockwise motion resulting in counterclockwise positions) are then in contact with a braking surface, in addition to another brake that prevents motion in the opposite direction. Accordingly, in some examples, motion can be prevented automatically once the tracker 100 is in the neutral, flat position.

Returning to the example embodiment 600D of FIGS. 16-21, the pawl assembly 620 having the left and right pawl 622L, 622R can be actuated by the actuator 830 via an actuator rod 824 (e.g., as shown in FIG. 16), which can cause the pawls 622 to engage and/or disengage from the gear plate 810 as discussed herein.

The pawl assembly 620 and gear plate 810, or other suitable mechanism, can be configured for arresting motion or/and absorbing energy. For example, such a mechanism in various embodiments can be configured to prevent or reduce uncontrolled rotation away from the center/flat/0 degree position, while allowing, encouraging or not inhibiting movement towards center. In various examples, pawl assembly 620 can be controllable. For example, when one or more pawls are disengaged from the gear plate 810, the tracker 100 can be allowed to move away from center. One or more brakes as discussed herein can be used to provide some control over the speed of movement of the tracker 100 when the pawl assembly 620 is unlocked, and when the gear plate 810 is moving from high angles towards flat.

Positional stability of a tracker 100 can be generated by one or more suitable mechanisms. In various embodiments, a ratchet and pawl system can prevent motion away from center relatively high force disturbances. For example, a ratchet pawl system in some embodiments can allow motion of a tracker 100 towards a desired stow position, into the stow position, but not past the stow position. Such a stow position can be with photovoltaic modules 103 in a flat/horizontal configuration or other suitable configuration.

A ratchet and pawl system of various embodiments can prevent motion of a tracker 100 away from a desired stow position. Ratchet teeth can be oriented in such a way to allow pawls to slide in only one direction. Free direction can be motion towards a desired stow position. Locked direction can be motion away from a desired stow position.

As discussed herein, one or more pawls can be part of a ratchet and pawl system. A single-pawl version of one example includes a pawl shaped in such a way to act equally on ratchet teeth pointing in both directions. Multiple pawl versions of various examples can use pawls shaped to allow motion in one direction, and prevent rotation in the other direction. Pawls in some examples can be normally engaged onto the ratchet by a passive force-generating mechanism. A passive force-generating mechanism can be a mechanical spring, pneumatic pressure, hydraulic pressure, magnetics, or other suitable mechanism. Pawls can be disengaged away from the ratchet by an actively controlled force-generating mechanism in some embodiments. Disengagement may allow for intentional motion away from a desired stow position. An actively controlled force-generating mechanism can include a mechanical spring, pneumatic pressure, hydraulic pressure, magnetics, thermal expansion "wax motor", or other suitable mechanism. In various examples having multiple pawls, the pawls can be actively disengaged either together or separately.

Motion of a pawl and ratchet mechanism in a "free" direction may or may not provide some intentional resistance to motion, which may be tuned with some or all of the following parameters: shape and orientation of ratchet tooth "backside" sloped surfaces; magnitude of force generated by passive force-generating mechanism; material choices of pawl and/or ratchet wheel; surface finish or treatment of pawl and/or ratchet; hardness of pawl and/or ratchet wheel; and the like.

In various embodiments, one or more motion dampers can be used to prevent, resist or reduce undesirable motion of a tracker. For example, dampers may generate force as a function of tracker rotational velocity. Dampers may comprise enclosed fluid, an electromechanical system, an inertial system, a cylinder, or the like. Damper behavior may or may not be influenced by an actively controlled system such as pneumatics, springs, motors, solenoids, wax motors, hydraulics, or the like. Damper behavior may or may not be influenced by a passively controlled system such as springs, cam surfaces, magnetics, pneumatic pressure, hydraulic pressure, or the like.

FIGS. 37a, 37b, 38a, 38b, 39a and 39b illustrate another embodiment 600E of a rotation control assembly 600 that includes opposing gear plates 810 coupled to a bar 510 that rotate via an axle 530. The gear plates 810 include latch assemblies 3610 that are configured to rotatably couple with respective latch bars 3650 such as in the embodiment of the latch system 3600 shown and described in FIGS. 36a-c.

FIGS. 41a, 41b, 42a, 42b, 43a and 43b illustrate another embodiment 600F of a rotation control assembly 600 that includes opposing gear plates 810 coupled to a bar 510 that rotate via an axle 530. The gear plates 810 include latch assemblies 3610 that are configured to rotatably couple with respective latch bars 3650 such as in the embodiment of the latch system 4000 shown and described in FIGS. 40a and 40b. It should be noted the certain elements are not shown in all images for purposes of clarity. For example, only a single gear plate 810 is shown in FIGS. 41a, 42a, 42b, 43a and 43b.

Additionally, FIGS. 41a, 41b, 42a, 42b, 43a and 43b also comprise a fluidic actuator assembly 101. A fluidic actuator assembly 101 can comprise the bar 510 that is rotatably coupled to an angled base plate 105 via the axle 530, which defines cavities 106 on opposing sides of the base plate 105 defined by the bar 510 and respective side-faces of the base plate 105. A first and second bladder 2310 (also referred to herein as a "bellows", "inflatable actuator", and the like) are disposed within the respective cavities 106 and can engage the bar 510 and respective side-faces of the base plate 105. As discussed herein, the first and second bladders 2310 can be selectively inflated and/or deflated to cause the bar 510 to rotate about the axle 530, which can cause the tracker 100 and associated panels 103 to rotate. Another embodiment of a fluidic actuator assembly is shown in FIG. 44. Also, while various embodiments relate to actuators being fluidic and/or fluidically inflatable, in further embodiments, actuators can comprise motors, linear actuators, or the like.

Trackers systems can be designed with any suitable combination of actuating, locking and/or damping assemblies, so the specific embodiments discussed herein should not be construed as limiting and various suitable elements of various embodiments can be interchangeable with other embodiments or can be specifically absent in some embodiments.

For example, possible combinations to be attached to a single post, or within a single shipped assembly can include one or more of "A"—an actuator; "L"—a locking assembly; "D"-a damping assembly; "AL"—an assembly which combines the functions of actuation and locking; "AD"—an assembly which combines actuation and damping; "LD"—an assembly which combines locking and damping; and/or "ALD"—an assembly which combines actuation, locking, and damping.

The example functional items above can be used in combination within a tracker system 100. Examples include, but are not limited to the tracker configurations below. Each grouping of letters represents an example assembly on a post 104. The combinations listed above may be included within a tracker 100 of up to any suitable length in any suitable permutation. For example, some embodiments can include a four-post tracker having: A-A-A-A (see e.g., FIGS. 1a and 1b; A-LD-A-LD (see e.g., FIGS. 4a and 4b); L-A-A-L; AD-A-AD-A-AD; L-A-LD-A-L; AL-AL-ALD-AL-AL, and the like.

Accordingly, the example embodiments discussed herein should be construed to be interchangeable, modular, combinable, separable and the like to generate such variations, so the example embodiments herein should not be construed to be limiting. For example, FIG. 5 illustrates one example embodiment of a dampening system D, and this embodiment can be alone as a single unit or combined with one or more dampening (D), actuation (A) and/or locking (L) system (e.g., to generate LD, AD, ALD or other variations of D such as with a plurality of cylinders 540).

In another example, FIGS. 41a, 41b, 42a and 42b illustrate an example of a combined actuation (A) and locking (L) system (i.e., actuation-locking (AL)). However, in some embodiments, locking elements can be a stand-alone system or can be combined with other embodiments shown and described herein (e.g., to generate L, LD, ALD or other versions of AL). In further embodiments actuation elements can be a stand-alone system or can be combined with other embodiments shown and described herein (e.g., to generate A, AD, ALD or other versions of AL).

In another example, FIGS. 2 and 44 illustrate stand-alone actuator assemblies 101 and in further embodiments, such examples can be combined with other embodiments shown and described herein (e.g., to generate AL, AD, ALD or other versions of A).

Figure 22:
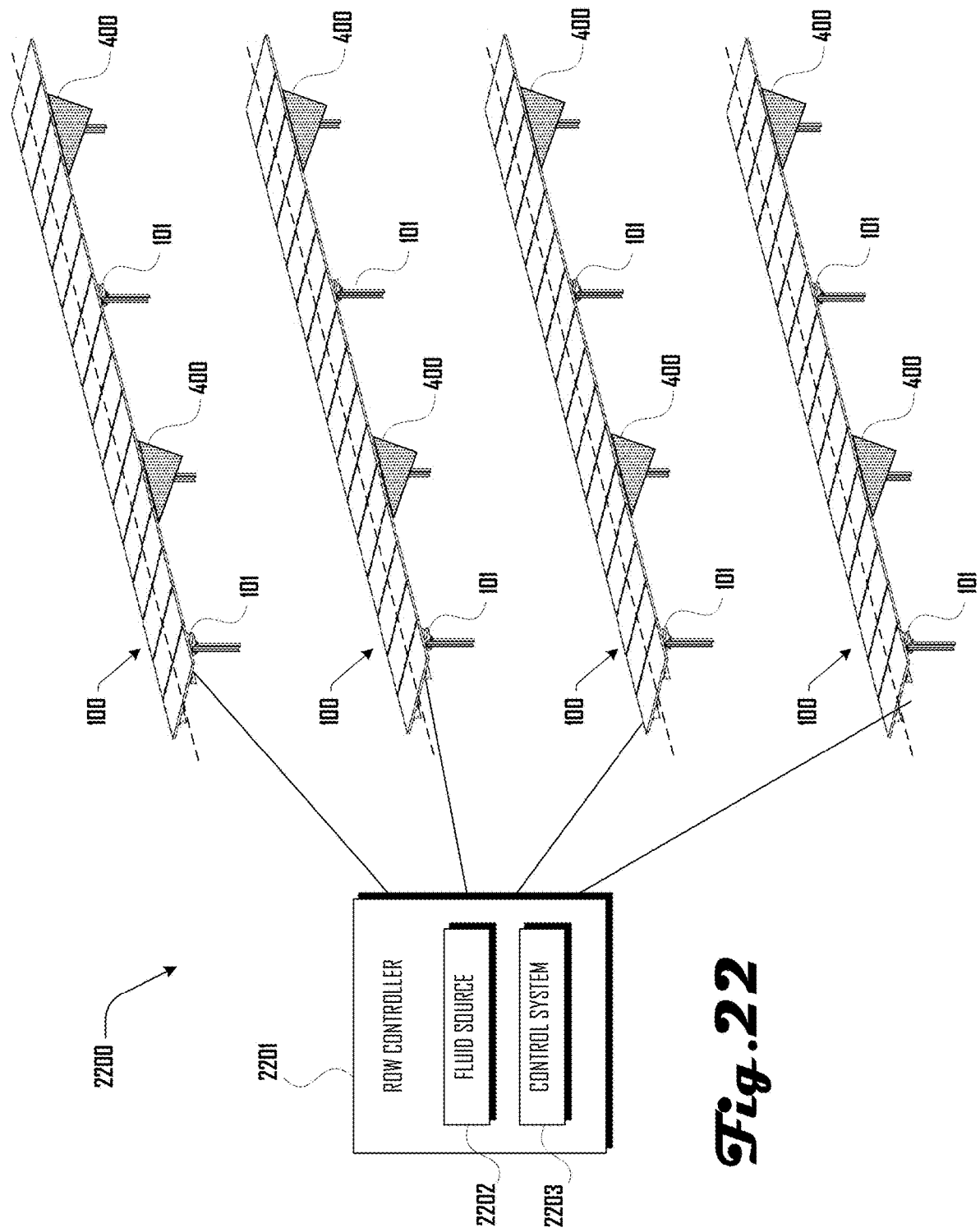
FIG. 22 is a diagram illustrating an example embodiment of a fluidic actuation circuit system that includes a row controller that is operably coupled with one or more rows of solar trackers.

Turning to FIG. 22, a diagram is provided illustrating an example embodiment of a fluidic actuation circuit system 2200 that includes a row controller 2201 that is operably coupled with one or more rows of solar trackers 100. In the example of FIG. 22, the row controller can comprise a fluid source 2202 and a control system 2203.

As discussed herein, a solar tracker 100 can comprise a plurality of solar (photovoltaic) panels that are positioned via one or more fluidic actuators 101. The row controller 2201 can be configured to control the fluidic actuators 101 and locking-dampening assemblies 400 of the solar tracker rows 100 to generate and control rotation of the solar panels along a lateral axis of rotation (the length of the rows) and/or modify a tension or rigidity of the actuators. In various embodiments, a solar tracker 100 can be configured to track a position of the sun; move to a position that provides maximum light exposure; reflect light to a desired location (e.g., a solar collector); move to a stow position, and the like.

For example, in various embodiments, the row controller 2201 can control the plurality of solar trackers 100 by introducing and/or removing fluid from the actuators 101 and by actuating locking-dampening assemblies 400 via fluid from the fluid source 2202 as discussed herein. The control system 2203 can comprise various suitable elements, including a computing system, fluidic valves, and the like, which can facilitate controlling the solar trackers 100 via fluid control lines that communicate fluid from the fluid source 2202 to the trackers 100.

While various examples shown and described herein illustrate a system having various pluralities of solar tracker rows 100, these should not be construed to be limiting on the wide variety of configurations that photovoltaic panels and fluidic actuators that are within the scope and spirit of the present disclosure. For example, some embodiments can include a single row or any suitable plurality of solar tracker rows, including one, two, three, four, five, six, seven, eight, nine, ten, eleven, twelve, fifteen, twenty, twenty five, fifty, one hundred, and the like. Additionally, a given solar tracker 100 can include any suitable number of fluidic actuators and photovoltaic panels, including one, two, three, four, five, six, seven, eight, nine, ten, eleven, twelve, fifteen, twenty, twenty five, fifty, one hundred, two hundred, five hundred, and the like. Rows can be defined by a plurality of physically discrete solar tracker units. For example, a solar tracker unit 100 can comprise one or more actuators coupled to one or more photovoltaic panels.

In some preferred embodiments, the solar tracker rows 100 can extend in parallel in a north-south orientation, with the actuators of the rows configured to rotate the photovoltaic panels about an east-west axis of rotation. However, in further embodiments, one or more trackers 100 can be disposed in any suitable arrangement and in any suitable orientation. For example, in further embodiments, some or all rows may not be parallel or extend north-south. Additionally, in further embodiments, one or more trackers 100 can be non-linear, including being disposed in an arc, circle, or the like. Accordingly, the specific examples herein (e.g., indicating "east" and "west") should not be construed to be limiting.

It should be noted that, although many of the examples presented herein discuss solar energy systems (that is, the movement of a solar panel about an axis of rotation), the systems and methods described could be applied to any appropriate type of object to be moved or rotated about a point or an axis of rotation. Non-limiting examples include systems for positioning satellite dishes, security cameras, reflective mirror panels for redirecting light, and the like. Similarly, all other specific examples herein should likewise not be considered to be limiting on the wide variety of configurations that are within the scope and spirit of the present disclosure.

FIG. 23 is an exemplary illustration of a set of solar tracker rows 100, including a first row and second row 100A, 100B. The trackers 100 can include a set of locking-dampening assemblies 400 that can receive fluid from a line of fluidic tubing 2330 (e.g., via a fluid source 2202 from a row controller). For example, fluid can be used to actuate a pawl actuator 830 as shown in FIGS. 8a and 8b, one or more pawl assembly 620, 820 as shown in FIGS. 6a, 6b, 8a and 8b, or the like.

In various embodiments, the line of fluidic tubing 2330 can be configured to control a set of a plurality of locking-dampening assemblies 400 in unison. For example, using the embodiment 600B of a ratchet assembly 600 of a locking-dampening assembly 400 shown in FIGS. 9a-9d as an example, in some embodiments, the line of fluidic tubing 2330 can be operably connected to respective pawl actuators 830 of a plurality of locking-dampening assemblies 400, which can allow for the respective pawl actuators 830 to be actuated in unison. However, in further embodiments, locking-dampening assemblies 400 can be controlled separately or configured to assume different configurations at once.

As shown in FIGS. 23 and 44, the trackers 100 can further include actuators 101 with a respective pair of bellows 2310 that can receive fluid from a respective line of fluidic tubing 2325 (e.g., via a fluid source 2202 from a row controller). Each tracker 100 can include a set of fluidic supply lines 2325 supplying pressurized fluid to a set of bellows 2310. The movement of the bellows 2310 produced by the introduction or release of fluid from the bellows 2310 can cause a set of photovoltaic panels 103 to rotate about an axis of rotation, tilting the panels 103 in one direction or the other. In the embodiment shown in FIG. 23, each solar tracker row 100 has one or more "east" bellows 2310 and one or more "west" bellows 2310. A fluidic actuator 101 in this example is defined as being comprised of at least one "east" bellows 2310 and at least one "west" bellows 2310. The fluid moving through the fluidic supply lines 2325 may pass through one or more flow restriction devices 2320. The purpose of a flow restriction device 2320 can be to reduce fluid flow, increase fluid velocity, provide a mechanism for precision metering of the fluid, and the like.

In various operating scenarios, pressurized fluid can be supplied to each of the "east" bellows 2310 in the system through fluidic supply lines 2325, causing the "east" bellows 2310 to expand, pushing up on the "east" side of the panels 103, causing the top surface of the panels 103 to tilt in the direction of the "west" side. Depending on the desired angle of tilt for the panels 103, as well as the desired tension in the bellows 2310, fluid may be released from each of the "west" bellows 2310 simultaneously with fluid being introduced to the "east" bellows 2310, controlling the rate or rotation of the panel 103, as well as the tension or desired pressure of the bellows 2310. The state of locking-dampening assemblies 400 can be changed to lock the panels 103 in place; provide for ratchet-to-flat for the panels 103; allow for free tilt of the panels 103 and the like. Active or passive dampening of locking-dampening assemblies 400 can provide for dampening of the rotation of the panels 103.

As shown in the example of FIG. 11, in some embodiments, a tracker 100 can comprise only three fluid lines (i.e., east fluid line 2325, west fluid line 2325 and tracker rotation control fluid line 2330). Such a configuration can provide desirable simplicity of a tracker 100, which can reduce cost, maintenance requirements, and the like.

In some embodiments, the bellows 2310 can be in the form of an elastic vessel which can expand with the introduction of a pressurized fluid, and which can collapse or shrink when the pressurized fluid is released. The term 'bellows' as used herein should not be construed to be limiting in any way. For example, the term 'bellows' as used herein should not be construed to require elements such as convolutions or other such features (although convoluted bellows 2310 can be present in some embodiments). As discussed herein, bellows 2310 can take on various suitable shapes, sizes, proportions and the like. In various embodiments, the terms 'bellows', 'inflatable actuator', 'bladder', and the like, can be considered equivalent or interchangeable.

The bellows 2310 can be mounted on opposite sides of an axis of rotation 134 (FIG. 1); that is, an "east" set of bellows 2310 may be mounted on an "east" side of an axis of rotation 134, and a "west" set of bellows 2310 may be mounted on a "west" side of the same axis of rotation 134. The panels 103 may be mounted such that they pivot or rotate about the axis of rotation 134.

The set of solar tracker rows 100 can be controlled by a row controller 1000 (see FIG. 1). In some embodiments, a row controller 2200 is a collection of electronic control units, solenoid valves, valve circuits, and optional sensors used in controlling the movement and position of the set of solar tracker rows 100. Some embodiments of such elements are illustrated in U.S. Non-Provisional applications filed Apr. 17, 2018 entitled "PNEUMATIC ACTUATOR SYSTEM AND METHOD", "PNEUMATIC ACTUATION CIRCUIT SYSTEM AND METHOD" and "SOLAR TRACKER CONTROL SYSTEM AND METHOD" having application Ser. Nos. 15/955,044, 15/955,506 and 15/955, 519 respectively.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives. Additionally, elements of a given embodiment should not be construed to be applicable to only that example embodiment and therefore elements of one example embodiment can be applicable to other embodiments. Additionally, in some embodiments, elements that are specifically shown can be explicitly absent from further embodiments. Accordingly, the recitation of an element being present in one example should be construed to support some embodiments where such an element is explicitly absent.

Figure 24:
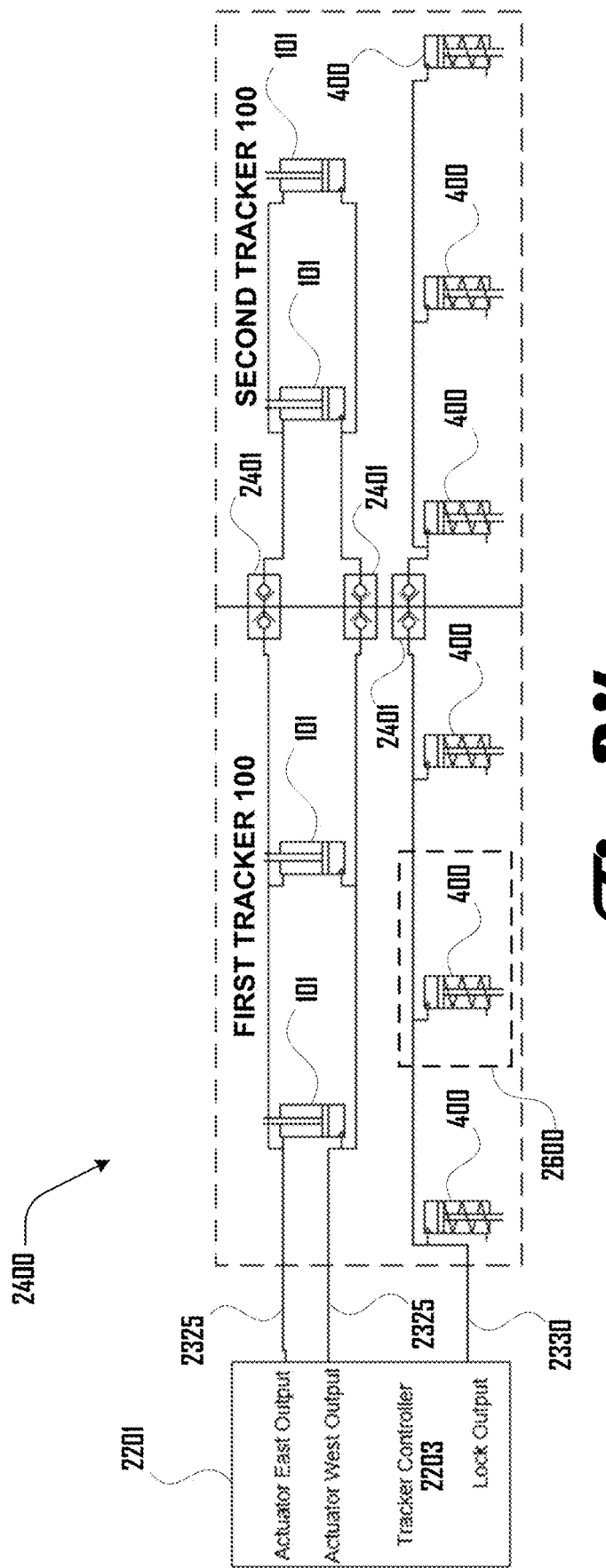
FIG. 24 illustrates a tracker pneumatic schematic showing a fluidic actuation circuit system that includes a tracker controller coupled to a series of trackers where each tracker has two actuators and three locking-dampening assemblies.
Figure 26:
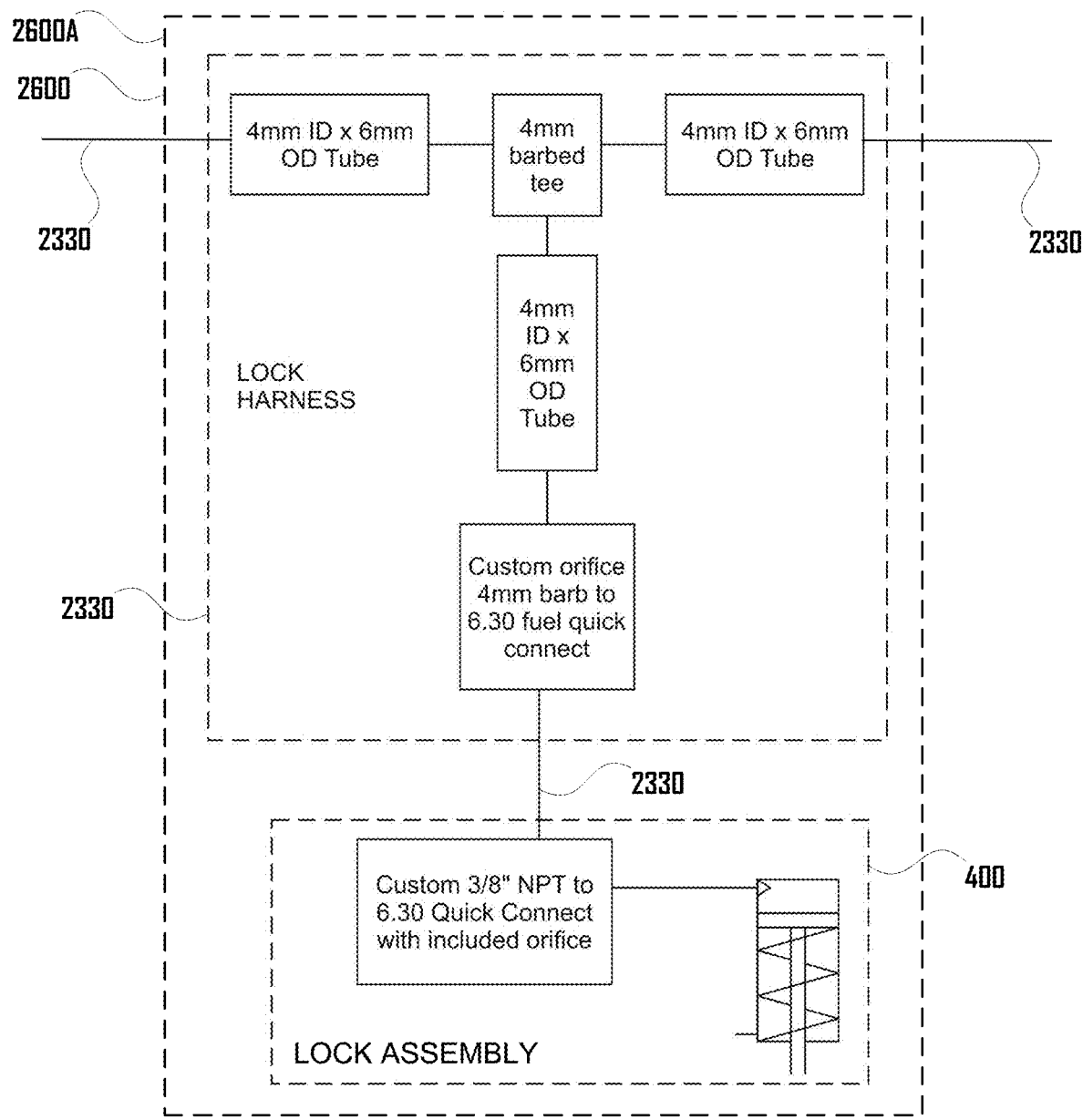
FIG. 26 illustrates a schematic arrangement of a pneumatic control air harness which connects from a tracker controller to a pneumatic locking-dampening assembly.
Figure 27:
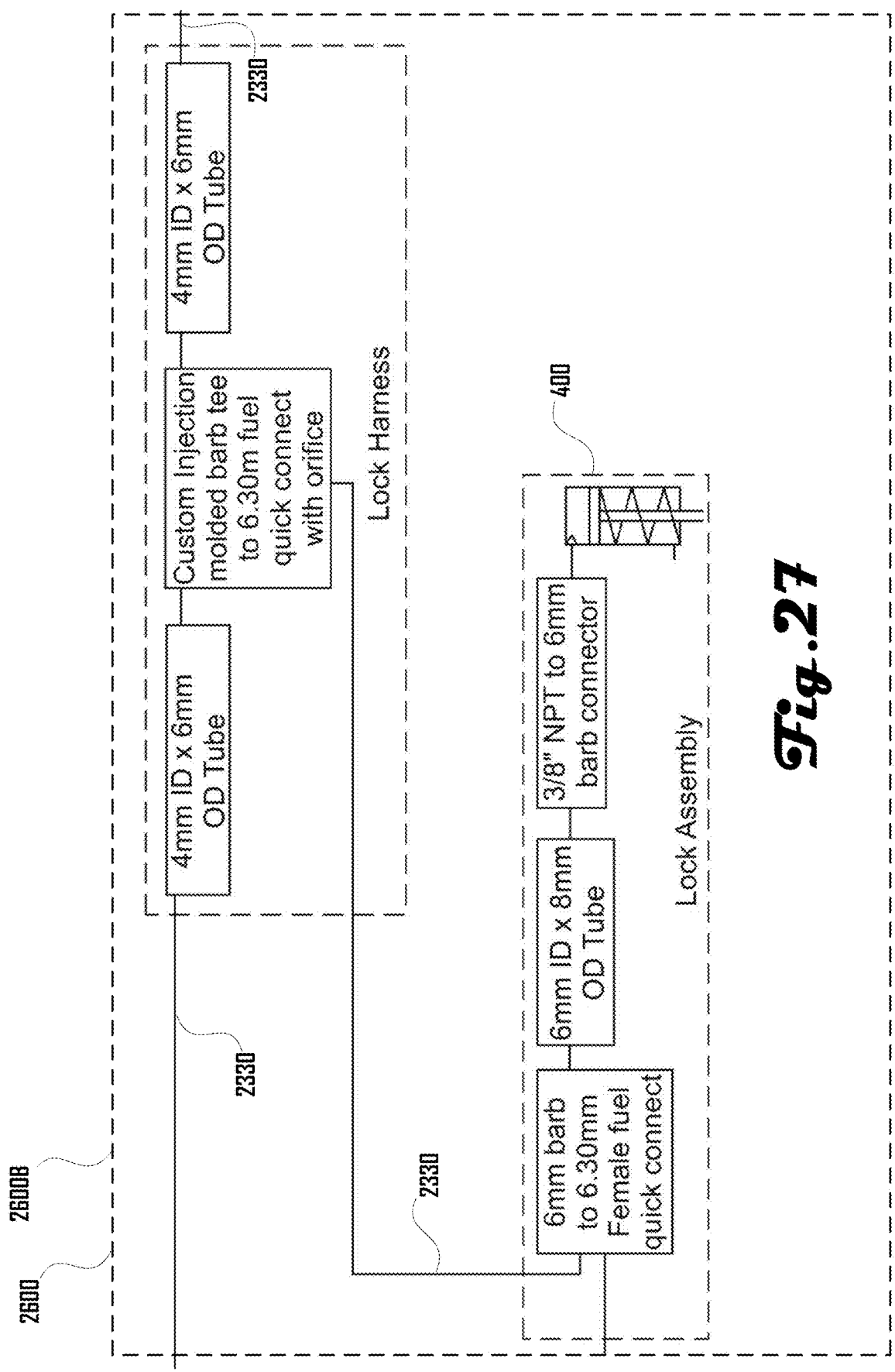
FIG. 27 illustrates another example embodiment of a pneumatic control air harness to locking dampening assembly connection.

FIG. 24 illustrates a tracker pneumatic schematic showing a fluidic actuation circuit system 2400 that includes a tracker controller 2201 coupled to a first and second tracker 100 that are disposed in series with fluid lines 2325, 2330 extending from the tracker controller 2201 and between the trackers 100. Each tracker 100 has two actuators 101 and three locking-dampening assemblies 400. As discussed herein, in some embodiments, trackers 100 may have as few as one actuator 101, or any suitable plurality of actuators 101, and as many locking-dampening assemblies 400 as is desirable to resist the wind or perform other desired actions. Block diagrams of an example portion 2600 of a locking-dampening fluid line 2330 are shown in FIGS. 26 and 27. FIG. 26 illustrates a first example embodiment 2600A and FIG. 27 illustrate a second example embodiment 2600B. The specific examples of FIGS. 26 and 27 are merely one illustrative embodiment and should not be construed to be limiting.

The trackers 100 may be identical or dissimilar. The example schematic of FIG. 24 shows the use of connectors 2401 (e.g., quick-disconnect style) between trackers 100, which may be desirable in some examples; however, in further examples connectors 2401 may be absent. Further embodiments can include a single tracker 100 or any suitable plurality of trackers 100.

Figure 25:
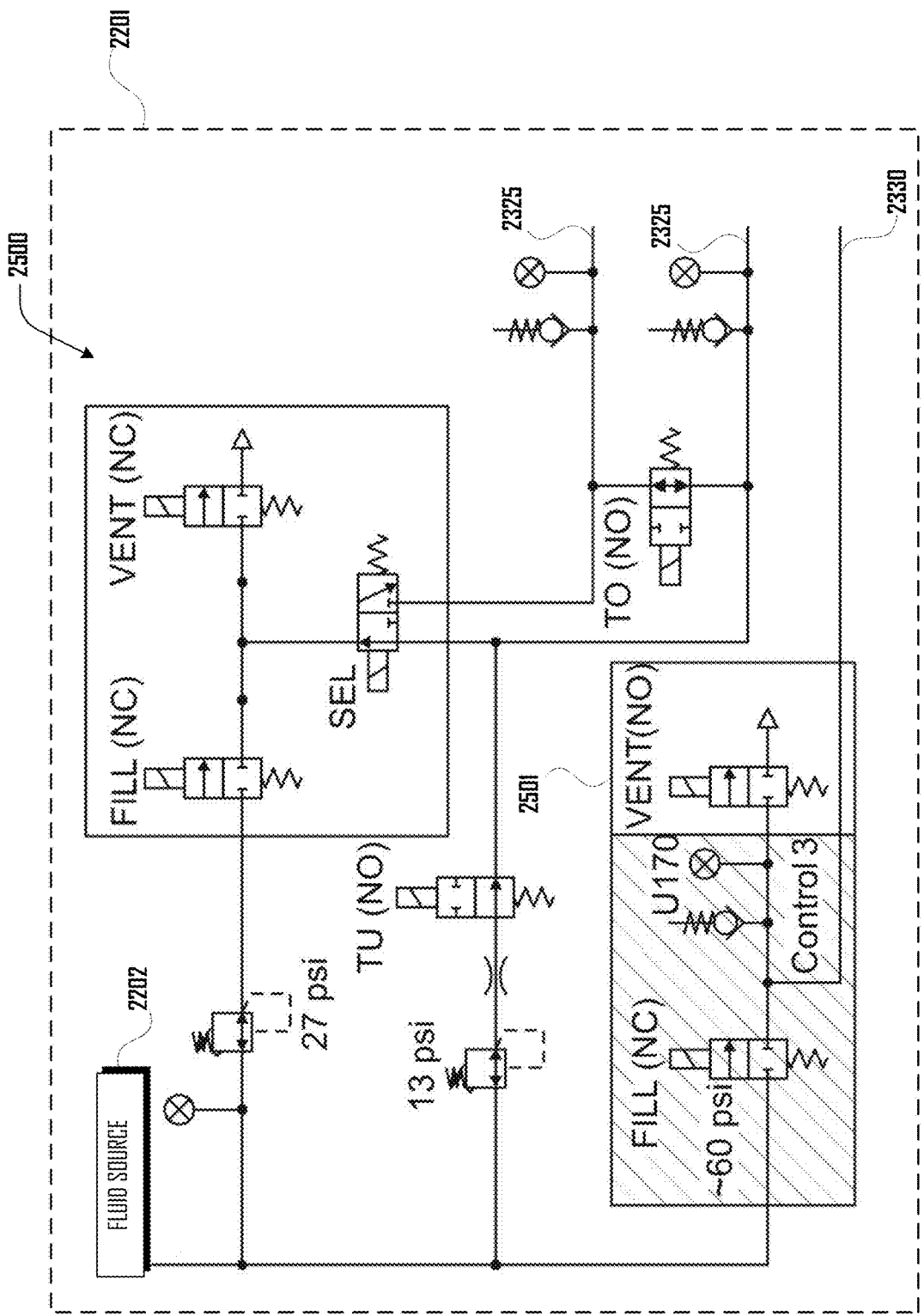
FIG. 25 illustrates a tracker controller pneumatic schematic that includes systems for actuating a pneumatic lock.

Turning to FIG. 25, a pneumatic schematic of a tracker controller 2201 is illustrated, which comprises example pneumatics 2500 that includes pneumatic lock pneumatics 2501. The pneumatics 2500 can output fluid from a fluid source 2202 to fluid lines 2325, 2330 as discussed herein (see, e.g., FIGS. 22-24). FIG. 25 shows one example implementation of pneumatics 2500 of a tracker controller 2201, but various other suitable embodiments are within the scope and spirit of the present disclosure. Also, while specific example pressures are illustrated for purposes of illustration, these specific examples should not be construed as limiting.

FIG. 26 illustrates a schematic arrangement of a pneumatic control air harness which connects from a tracker controller 2201 to a locking-dampening assembly 400. This shows the specific sizes and types of tubes and connectors used in one example implementation of a system, but these specific examples should not be construed as being limiting.

FIG. 27 illustrates another example embodiment of a pneumatic control air harness to locking dampening assembly connection. Some embodiments can include using some additional custom components for potentially lower cost/reduced complexity. Again, specific sizes and configurations of this example embodiment should not be construed as being limiting.

When the tracker 100 is in a flat position, the actuators 101 of a tracker 100 may have approximately equal pressures. When a wind gust hits the tracker 100, such a force can deflect the tracker 100, which can compress one bellows 2310 (e.g., an east bellows) of the actuator 101 and cause a bellows 2310 on the other side (e.g., a west bellows) to expand. This can result in a corresponding change in the pressures within the bellows 2310. As the pressure rises within the compressed bellows 2310 and the angle of the actuator 101 and tracker 100 changes, the actuator 101 can exert more resisting moment to arrest the angle change caused by the gust of wind. Unfortunately, this occurs relatively elastically in some examples, meaning that very little energy is dissipated from the wind gust. Rather, the actuator 101 reaches a resisting force equal to or greater than the force from the wind, which then causes an acceleration in the opposite rotational direction. This, combined with vortex shedding from the wind in some examples, may cause an amplification of an oscillation which may reach high amplitudes and result in damage to the tracker 100.

Accordingly, in some embodiments it can be desirable for the actuator 101 to be able to dissipate the wind energy in some manner in order to dampen an oscillation that may be generated by wind, or the like. By creating a connection between East and West bellows 2310, energy may be dissipated in a number of ways in some embodiments. A direct connection between bellows 1210, for example, can increase damping by preventing a pressure rise in the compressed bellows 1210, and can prevent spring-back of the tracker 100 which may augment oscillation of the tracker 100. In some examples, supplementing such a direct connection with an energy absorbing system, such as an air turbine, muffler, baffler, or the like, can remove additional energy from the system further increasing damping.

Figure 28:
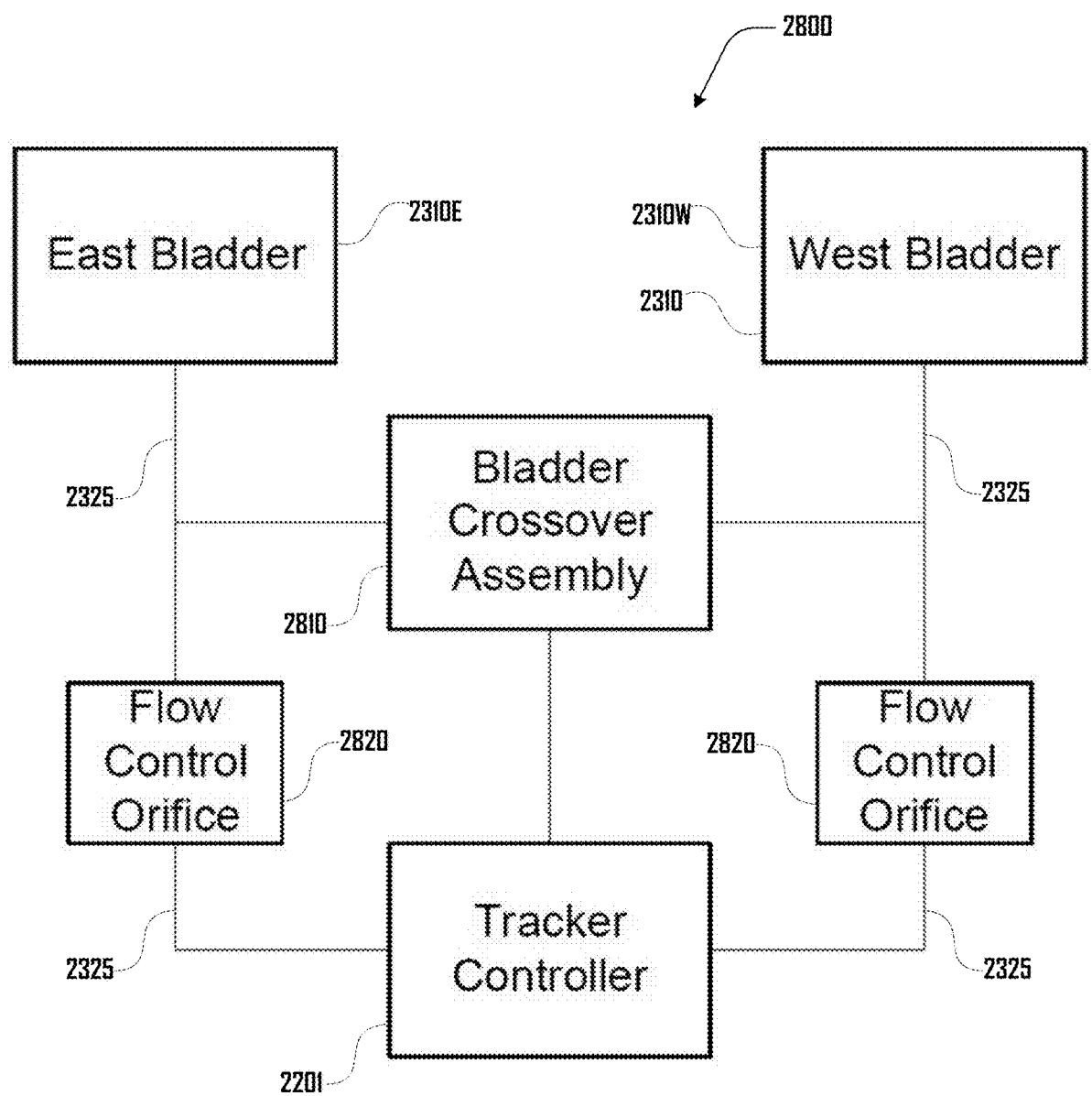
FIG. 28 is a block diagram of a cross-flow dampening system in accordance with an embodiment.

FIG. 28 is a block diagram of a cross-flow dampening system 2800 in accordance with an embodiment, that comprises an east and west bellows 2310E, 2310W (e.g., bladder), which are operably coupled to a bladder/bellows crossover assembly 2810 and a respective flow control orifice 2820. A tracker controller 2201 is operably coupled to the bladder/bellows and the flow control orifices 2820 via fluidic supply lines 2325 (see e.g., FIG. 23). The tracker controller 2201 can be operably coupled to and configured to control the crossover assembly 2810 in various suitable ways including, via a wired and/or wireless connection, via fluidic tubing 2330 (see e.g., FIG. 23), or the like.

In various embodiments, during normal tracking operations of a tracker 100, the bladder/bellows crossover assembly 2810 can be held in a closed state by the tracker controller 2201. This can allow normal pressure differentials to form between the bellows 2310, which can allow the tracker 100 to track the position of the sun, or the like.

In the event of a wind stow event where the tracker 100 is moved back to flat in response to detected or determined wind or bellows pressure over a certain threshold that is indicative of an undesirable wind event, the bladder/bellows crossover assembly 2810 can be opened to allow free passage of air between the East and West bellows 2310E, 2310W which can equalize the pressures between bladders/bellows 2310. As described above, the bladder/bellows crossover assembly 2810 can comprise a direct fluidic passage between East and West bellows 2310E, 2310W, and/or include some energy absorbing equipment.

In various embodiments, a method of controlling a tracker 100 can comprise monitoring for a wind stow event, which can include a tracker controller 2201 or other suitable device monitoring wind speed, weather data, pressure in bladders/bellows 2310, or the like. A wind stow event can be identified based on pressure in bladders/bellows 2310 being over a threshold value; based on pressure in bladders/bellows 2310 being over a threshold value for a defined amount of time; based on wind speed data being over a threshold value; based on wind speed data being over a threshold value for a defined amount of time; based on current or predicted weather data meeting certain; or the like. Data regarding wind speed and/or weather can be obtained from local or remote sources.

Where a wind stow event is identified, the tracker controller 2201 can cause the bladder/bellows crossover assembly 2810 to be opened to allow free passage of fluid between one or more pairs of opposing bladders/bellows (e.g., East and West bellows 2310E, 2310W). As discussed herein, the tracker controller 2201 can control the bladder/bellows crossover assembly 2810 in various suitable ways. The tracker controller 2201 can maintain the bladder/bellows crossover assembly 2810 in an open configuration as long as the wind stow event conditions remain and can close the bladder/bellows crossover assembly 2810 when it is determined that the wind stow event is no longer present.

Control methods for the bladder/bellows crossover assembly 2810 can include one or more of: direct tracker controller operation via independent fluidic control channel; pressure threshold operation tied to a lock fluidic control channel (e.g., fluidic tubing 2330 as shown in FIG. 23); pressure differential operation based on the pressure differential between two or more control inputs; passive operation that only flows if the pressure differential between bladders/bellows 2310 exceeds a threshold value; and the like.

Damping methods can include one or more of the following: direct connection (e.g., free flow between bladders); spring energy absorber; pressure rise in a bladder/bellows crossover assembly 2810 opens a check-valve type structure; energy is dissipated through repeated valve open/close cycles; porous membrane between bladders to absorb energy via friction between membrane and air; mechanical turbine to spin via a bladder-to-bladder pressure differential, and the like.

The following examples of control states should not be construed as the only set of control states. Additional states may be added, existing states deleted, wind speeds changed, etc. Accordingly, the following examples should not be construed as being limiting.

In some embodiments, specific wind speeds for control can depend on the specific tracker structure implemented, and the design wind speed for the location where the tracker system is implemented. The manual control states (at the bottom of the table) may or may not have defined maximum allowable wind speeds for manual control for operator safety. Manual control states may have an override to allow skilled personnel to override the safety features in an emergency. A nighttime idle angle other than flat may be implemented to prevent dirt accumulation on the solar panels.

| State Name | Behavior | Min Wind Speed (mph) | Max Wind Speed (mph) |
|---|---|---|---|
| Low Wind Speed Tracking | Always unlocked, move in 2 degree steps, prepared to lock if necessary. | 0 | 10 |
| Moderate Wind Speed Tracking | Unlock, Move, Lock. Movements in 5 degree steps. | 10 | 25 |
| Elevated Wind Speed Hold | Wind speed increased beyond the "safe to move" speed, but lower than the "Stow" speed. Stay locked and wait for the wind to die down. | 25 | 40 |

| State Name | Behavior | Min Wind Speed (mph) | Max Wind Speed (mph) |
|---|---|---|---|
| Track Towards Flat in medium high winds | wind speeds above tracking threshold, but below stow threshold, continue tracking towards flat without unlocking, do not track away from flat. | 25 | 50 |
| Move to Stow | Move to flat with great haste without unlocking. Can be triggered either by breaching the wind speed threshold, or if the locks begin to backdrive. | 40 | Max |
| Nighttime Idle-High Angle | Night time idle at high angle to reduce soiling (25 degrees?) | 0 | 40 |
| Manual Lock Control | UI feature to allow for manual lock/unlock of all locks | 0 | 25 |
| Manual Tracker Control | UI feature to allow for manual pointing of the tracker | 0 | 25 |

Some embodiments can include a closed fluidic system configured to lock and unlock, allowing the tracker 100 to move only in the desired direction(s) and/or providing a suitable amount of resisting force, which may be used for dampening. Various examples can include one or more fluidic cylinders 540 (see e.g., FIG. 5), which in some embodiments can be anchored to a post 104 and then connected to a rotating portion of a tracker 100 (such as a rotatable bar 510). When in a locked configuration, the cylinder 540 can prevent or substantially prevent all motion of the tracker 100 (e.g., motion of the bar 510 relative to the post 104). A cylinder 540 may be unlocked in various suitable ways which can allow the tracker 100, in some embodiments, to move only towards flat passively, or away from flat actively. As the tracker 100 rotates, the cylinder 540 in various examples can extend and retract via the shaft 543 translating within the body 544 of the cylinder 540.

Figure 29:
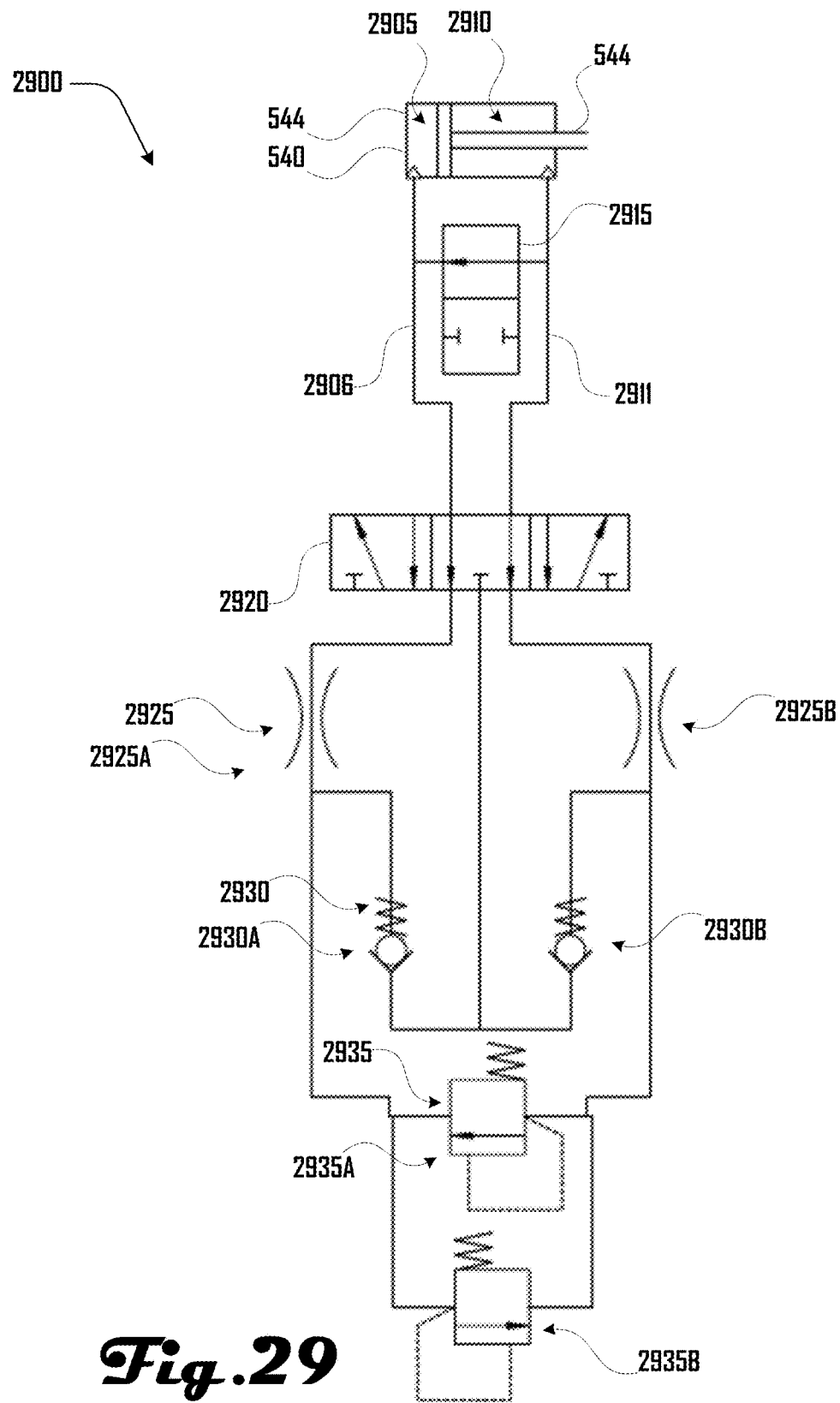
FIG. 29 is an illustration of fluidics associated with a ram or cylinder of one embodiment.

An example of fluidics 2900 (e.g., hydraulics and/or pneumatics) associated with a cylinder 540 is shown in FIG. 29 which comprises a cylinder 540 that defines a first and second chamber 2905, 2910. Respective first and second fluid lines 2906, 2911 are fluidically coupled to and configured to introduce and/or release fluid from the chambers 2905, 2910. In various embodiments, if flow of fluid to/from chambers 2905, 2910 of the cylinder 540 is restricted, then the tracker 100 may be unable to move.

A bypass valve 2915 can be operably coupled to and configured to allow fluid to flow between the first and second fluid lines 2906, 2911. For example, in various embodiments, when the bypass valve 2915 is open, flow of fluid can be allowed in either direction between the first and second fluid lines 2906, 2911, which can allow the cylinder 540 to expand and/or contract via the shaft 543 translating within the body 544 of the cylinder 540. The bypass valve 2915 can be actuated between open and closed states in various suitable ways, including via a solenoid, driven by an air cylinder, or the like. For example, in various embodiments, a row controller 2201 or other suitable device or system can control the bypass valve 2915.

The fluidics 2900 can further include a main valve 2920, which can be configured to control the flow of fluid into and/or out of the first and second fluid lines 2906, 2911. In some examples, the main valve 2920 can comprise a 3-position, 5-port, open center valve, but other suitable valves can be employed in further examples. In various embodiments, configuration of the main valve 2920 can be set based on an angle of the tracker 100 with a center position engaging where the tracker 100 is within a margin of a flat configuration (e.g., at or very close to a flat configuration) and an outer configuration engaging when the tracker is outside of the margin of the flat configuration.

The fluidics 2900 can further include flow control orifices 2925, which can be sized (e.g., having a defined diameter, length, volume or internal profile) based on a desired maximum speed of rotation of the tracker 100. For example, the flow control orifices 2925A, 2925B can be sized to control the maximum flow rate of fluid into and/or out of the first and second fluid lines 2906, 2911 respectively, which can affect the maximum rate of rotation of the tracker 100. Flow control orifices 2925 can be desirable to prevent excessive rotation speed of the tracker 100 and can be passive, non-moving elements that control rotation speed regardless of valve configurations. However, in some embodiments, the size of the flow control orifices 2925 can be actively controlled and configured.

The fluidics 2900 can further include check valves 2930, which can be configured to allow fluid flow in only a single direction, which in some examples can be used to enable a "move-to-center" behavior of the tracker 100 (e.g., in combination with the main valve 1920). In various embodiments, both check valves 2930A, 2930 can be engaged by the bypass valve 1915.

The fluidics 2900 can further include pressure relief valves 2935, which in some examples can be configured to generate direct flow of fluid from one chamber 2905, 2910 to the other. For example, in one embodiment, relief valves 2935A, 2935B can be configured for snow overload pressure relief where automatic flow bypass allows for automated snow damping, where snow is present on the tracker 100. In some embodiments, the pressure relief valves 2935 can be absent from the fluidics 2900.

Figures 30A, 30B:
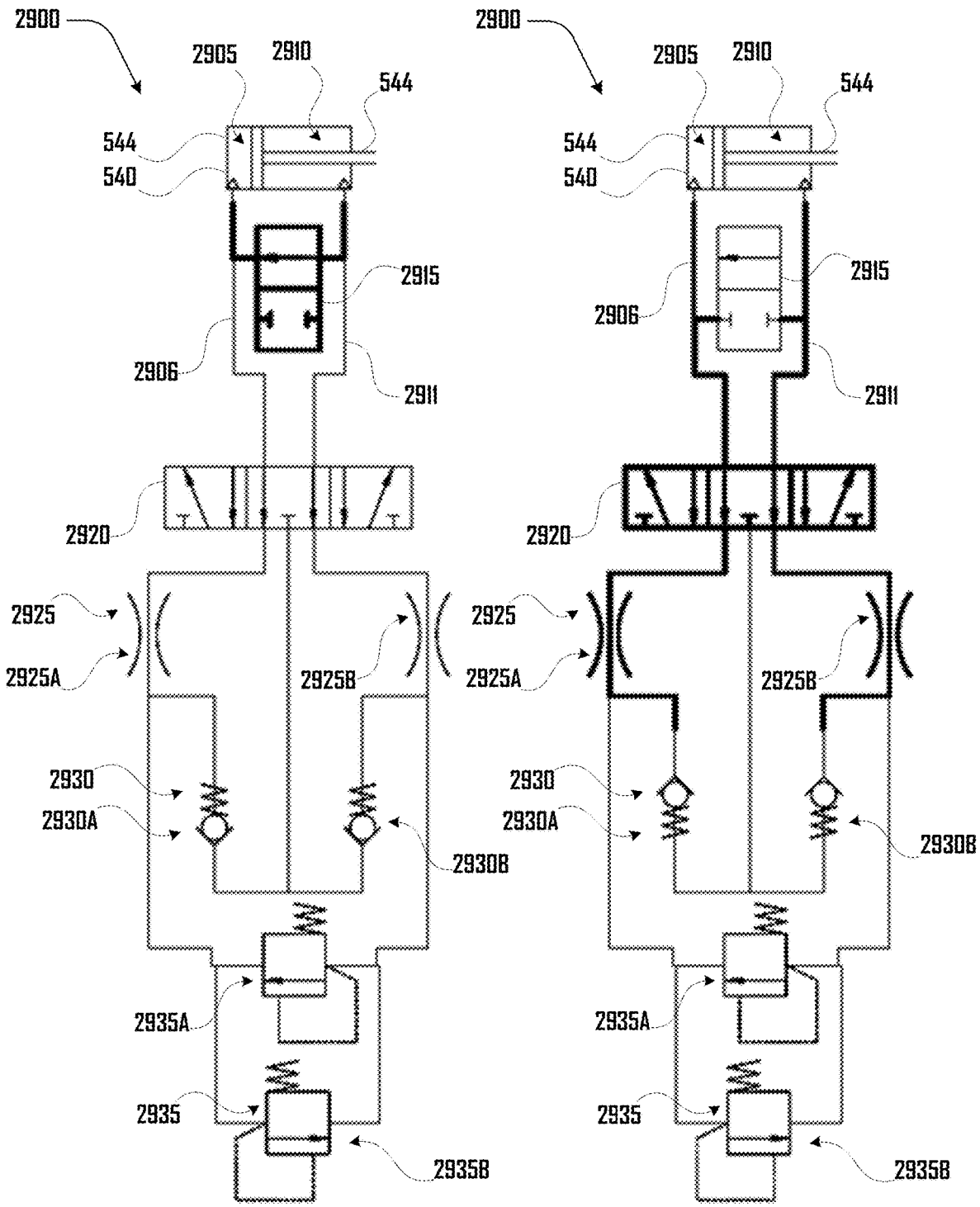
FIG. 30a illustrates an example of the fluidics of FIG. 29 in a bypass-flow configuration, where the bypass valve 2915 is in an open configuration.
FIG. 30b illustrates an example of the fluidics of FIG. 29 in a tracker-locked configuration where the bypass valve is closed and the main valve is also closed, which can cause the tracker to be locked and unable to move.

FIGS. 30a, 30b, 31a and 31b illustrate example states of fluidics 2900 of FIG. 29, where the elements in bold signify elements where fluid is present, flowing or active in a given configuration. For example, FIG. 30a illustrates an example bypass-flow configuration, where the bypass valve 2915 is in an open configuration (e.g., opened by row controller 2201), which can generate a primary flow path via the bypass valve 2915, which can allow the tracker 100 to move in any direction regardless of starting angle. More specifically, the bypass valve 2915 can allow fluid to flow between the first and second chambers 2905, 2910 of the cylinder 540 via the fluid lines 2906, 2911 which allows the shaft 543 to freely translate within the body 544 of the cylinder 540, which in turn generally allows the tracker 100 to freely rotate.

FIG. 30b illustrates a tracker-locked configuration, where the bypass valve 2915 is closed and the main valve 2920 is also closed (e.g., due to tracker position), which can cause the tracker 100 to be locked and unable to move. More specifically, closure of the bypass valve 2915 and main valve 2920 can prevent fluid flow between the first and second chambers 2905, 2910 of the cylinder 540 via the fluid lines 2906, 2911 which can prevent the shaft 543 from freely translating within the body 544 of the cylinder 540, which in turn can prevent the tracker 100 from freely rotating.

FIGS. 31a and 31b illustrate respective unidirectional motion configurations where the tracker 100 is configured to only move in one direction and not the other (e.g., only left or only right; only east or only west; and the like). For example, FIGS. 31a and 31b illustrate a configuration where the bypass valve 2915 is closed and the main valve 2920 is at one extreme or the other which only allow fluid flow in one direction based on the main valve 2920 and one of the check valves 2930. Specifically, FIG. 31a illustrates a first unidirectional motion configuration where the main valve 2920 allows unidirectional fluid flow through the second flow control orifice 2925B and the second check valve 2930B and FIG. 31b illustrates a second unidirectional motion configuration where the main valve 2920 allows unidirectional fluid flow through the first flow control orifice 2925A and the first check valve 2930A.

Figure 32A:
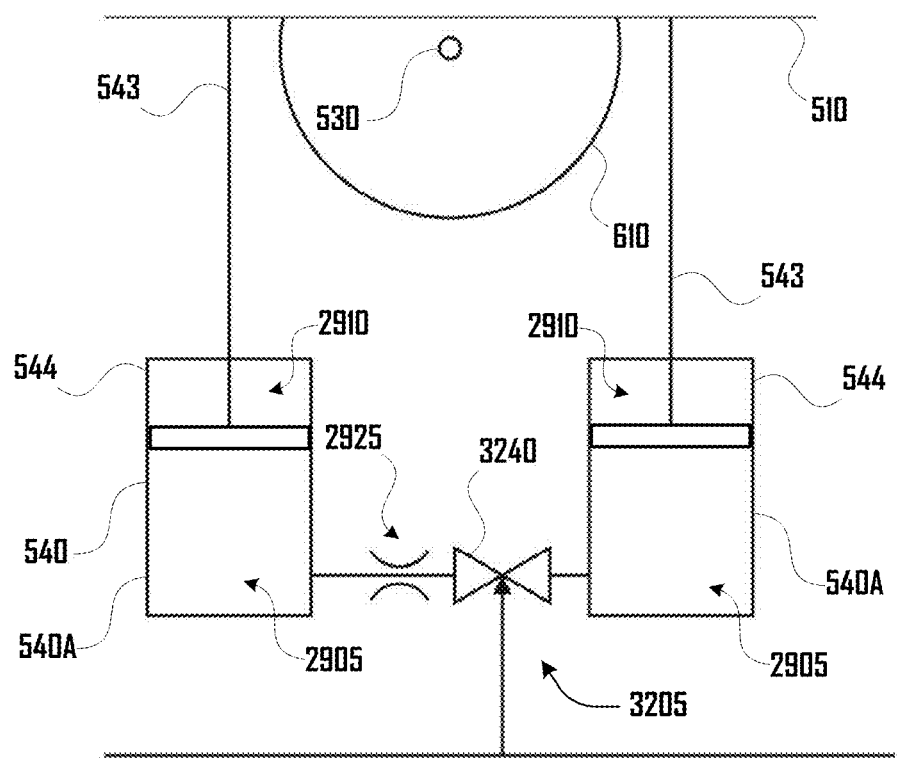
FIG. 32a illustrates an example of valving comprising a valve and flow control orifice between a first and second cylinder.
Figure 32B:
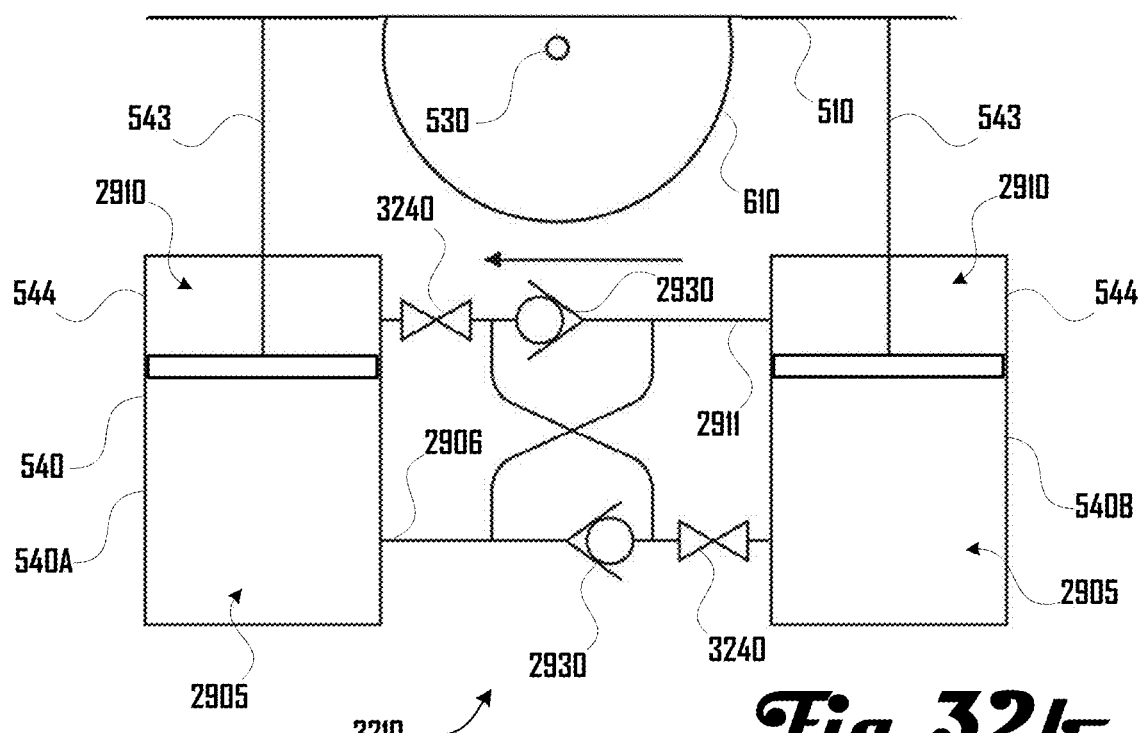
FIG. 32b illustrates another example of valving that includes a pair of two-way valves and a pair of check valves.

Various embodiments can include any suitable plurality of cylinders 540. For example, some embodiments can include a plurality of cylinders 540 as shown in FIG. 5, with a first and second cylinder 540 on opposing sides of the post 104 with the cylinders 540 respectively coupled on a bar 510 on opposing sides of an axle 530 and/or gear plate 610, 810. For example, FIGS. 32a and 32b illustrate respective example embodiments 3205, 3210 of valving of systems comprising a first and second cylinder 540A, 540B. FIG. 32a illustrates an example of valving 3205 comprising a valve 3240 and flow control orifice 2925 between a first and second cylinder 540A, 540B. FIG. 32b illustrates an example of valving 3210 that includes a pair of two-way valves 3240 and a pair of check valves 2930. It should be noted that various elements may be omitted in the examples of FIGS. 32a and 32b for purposes of clarity (e.g., a post 104, a coupling to a post 104, and the like).

Figure 33:
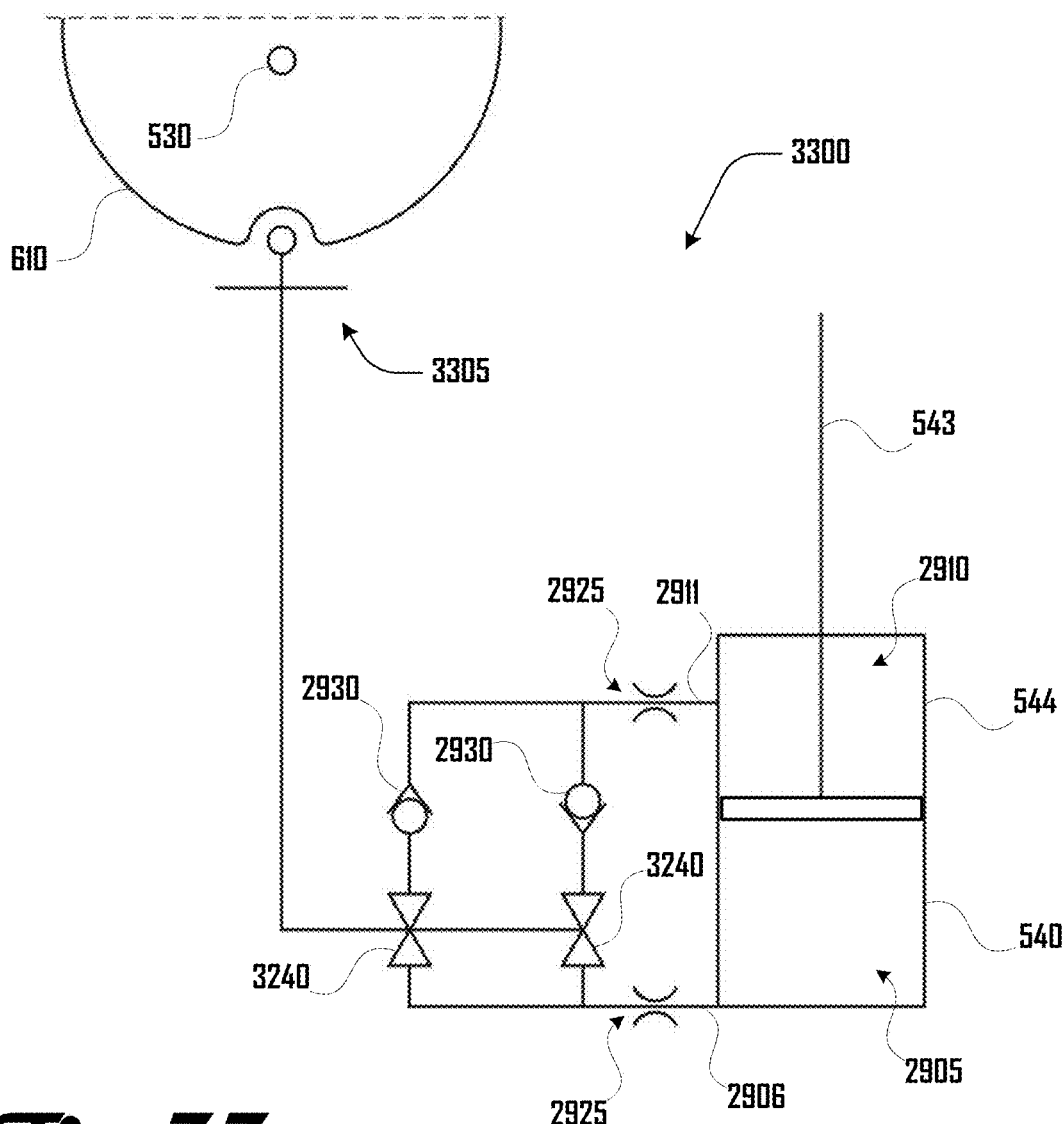
FIG. 33 illustrates a directional fluidics embodiment that includes a cylinder with first and second chambers connected via two check valves and two stop valves.
Figure 34:
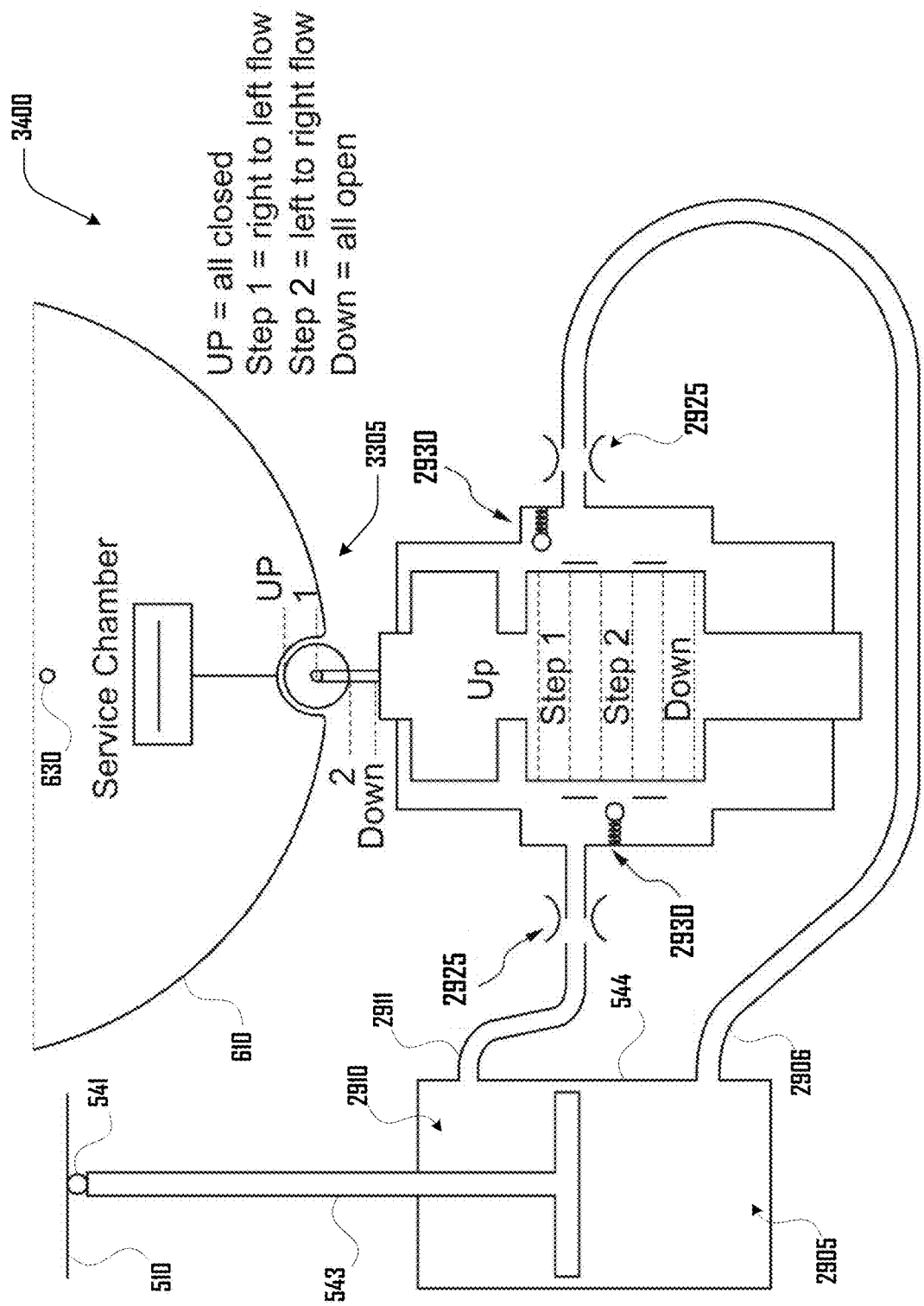
FIG. 34 illustrates another directional fluidics embodiment.

Some embodiments can include directional fluidics. For example, FIG. 33 illustrates a directional fluidics embodiment 3300 that can include a cylinder 540 with first and second chambers 2905, 2910 connected via two check valves 2930 and two stop valves 3240. The stop valves 3240 can be controlled mechanically by an assembly 3300 cam surface and a parallel service chamber. Various examples can include four states, including: both valves closed (center)—all stop; both valves open (driven by service chamber)—all move; and one valve open only—unidirectional motion. Another directional fluidics embodiment 3400 is shown in FIG. 34.

A bandsaw fluidic cylinder 540 can be controlled in various suitable ways (e.g., easy flow one direction, restricted flow the other direction). In some examples, bladder/bellows pressures can be used to signal the system. In some examples, a fluidic cylinder 540 can connect to bladders behind an orifice 2925 instead of fluid harnesses of the tracker 100. Direction of the fluid harness pressure differential may not be the direction of the bladder pressure differential in some embodiments.

Turning to FIGS. 45a, 45b, 46a and 46b, an example embodiment of a pin lock system 4500 is illustrated, which includes a pin assembly 4510 disposed on a base plate 105, where the pin assembly 4510 comprises a pin 4512 that is slidably disposed within a pin housing 4514 and configured to move in and out of a pin port 4516. In various embodiments, the pin 4512 can be actuated via an actuation port 4518. The pin lock system 4500 can further include a pin lock 4530 disposed on a gear plate 810 with the pin lock 4530 defining a pin socket 4532.

Figure 46A:
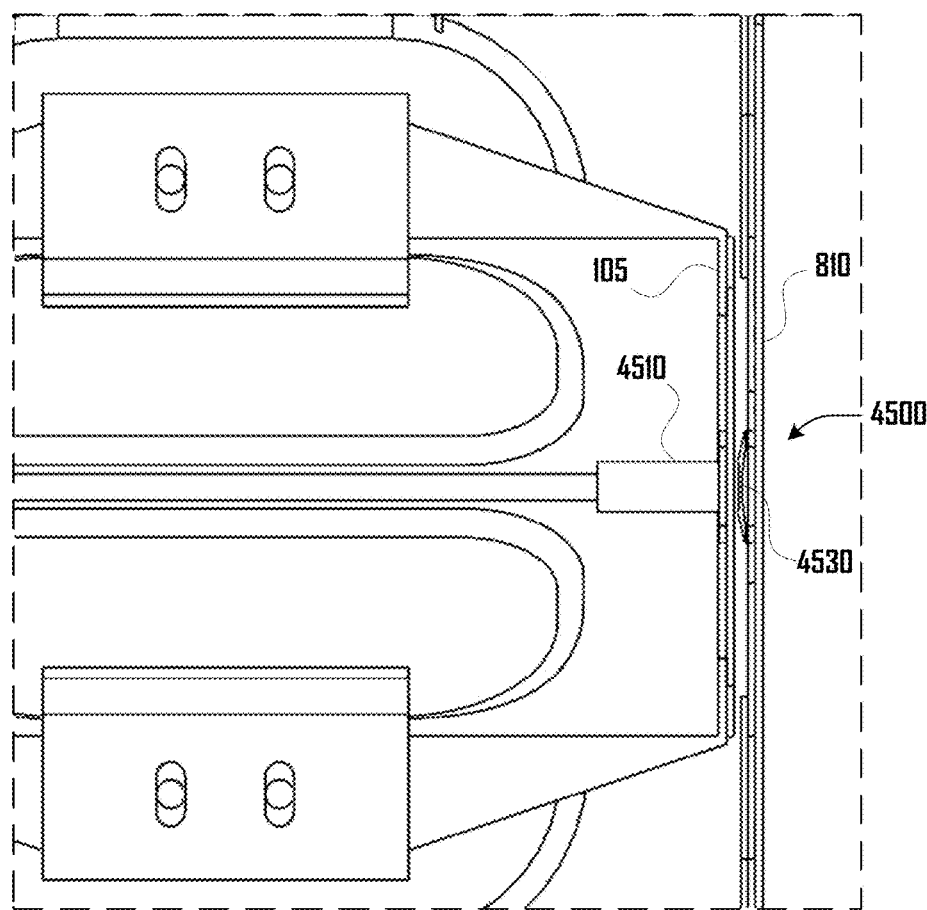
FIG. 46a illustrates a bottom side view of a tracker comprising the pin lock system of FIGS. 45a and 45b.
Figure 46B:
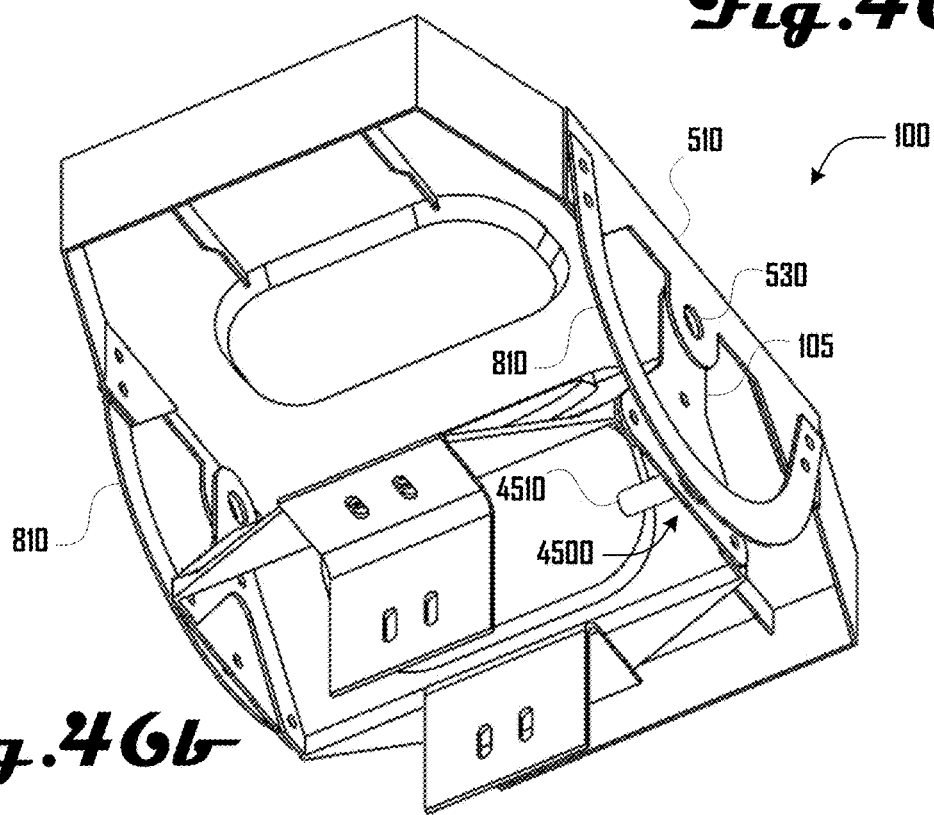

As shown in FIG. 46b, and as discussed herein, a bar 510 can be rotatably coupled to the base plate 105 via an axle 530, which can allow the gear plate 810 to rotate about the base plate 105 and change the configuration of the pin lock 4530 on the gear plate 810 relative to the pin assembly 4510 on the base plate 105. In various embodiments, the pin 4512 can be configured to extend out the pin port 4516 and into the pin socket 4532 of the pin lock 4530, which can lock motion of the gear plate 810 and thereby lock the bar 510 relative to the base plate 105, which can lock a tracker 100 in a flat configuration or other suitable configuration as discussed herein. In some embodiments, a tracker 100 can comprise a plurality of pin lock systems 4500, such as on opposing sides of a tracker 100

In some embodiments, the pin 4512 can be biased (e.g., spring loaded) toward an extended (or retracted) configuration with a lock actuator configured to overcome the biasing to disengage the lock. For example, in some embodiments, a spring can passively engage the pin 4512 toward the pin lock 4530 when not disengaged by the lock actuator. In various embodiments, the pin lock 4530 can comprise a ramped or sloped profile from a face of the gear plate 810 to the pin socket 4532 (see, e.g., FIG. 46a), which can engage the pin 4512 in an extended configuration, which slightly retracts the pin 4512 until the pin 4512 is aligned with and extends into the pin socket 4532 based on the biasing of the pin 4512.

Control methods for actuation of the pin 4512 can include one or more of: direct tracker controller operation via an independent fluidic control channel (e.g., fluidic tubing 2330 as shown in FIG. 23); a solenoid controlled via wired and/or wireless communication or triggered via a fluidic input, or the like. For purposes of clarity, a specific control and/or biasing element are absent from the examples of FIGS. 45a, 45b, 46a and 46b.

In some embodiments, a locking mechanism can be configured with one or more interface points for manual lockout devices. Such manual lockouts can comprise various suitable elements such as pins, wedges, yokes, or other suitable restraint or lock. Manual lockouts may be configured such that they can be locked in place with a key system so that unauthorized removal is prevented. Manual lockouts may be configured such that they are robust to external forces (e.g., wind, snow, or the like), to prevent unintended motion commanded by the control system, or other such scenarios. Manual lockouts may be configured in such a way as to be a primary protection for workers while servicing a tracker 100. Other configurations may be tailored for specific repair tasks such as remediation for damaged flexible bladders 2310. A manual lockout can be disposed in various suitable location on a tracker 100, but one example includes an interface between a gear plate 810 and latch assembly 3610 (see e.g., FIG. 41b).

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives. Additionally, elements of a given embodiment should not be construed to be applicable to only that example embodiment and therefore elements of one example embodiment can be applicable to other embodiments. Additionally, elements that are specifically shown in example embodiments should be construed to cover embodiments that comprise, consist essentially of, or consist of such elements, or such elements can be explicitly absent from further embodiments. Accordingly, the recitation of an element being present in one example should be construed to support some embodiments where such an element is explicitly absent.

What is claimed is:

1. A solar tracker system comprising:
   one or more solar panels defining a longitudinal axis, the one or more solar panels coupled to a pair of rails that extend along a length of the solar tracker system;
   one or more fluidic actuators coupled to the one or more solar panels and defining a first axis of rotation that is parallel to the longitudinal axis of the one or more solar panels, the one or more fluidic actuators comprising:
      a first inflatable bladder, and
      a second inflatable bladder,
   one or more tracker rotation control systems configured for locking rotation of the solar tracker system about the first axis of rotation and configured for dampening rotation of the solar tracker system about the first axis of rotation, the one or more tracker rotation control systems comprising:
      an axle that defines a second axis of rotation that is parallel to first axis of rotation,
      bar that extends between and is coupled to the pair of rails, the bar configured to rotate about the second axis of rotation via the axle,
      a curved gear plate comprising a plurality of teeth on an arced edge of the curved gear plate, the curved gear plate configured to rotate about the second axis of rotation via the axle,
      one or more pawl configured to engage with the teeth on the arced edge of the curved gear plate to limit rotation of the solar tracker system to a single direction;
      a locking element configured to lock the solar tracker system in a flat configuration;
      one or more fluidic cylinders coupled to the bar configured to control rotation of solar tracker system;
   a shared fluid source;
   a first set of fluid lines fluidically coupled to the first inflatable bladder and the shared fluid source;
   a second set of fluid lines fluidically coupled to the second inflatable bladder and the shared fluid source;
   a third set of fluid lines fluidically coupled to the one or more tracker rotation control systems and the shared fluid source; and
   an electronic controller, the electronic controller configured to:
      control supplying a first portion of a fluid from the shared fluid source to the first inflatable bladder based at least in part on a position of the sun,
      control supplying a second portion of the fluid from the shared fluid source to the second inflatable bladder based at least in part on the position of the sun, and
      control supplying a third portion of the fluid from the shared fluid source to the one or more tracker rotation control systems to actuate the pawl and the locking element.

2. The solar tracker system of claim 1, wherein the locking element comprises a two-way latch assembly, the two-way latch assembly comprising a housing and a pair of latch arms that define a latch slot, the two-way latch assembly configured to couple with a latch bar with the latch bar held within the latch slot after rotatably engaging at least one of the pair of latch arms, the latch bar coupled to the curved gear plate.

3. The solar tracker system of claim 2, wherein the electronic controller is configured to control supplying the third portion of the fluid from the shared fluid source to actuate the latch arms to enable and disable the locking element.

4. The solar tracker system of claim 1, further comprising a plurality of posts disposed in the ground parallel to a post axis, and wherein the flat configuration of the solar tracker system includes the longitudinal axis of the one or more solar panels being disposed perpendicular to the post axis.

5. The solar tracker system of claim 1, wherein the one or more fluidic cylinders are configured to extend and retract via a shaft translating within a body of the fluidic cylinders, the one or more fluidic cylinders defining a first and second chamber with respective first and second cylinder fluid lines fluidically coupled to the first and second chambers and configured to introduce the fluid to the first and second chambers via the third set of fluid lines under control of the electronic controller.

6. A solar tracker system comprising:
   one or more panels defining a longitudinal axis, the one or more panels coupled to a pair of rails that extend along a length of the solar tracker system;
   one or more fluidic actuators coupled to the one or more panels and defining a first axis of rotation that is parallel to the longitudinal axis of the one or more panels, the one or more fluidic actuators comprising:
      a first inflatable bladder, and
      a second inflatable bladder,
   one or more tracker rotation control systems that include:
      a curved gear plate; and
      a locking element configured to lock the solar tracker system in a flat configuration;
   a shared fluid source;
   a first set of fluid lines fluidically coupled to the first inflatable bladder and the shared fluid source;
   a second set of fluid lines fluidically coupled to the second inflatable bladder and the shared fluid source; and
   a third set of fluid lines fluidically coupled to the one or more tracker rotation control systems and the shared fluid source.

7. The solar tracker system of claim 6, wherein the one or more tracker rotation control systems further include one or more fluidic cylinders configured to control rotation of solar tracker system.

8. The solar tracker system of claim 6, further comprising an electronic controller, the electronic controller configured to:
   control supplying a first portion of a fluid from the shared fluid source to the first inflatable bladder based at least in part on a position of the sun,
   control supplying a second portion of the fluid from the shared fluid source to the second inflatable bladder based at least in part on the position of the sun, and
   control supplying a third portion of the fluid from the shared fluid source to the one or more tracker rotation control systems to actuate the pawl and the locking element.

9. The solar tracker system of claim 6, wherein the locking element comprises a two-way latch assembly, the two-way latch assembly comprising a pair of latch arms that define a latch slot, the two-way latch assembly configured to couple with a latch bar with the latch bar held within the latch slot after rotatably engaging at least one of the pair of latch arms, the latch bar coupled to the curved gear plate.

10. The solar tracker system of claim 9, wherein an electronic controller is configured to control supplying a fluid from the shared fluid source to actuate the latch arms to enable and disable the locking element.

11. The solar tracker system of claim 6, wherein the one or more tracker rotation control systems further comprise a plurality of teeth on an arced edge of the curved gear plate; and
one or more pawl configured to engage with the teeth on the arced edge of the curved gear plate to limit rotation of the solar tracker system to a single direction.

12. A solar tracker system comprising:
one or more tracker rotation control systems that include:
a first curved gear plate; and
a first locking element configured to lock the solar tracker system in a first configuration,
wherein the first locking element comprises a two-way latch assembly,
wherein the two-way latch assembly comprises a pair of latch arms that define a latch slot, the two-way latch assembly configured to couple with a latch bar with the latch bar held within the latch slot, the latch bar coupled to the first curved gear plate.

13. The solar tracker system of claim 12, further comprising:
a second curved gear plate opposing the first curved gear plate; and
a second locking element opposing the first locking element, the second locking element configured to lock the solar tracker system in the first configuration.

14. The solar tracker system of claim 12, wherein the first curved gear plate comprises a latch bar configured to rotatably engage the two-way latch assembly on a first and second opposing side of the two-way latch assembly.

15. The solar tracker system of claim 12, wherein an electronic controller is configured to control actuation of the pair of latch arms to enable or disable the first locking element.

16. The solar tracker system of claim 15, wherein actuation of the pair of latch arms comprises at least one of:
rotation of the pair of latch arms about a respective latch axle; and
retraction of the pair of latch arms into a latch housing.

17. The solar tracker system of claim 12, further comprising one or more actuators defining a first axis of rotation, the one or more actuators comprising:
a first actuator, and
a second actuator disposed antagonistically to the first actuator.

18. The solar tracker system of claim 12, further comprising:
a fluid source;
a first set of fluid lines fluidically coupled to a first inflatable bladder and the fluid source;
a second set of fluid lines fluidically coupled to a second inflatable bladder and the fluid source; and
a third set of fluid lines fluidically coupled to the one or more tracker rotation control systems and the fluid source.

* * * * *